(12) United States Patent
Uehara et al.

(10) Patent No.: US 7,821,611 B2
(45) Date of Patent: Oct. 26, 2010

(54) DISPLAY DEVICE HAVING A LIGHT SOURCE WITH TRANSPARENT/SCATTERING STATE SWITCHING ELEMENT

(75) Inventors: Shin-ichi Uehara, Tokyo (JP); Shinya Niioka, Tokyo (JP); Masao Imai, Tokyo (JP); Fujio Okumura, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 791 days.

(21) Appl. No.: 11/514,231

(22) Filed: Sep. 1, 2006

(65) Prior Publication Data

US 2007/0052879 A1 Mar. 8, 2007

(30) Foreign Application Priority Data

Sep. 5, 2005 (JP) ............................. 2005-256191

(51) Int. Cl.
G02F 1/1337 (2006.01)
G02F 1/1339 (2006.01)

(52) U.S. Cl. ........................................ 349/153; 349/74
(58) Field of Classification Search ......... 349/153–154, 349/74
See application file for complete search history.

(56) References Cited

U.S. PATENT DOCUMENTS 5,029,985 A * 7/1991 Suzuki et al. ................. 349/74
6,412,969 B1 * 7/2002 Torihara et al. ............. 362/609
6,573,956 B1 * 6/2003 Shibata ........................ 349/65
2004/0135941 A1 * 7/2004 Nam et al. ................... 349/110
2004/0233349 A1 * 11/2004 Shibuya et al. ................ 349/88
2005/0094062 A1 * 5/2005 Cheng et al. ................. 349/110
2006/0001823 A1 * 1/2006 Shih ............................ 349/153

FOREIGN PATENT DOCUMENTS

| JP | 5-72529 A | | 3/1993 |
| JP | 9-244018 A | | 9/1997 |
| JP | 09244018 A | * | 9/1997 |
| JP | 11-295705 A | | 10/1999 |
| JP | 2000-66177 A | | 3/2000 |

* cited by examiner

Primary Examiner—David Nelms
Assistant Examiner—Jessica M Merlin
(74) Attorney, Agent, or Firm—Sughrue Mion, PLLC

(57) ABSTRACT

A display device is provided with a light source, an light-guide plate, a prism sheet, a transparent/scattering state switching element, and a transmissive liquid crystal display panel. In the transparent/scattering state switching element, two transparent substrates are provided parallel to and separated from each other, and an electrode is provided to the surface of each transparent substrate. A scattering seal member is also provided between external peripheral portions of the transparent substrates, and a PDLC layer is enclosed in a space sealed by the scattering seal member between the transparent substrates. The scattering seal member is endowed with scattering properties whereby incident light is transmitted in a scattered state, and the degree of scattering thereof is equal to the degree of scattering of the PDLC layer during the scattering state.

62 Claims, 25 Drawing Sheets

DISPLAY DEVICE HAVING A LIGHT SOURCE WITH TRANSPARENT/SCATTERING STATE SWITCHING ELEMENT

BACKGROUND OF THE INVENTION

1. Field of the Invention

The present invention relates to a display device capable of switching a viewing angle, to a terminal device equipped with this display device, to a light source device mounted to the display device, and to an optical member.

2. Description of the Related Art

Because of their thin profile, light weight, small size, low energy consumption, and other advantages, display devices that use liquid crystals have been widely deployed and used in a range of devices that includes monitors, televisions (TV: Television), and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices. These liquid crystal display devices can be generally classified as transmissive, reflective, or transflective (using transmitted light and reflected light jointly) according to the type of light source used. Energy consumption can be reduced in the reflective type, since it can utilize external light in the display device, but contrast and other aspects of display performance are inferior compared to the transmissive type. Therefore, transmissive and transflective liquid crystal display devices are currently in the mainstream. In transmissive and transflective liquid crystal display devices, a light source is installed on the back surface of a liquid crystal panel, and a display is created using the light emitted by the light source. Specifically, a light source that is separate from the liquid crystal panel is essential in current mainstream liquid crystal display devices.

In the liquid crystal panel that is the primary component of a liquid crystal display device, information is displayed by using an electric field to control the orientation of liquid crystal molecules, and numerous modes have been proposed according to the combination of the type and initial orientation of the liquid crystal molecules, the direction of the electric field, and other characteristics. Among these modes, the modes most often used in a conventional terminal device include an STN (Super Twisted Nematic) mode using a simple matrix structure, and a TN (Twisted Nematic) mode using an active matrix structure. However, a liquid crystal panel that uses these modes has a narrow range of angles in which contrasts can be correctly distinguished, and grayscale inversion occurs outside the optimum viewing position.

This problem of grayscale inversion was relatively insignificant in mobile telephones and other terminal devices when the display content consisted mainly of telephone numbers and other characters. However, with recent technological developments, terminal devices have come to display not only text information, but also large amounts of image information. The visibility of images is therefore severely reduced by grayscale inversion. Liquid crystal panels that use a mode having a wide range of angles at which contrast can be correctly distinguished without the occurrence of grayscale inversion are therefore gradually being installed in terminal devices. Liquid crystal panels having this type of mode are referred to generically as wide-viewing-angle liquid crystal panels, and IPS (In-Plane Switching) systems and other horizontal field modes, multi-domain vertical alignment modes, and the like are applied therein. Since gradation can be correctly distinguished in a wide range of angles by using these wide-viewing-angle liquid crystal panels, even though a medium-sized terminal device is basically a personal tool, applications for sharing information with others that can be appreciated by multiple people simultaneously are gradually being developed and installed.

On the other hand, medium-sized terminal devices are characteristically used not only in closed rooms under tight security, but also in public places. It then becomes necessary to keep displays of private information and confidential information from being viewed by a third party. Particularly in recent years, occasions where private information and confidential information are displayed have increased in conjunction with the development of terminal devices, and demand for eavesdropping prevention techniques is increasing. There is therefore a desire to develop a technique capable of preventing eavesdropping and to enable the display to be viewed only by the user by narrowing the range of angles in which the display is visible; i.e., by narrowing the range of viewing angles.

As described above, a display having a wide range of viewing angles that can be appreciated by multiple people simultaneously, and a display having a narrow range of viewing angles that can be viewed only by the user are both desired. The ability to switch between these two types of displays in a single terminal device is also desired. Therefore, in order to satisfy such requirements, a display device has been proposed in which the light source device essential to the liquid crystal display device is designed so that the range of viewing angles can be changed.

FIG. 1 is a schematic sectional view showing the first conventional viewing-angle-controlled liquid crystal display device described in Japanese Laid-Open Patent Application No. 5-72529. As shown in FIG. 1, the first conventional viewing-angle-controlled liquid crystal display device 1001 is composed of a liquid crystal element 1170 that is capable of controlling scattering, and a liquid crystal element 1180 that is capable of controlling optical rotation and double refraction properties. The liquid crystal element 1170 that is capable of controlling scattering is composed of substrates 1110 and 1111 that are optically transparent in the visible region, transparent electrodes 1120 and 1121, a scattering liquid crystal 1130, a voltage supply source 1100, and a switch 1190. The liquid crystal element 1180 that is capable of controlling optical rotation and double refraction properties is composed of transparent substrates 1111 and 1112 that are optically transparent in the visible region, transparent electrodes 1122 and 1123, polarizers 1140 and 1141, orientation films 1150 and 1151, a liquid crystal layer 1160 having optical rotation and double refraction properties, a voltage supply source 1101, and a switch 1191. Polymer-dispersed liquid crystal is used as the scattering liquid crystal 1130, and TN liquid crystal is used as the liquid crystal 1180 that is capable of controlling optical rotation and double refraction properties. The polarizers 1140 and 1141 are arrayed as a crossed Nicol.

In the first conventional viewing-angle-controlled liquid crystal display device thus configured as described in Japanese Laid-Open Patent Application No. 5-72529, a voltage is applied between the transparent electrodes 1122 and 1123, whereby the optical rotation and double refraction properties of the liquid crystal layer 1160 are changed, and this change can be used to control the transmittance of light. In this type of display mode that utilizes optical rotation and double refraction properties, the optical rotation and double refraction properties that substantially affect the incident light differ according to the direction of the viewing angle. A phenomenon therefore occurs in which the luminance and chroma are reduced or inverted, depending on the viewing angle. A liquid crystal element 1170 that is capable of controlling scattering is therefore disposed above this type of viewing-angle-dependent liquid crystal element 1180 to reduce the viewing angle dependency. Specifically, since the liquid crystal molecules are randomly oriented when an electric field is not applied to the liquid crystal 1130 of the liquid crystal element 1170 that is capable of controlling scattering, nearly isotropic scattering occurs throughout the entire range of viewing angles, and a display can be obtained that has little dependency on the viewing angle. When an electric field is applied to the liquid crystal 1130, the liquid crystal molecules orient themselves substantially parallel to the electric field. The light emitted from the liquid crystal element 1180 is therefore emitted without being scattered by the liquid crystal molecules. The visual characteristics do not improve at this time, but when the display need only be correctly recognized by a single user, the viewing angle characteristics resemble those of a conventional TN liquid crystal, and a user can use the display without the display being correctly recognized by another person.

FIG. 2 is a schematic sectional view showing a second conventional viewing-angle-controlled liquid crystal display device described in Japanese Laid-Open Patent Application No. 9-244018; and FIG. 3 is a schematic perspective view showing the illumination device used in this viewing-angle-controlled liquid crystal display device. As shown in FIG. 2, the second conventional viewing-angle-controlled liquid crystal display device 2101 is composed of a liquid crystal display element 2102, a scatter control element (scatter control means) 2103, and an illumination device (backlight) 2104. The scatter control element 2103 is disposed between the liquid crystal display element 2102 and the illumination device 2104. As shown in FIG. 3, the illumination device 2104 is disposed on the substrate side of the scatter control element 2103, and is provided with an opaque slitted sheet (translucent sheet) 2120 and an irradiating unit 2121. A fluorescent tube or other light source 2122 is provided to the irradiating unit 2121, and a light-emitting surface 2123 for emitting the light from the light source 2122 and guiding the light to the opaque slitted sheet 2120 is formed. A reflecting sheet 2124 for reflecting the light from the light source 2122 is provided in the irradiating unit 2121 on the surface facing the light-emitting surface 2123. In the opaque slitted sheet 2120, a plurality of linear opaque members are arrayed parallel to each other on one surface of a translucent sheet. The extension direction of the opaque members coincides with the vertical direction of the display screen.

In the second conventional viewing-angle-controlled liquid crystal display device configured as described in Japanese Laid-Open Patent Application No. 9-244018, the light emitted from the light source 2122 is emitted from the light-emitting surface 2123 of the irradiating unit 2121, and is radiated to the scatter control element 2103 via the opaque slitted sheet 2120. When the light emitted from the light-emitting surface 2123 passes through the opaque slitted sheet 2120, the opaque slitted sheet 2120 blocks light incident from directions that are significantly tilted with respect to the light-incident surface of the opaque slitted sheet 2120. Transmitted light is thereby obtained that is highly parallel to the direction perpendicular to the surface of the opaque slitted sheet 2120. The light emitted from the illumination device 2104 then enters the scatter control element 2103. The scatter control element 2103 controls the scattering properties of the incident light rays according to the presence of an applied voltage. When the scatter control element 2103 is in a scattering state, the light emitted from the illumination device 2104 is scattered by the scatter control element 2103, whereas when the scatter control element 2103 is in a transparent state, the light from the illumination device 2104 is not scattered.

In the second conventional viewing-angle-controlled liquid crystal display device 2101 configured as described above, the highly collimated light emitted from the illumination device 2104 is scattered by the scatter control element 2103 and caused to enter the liquid crystal display element 2102 when the scatter control element 2103 is in the scattering state. As a result, the light that has passed through the liquid crystal display element 2102 is released in all directions in the viewing angle of the display unit, and it is possible to recognize the displayed content also from positions other than the position directly in front of the display unit. In contrast, when the scatter control element 2103 is in the transparent state, the highly collimated light emitted from the illumination device 2104 is caused to enter the liquid crystal display element 2102 while still maintaining a high degree of collimation, without being scattered by the scatter control element 2103. As a result, light is not transmitted to positions where the display unit is viewed at an angle to the left or right in the horizontal direction, the screen is darkened when viewed from such a position, and it becomes impossible to recognize the displayed content. In other words, only an observer who is directly facing the display unit can recognize the displayed content.

As described above, since the scattering properties of the light can be controlled by the scatter control element 2103 in the second conventional viewing-angle-controlled liquid crystal display device 2101, the viewing angle characteristics of the displayed content can be controlled. Furthermore, since highly collimated light can be emitted towards the liquid crystal display element 2102 by the illumination device 2104, it is possible to reliably obtain viewing angle characteristics in which only an observer directly facing the display unit can recognize the displayed content when the scatter control element 2103 is placed in the transparent state. Consequently, it is possible to obtain a liquid crystal display device that is capable of arbitrarily switching between a state in which display characteristics are uniformly maintained in all viewing angle directions with little dependence on viewing angle, and a state in which the displayed content can be recognized only from a position directly facing the display unit.

Display devices have thus been proposed in the past that are capable of switching between a display having a wide range of viewing angles that can be appreciated by multiple people simultaneously, and a display having a narrow range of viewing angles that can be viewed only by the user, by using a scatter control element for controlling scattering properties in order to control the viewing angle characteristics of the display device.

However, the conventional techniques described above have such problems as those described below. In the conventional viewing-angle-controlled liquid crystal display device, an abnormal increase in luminance occurs in some regions of the display screen, which sometimes reduces the quality of the display. Specifically, a portion of the display screen becomes abnormally bright in some display devices.

SUMMARY OF THE INVENTION

An object of the present invention is to provide a viewing-angle-controlled display device capable of preventing an abnormal increase in luminance in the display screen; to provide a terminal device in which this display device is installed; to provide a light source device mounted to the display device; and to provide an optical member.

The display device according to a first aspect of the present invention comprises a planar light source for emitting light in a plane; a transparent/scattering state switching element capable of switching between a state for transmitting light emitted from the light source unit, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a region in which the seal member is disposed in the transparent/scattering state switching element is not transparent, as viewed from a direction perpendicular to a surface of the display panel.

The feature of the display device of the present invention is that the luminance of light that has passed through the region in which the seal member is disposed in the transparent/scattering state switching element is lowered than before the light passed through this region.

In the present invention, even when misalignment occurs between the transparent/scattering state switching element and the display panel, and light passing through the region in which the seal member is disposed in the transparent/scattering state switching element enters the display region of the display panel, this region is not transparent, and the luminance of light that has passed through this region is therefore lower than before the light passed through this region. Therefore, it is possible to mitigate the phenomenon whereby an abnormally bright portion appears in the display screen, and to suppress a reduction in display quality caused by misalignment.

The display device according to a second aspect of the present invention comprises a planar light source for emitting light in a plane; a transparent/scattering state switching element capable of switching between a state for transmitting light emitted from the light source unit, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has scattering properties that yield a degree of scattering equal to a degree of scattering of the transparent/scattering state switching layer in the scattering state.

In the present invention, since the degree of scattering of the seal member is set so as to be equal to the degree of scattering of the transparent/scattering state switching layer, an abnormally bright area does not occur in the display screen, and there is no reduction in display quality caused by misalignment. Satisfactory display quality can therefore be obtained.

The display device according to a third aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has scattering properties that yield a degree of scattering greater than a degree of scattering of the transparent/scattering state switching layer in the scattering state.

In the present invention, the luminance in the frontal direction can be further reduced in the seal member portion, and the occurrence of abnormally bright areas can therefore be more reliably reduced.

The display device according to a fourth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a region overlapping the seal member in at least one of the transparent substrates, as viewed from a direction perpendicular to a surface of the display panel.

The display device according to a fifth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein an uneven shape is formed in a region overlapping the seal member in a surface of at least one of the transparent substrates, as viewed from a direction perpendicular to a surface of the display panel.

The display device according to a sixth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a scattering double-sided adhesive tape that is non-transparent and disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the display panel.

In the present invention, it is possible to reduce the occurrence of abnormally bright areas in the display screen during wide-angle display, and to minimize a reduction in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified to prevent misalignment between these regions, and these regions can instead be aligned merely based on external shape, for example. It is therefore possible to reduce manufacturing costs. Since a transparent seal member may also be used as the seal member of the transparent/scattering state switching element, the number of options available for selecting a seal member can be increased, and it is possible to utilize a seal member that has better performance with regard to reliability and other characteristics.

The display device according to a seventh aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a scattering double-sided adhesive tape that has scattering properties and is disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the display panel, and a degree of scattering of the scattering double-sided adhesive tape is the same as a degree of scattering of the transparent/scattering state switching layer in the scattering state.

In the present invention, since the degree of scattering of the scattering double-sided adhesive tape is set to be equal to the degree of scattering of the transparent/scattering state switching element in the scattering state, an abnormally bright area does not occur in the display screen, and there is no reduction in display quality caused by misalignment. Satisfactory display quality can therefore be obtained.

The display device according to an eighth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a scattering double-sided adhesive tape that has scattering properties and is disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the display panel, and a degree of scattering of the scattering double-sided adhesive tape is greater than a degree of scattering of the transparent/scattering state switching layer in the scattering state.

In the present invention, the luminance in the frontal direction can be further reduced in the seal member portion, and the occurrence of abnormally bright areas can therefore be more reliably reduced.

The scattering double-sided adhesive tape may also be disposed between the transparent/scattering state switching element and the display panel, and the transparent/scattering state switching element and the display panel may be fixed relative to each other by the scattering double-sided adhesive tape. The impact resistance of the display panel and the transparent/scattering state switching element can thereby be enhanced.

The display device according to a ninth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a transparent/scattering double-sided adhesive tape disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the display panel, and a portion overlapping the transparent/scattering state switching layer is transparent.

In the present invention, it is possible to reduce the occurrence of abnormally bright areas in the display screen during wide-angle display, and to minimize a reduction in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified to prevent misalignment between these regions, and these regions can instead be aligned merely based on external shape, for example. It is therefore possible to reduce manufacturing costs. Since a transparent seal member may also be used as the seal member of the transparent/scattering state switching element, the number of options available for selecting a seal member can be increased, and it is possible to utilize a seal member that has better performance with regard to reliability and other characteristics. The transparent/scattering state switching element and the display panel are also bonded together on the entire surface thereof by the transparent/scattering double-sided adhesive tape, and are thereby strengthened against mechanical impacts. Since the transparent portion of the transparent/scattering double-sided adhesive tape creates optical bonding also in the display region, it is possible to reduce the amount of light lost to reflection on the surface of the transparent/scattering state switching element and the surface of the display panel.

The display device according to a tenth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a transparent/scattering double-sided adhesive tape disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the display panel; a portion overlapping the transparent/scattering state switching layer is transparent; and a degree of scattering of the portion overlapping the seal member is the same as a degree of scattering of the transparent/scattering state switching layer in the scattering state.

In the present invention, since the degree of scattering of the scattering region of the transparent/scattering double-sided adhesive tape is set to be equal to the degree of scattering of the transparent/scattering state switching element in the scattering state, an abnormally bright area does not occur in the display screen, and there is no reduction in display quality caused by misalignment. Satisfactory display quality can therefore be obtained.

The display device according to an eleventh aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a transparent/scattering double-sided adhesive tape disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the display panel; a portion overlapping the transparent/scattering state switching layer is transparent; and a degree of scattering of the portion overlapping the seal member is greater than a degree of scattering of the transparent/scattering state switching layer in the scattering state.

In the present invention, the luminance in the frontal direction can be further reduced in the seal member portion, and the occurrence of abnormally bright areas can therefore be more reliably reduced.

The display device according to a twelfth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed.

In the present invention, it is possible to reduce the occurrence of abnormally bright areas in the display screen, and to minimize a reduction in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified to prevent misalignment between these regions, and these regions can instead be aligned merely based on external shape, for example. It is therefore possible to reduce manufacturing costs. Since the light-absorbing seal member does not have light-scattering properties, effects are also obtained whereby light/leakage in a tilted direction is prevented, particularly during the narrow-angle state.

The display device according to a thirteenth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed, and an optical density of the seal member is set so that a frontal luminance of light emitted from the seal member is equal to a frontal luminance of light emitted from the transparent/scattering state switching layer in the scattering state.

In the present invention, since the optical concentration of the seal member of the transparent/scattering state switching element is set to be equal to the luminance in the frontal direction on the transparent/scattering state switching element in the scattering state, an abnormally bright area does not occur in the display screen, and there is no reduction in display quality caused by misalignment. Satisfactory display quality can therefore be obtained.

The display device according to a fourteenth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed, and an optical density of the seal member is set so that a frontal luminance of light emitted from the seal member is lower than a frontal luminance of light emitted from the transparent/scattering state switching layer in the scattering state.

In the present invention, the luminance in the frontal direction can be further reduced in the seal member portion, and the occurrence of abnormally bright areas can therefore be more reliably reduced.

The seal member may also be colorless. Abnormal coloration in the display screen can thereby be prevented.

Alternatively, the seal member may be black. This makes it possible to more reliably prevent the occurrence of an abnormally bright area.

The display device according to a fifteenth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, a transparent/scattering state switching layer that is capable of switching between a state for transmitting incident light and a state for scattering incident light and that is enclosed in a region sealed by the seal member between the two transparent substrates, and a light-shielding layer for blocking light; and wherein a shape of the light-shielding layer is the same as a shape of the seal member, as viewed from a direction perpendicular to a surface of the display panel.

In the present invention, it is possible to prevent the occurrence of abnormally bright areas in the display screen during wide-angle display, and to minimize a reduction in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified to prevent misalignment between these regions, and these regions can instead be aligned merely based on external shape, for example. It is therefore possible to reduce manufacturing costs. Since a transparent seal member may also be used as the seal member of the transparent/scattering state switching element, the number of options available for selecting a seal member can be increased, and it is possible to utilize a seal member that has better performance with regard to reliability and other characteristics. There is also no need for a special double-sided tape, the number of options available for selecting a member can therefore be increased, and it is possible to utilize a tape that has better performance with regard to adhesion and other characteristics. Effects are also obtained whereby light leakage in a tilted direction is prevented during the narrow-angle state.

The light-shielding layer is preferably formed on a surface of one of the transparent substrates that is opposite the other of the transparent substrates. The light-shielding layer can thereby be formed simultaneously with the markings needed during fabrication of the transparent/scattering state switching element, and the cost of the element can therefore be reduced.

The display device according to a sixteenth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a light-absorbing double-sided adhesive tape that absorbs light and is disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the display panel.

In the present invention, it is possible to reduce the occurrence of abnormally bright areas in the display screen during wide-angle display, and to minimize a reduction in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified to prevent misalignment between these regions, and these regions can instead be aligned merely based on external shape, for example. It is therefore possible to reduce manufacturing costs. Since a transparent seal member may also be used as the seal member of the transparent/scattering state switching element, the number of options available for selecting a seal member can be increased, and it is possible to utilize a seal member that has better performance with regard to reliability and other characteristics. There is also no need for a special double-sided tape, the number of options available for selecting a member can therefore be increased, and it is possible to utilize a tape that has better performance with regard to adhesion and other characteristics. Effects are also obtained whereby light leakage in a tilted direction is prevented during the narrow-angle state.

The display device according to a seventeenth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a light-absorbing double-sided adhesive tape that absorbs light and is disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the display panel, and an optical density of the light-absorbing double-sided adhesive tape is set so that a frontal luminance of light emitted from the light-absorbing double-sided adhesive tape is equal to a frontal luminance of light emitted from the transparent/scattering state switching layer in the scattering state.

In the present invention, since the optical concentration of the light-absorbing double-sided adhesive tape is set so that the degree of scattering is equal to the luminance in the frontal direction on the transparent/scattering state switching element in the scattering state, an abnormally bright area does not occur in the display screen, and there is no reduction in display quality caused by misalignment. Satisfactory display quality can therefore be obtained.

The display device according to an eighteenth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a light-absorbing double-sided adhesive tape that absorbs light and is disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the display panel, and an optical density of the light-absorbing double-sided adhesive tape is set so that a frontal luminance of light emitted from the light-absorbing double-sided adhesive tape is lower than a frontal luminance of light emitted from the transparent/scattering state switching layer in the scattering state.

In the present invention, the luminance in the frontal direction can be further reduced in the seal member portion, and the occurrence of abnormally bright areas can therefore be more reliably reduced.

The light-absorbing double-sided adhesive tape may be disposed between the transparent/scattering state switching element and the display panel, and the transparent/scattering state switching element and the display panel may be fixed relative to each other by the light-absorbing double-sided adhesive tape. The impact resistance of the display panel and the transparent/scattering state switching element can thereby be enhanced.

The light-absorbing double-sided adhesive tape may be colorless. Abnormal coloration in the display screen can thereby be prevented.

Alternatively, the light-absorbing double-sided adhesive tape may be black. This makes it possible to more reliably suppress the occurrence of an abnormally bright area.

The display device according to a nineteenth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a transparent/light-absorbing double-sided adhesive tape disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, as viewed from a direction perpendicular to a surface of the display panel, and a portion overlapping the transparent/scattering state switching layer is transparent.

In the present invention, it is possible to reduce the occurrence of abnormally bright areas in the display screen during wide-angle display, and to minimize a reduction in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified to prevent misalignment between these regions, and these regions can instead be aligned merely based on external shape, for example. It is therefore possible to reduce manufacturing costs. Since a transparent seal member may also be used as the seal member of the transparent/scattering state switching element, the number of options available for selecting a seal member can be increased, and it is possible to utilize a seal member that has better performance with regard to reliability and other characteristics. The transparent/scattering state switching element and the display panel are also bonded together on the entire surface thereof by the transparent/light-absorbing double-sided adhesive tape, and are thereby strengthened against mechanical impacts. Since the transparent portion of the transparent/light-absorbing double-sided adhesive tape creates optical bonding also in the display region, it is possible to reduce the amount of light lost to reflection on the surface of the transparent/scattering state switching element and the surface of the display panel. Effects are also obtained whereby light leakage in a tilted direction is prevented during the narrow-angle state.

The display device according to a twentieth aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a transparent/light-absorbing double-sided adhesive tape disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, as viewed from a direction perpendicular to a surface of the display panel; a portion overlapping the transparent/scattering state switching layer is transparent; and an optical density of the portion overlapping the seal member is set so that a frontal luminance of light emitted from this portion is equal to a frontal luminance of light emitted from the transparent/scattering state switching layer in the scattering state.

In the present invention, since the optical concentration of the light-absorbing region of the transparent/light-absorbing double-sided adhesive tape is set to be equal to the luminance in the frontal direction on the transparent/scattering state switching element in the scattering state, an abnormally bright area does not occur in the display screen, and there is no reduction in display quality caused by misalignment. Satisfactory display quality can therefore be obtained.

The display device according to a twenty-first aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a transparent/light-absorbing double-sided adhesive tape disposed between the planar light source and the display panel; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, as viewed from a direction perpendicular to a surface of the display panel; a portion overlapping the transparent/scattering state switching layer is transparent; and an optical density of the portion overlapping the seal member is set so that a frontal luminance of light emitted from this portion is lower than a frontal luminance of light emitted from the transparent/scattering state switching layer in the scattering state.

In the present invention, the luminance in the frontal direction can be further reduced in the seal member portion, and the occurrence of abnormally bright areas can therefore be more reliably reduced.

The portion of the transparent/light-absorbing double-sided adhesive tape that overlaps the seal member may be colorless. Abnormal coloration in the display screen can thereby be prevented.

Alternatively, the portion of the transparent/light-absorbing double-sided adhesive tape that overlaps the seal member may be black. This makes it possible to more reliably prevent the occurrence of an abnormally bright area.

The display device according to a twenty-second aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member is disposed outside of a display region of the display panel, as viewed from a direction perpendicular to a surface of the display panel.

The margin for misalignment can thereby be enlarged.

The display device according to a twenty-third aspect of the present invention comprises a planar light source for emitting light in a plane; a transparent/scattering state switching element capable of switching between a state for transmitting light emitted from the planar light source, and a state for scattering the light; a display panel for displaying an image by transmitting light emitted from the transparent/scattering state switching element; and a double-sided adhesive tape for fixing the planar light source and the transparent/scattering state switching element relative to each other, or fixing the transparent/scattering state switching element and the display panel relative to each other; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the double-sided adhesive tape is disposed outside of a display region of the display panel, as viewed from a direction perpendicular to a surface of the display panel.

The margin for misalignment can thereby be enlarged.

The display device may further comprise a light-direction regulating element that regulates a direction of light emitted from the planar light source and is disposed between the planar light source and the transparent/scattering state switching element. The directivity of light emitted from the planar light source can thereby be increased, the amount of light in a tilted direction can be reduced when a narrow range is irradiated, and the effects of switching the irradiation range can be enhanced.

The display device according to a twenty-fourth aspect of the present invention comprises a planar light source for emitting light in a plane; a light-direction regulating element for regulating a direction of light emitted from the planar light source; a transparent/scattering state switching element capable of switching between a state for transmitting light emitted from the light-direction regulating element, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein an uneven shape is formed in a region of a surface of the light-direction regulating element that overlaps the seal member, as viewed from a direction perpendicular to a surface of the display panel.

The frontal brightness of an image displayed in the display panel may be adjusted so as to be kept constant by making a light intensity of the planar light source greater when the transparent/scattering state switching element is in the scattering state than when the transparent/scattering state switching element is in the transparent state.

The display panel may be a liquid crystal panel. The liquid crystal panel may also operate in a lateral electric field mode, a multi-domain vertical alignment mode, or a film-compensated TN mode. Contrast inversion of the display can thereby be suppressed and visibility enhanced when the transparent/scattering state switching element is in the scattering state.

The display device according to a twenty-fifth aspect of the present invention comprises a planar light source for emitting light in a plane; a transparent/scattering state switching element capable of switching between a state for transmitting light emitted from the planar light source, and a state for scattering the light; and a display panel for displaying an image by transmitting light emitted from the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a transmittance of light in a region in which the seal member is interposed in a light path that extends from the planar light source to the display panel is lower than a transmittance of light when the transparent/scattering state switching layer is in the transparent state in the area in which the transparent/scattering state switching layer is interposed.

In the present invention, even when there is misalignment between the transparent/scattering state switching element and the display panel, and light that has passed through the seal member of the transparent/scattering state switching element enters the display region of the display panel, the transmittance of light in a region in which the seal member is interposed in a light path that extends from the planar light source to the display panel is lower than a transmittance of light when the transparent/scattering state switching layer is in the transparent state in the area in which the transparent/scattering state switching layer is interposed. Therefore, the luminance of light that has passed through the seal member can be reduced, and it is possible to suppress the occurrence of an abnormally bright area in the display region.

The terminal device according to a twenty-sixth aspect of the present invention comprises the aforementioned display device. This terminal device may be a mobile telephone, a personal information terminal, a gaming device, a digital camera, a video camera, a video player, a notebook-type personal computer, a cash dispenser, or a vending machine. A mobile telephone can be given a narrower profile, particularly by applying the present invention to a seal member disposed in the transverse direction of a mobile telephone.

The light source device according to a twenty-seventh aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a region in which the seal member is disposed in the transparent/scattering state switching element is not transparent, as viewed from a direction perpendicular to a surface of the transparent/scattering state switching element.

The light source device according to a twenty-eighth aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has scattering properties that yield a degree of scattering equal to a degree of scattering of the transparent/scattering state switching layer in the scattering state.

The light source device according to a twenty-ninth aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has scattering properties that yield a degree of scattering greater than a degree of scattering of the transparent/scattering state switching layer in the scattering state.

The light source device according to a thirtieth aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a region overlapping the seal member in at least one of the transparent substrates, as viewed from a direction perpendicular to a surface of the display panel.

The light source device according to a thirty-first aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein an uneven shape is formed in a region overlapping the seal member in a surface of at least one of the transparent substrates, as viewed from a direction perpendicular to a surface of the display panel.

The light source device according to a thirty-second aspect of the present invention comprises a planar light source for emitting light in a plane; a transparent/scattering state switching element capable of switching between a state for transmitting light emitted from the planar light source, and a state for scattering the light; and a scattering double-sided adhesive tape that is non-transparent and is disposed on a side of a light-emitting surface of said planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the transparent/scattering state switching element.

The light source device according to a thirty-third aspect of the present invention comprises a planar light source for emitting light in a plane; a transparent/scattering state switching element capable of switching between a state for transmitting light emitted from the planar light source, and a state for scattering the light; and a scattering double-sided adhesive tape that has scattering properties and is disposed on a side of a light-emitting surface of said planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the transparent/scattering state switching element, and a degree of scattering of the scattering double-sided adhesive tape is the same as a degree of scattering of the transparent/scattering state switching layer in the scattering state.

The light source device according to a thirty-fourth aspect of the present invention comprises a planar light source for emitting light in a plane; a transparent/scattering state switching element capable of switching between a state for transmitting light emitted from the planar light source, and a state for scattering the light; and a scattering double-sided adhesive tape that has scattering properties and is disposed on a side of a light-emitting surface of said planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the transparent/scattering state switching element, and a degree of scattering of the scattering double-sided adhesive tape is greater than a degree of scattering of the transparent/scattering state switching layer in the scattering state.

The light source device according to a thirty-fifth aspect of the present invention comprises a planar light source for emitting light in a plane; a transparent/scattering state switching element capable of switching between a state for transmitting light emitted from the planar light source, and a state for scattering the light; and a transparent/scattering double-sided adhesive tape disposed on a side of a light-emitting surface of said planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the transparent/scattering state switching element, and a portion overlapping the transparent/scattering state switching layer is transparent.

The light source device according to a thirty-sixth aspect of the present invention comprises a planar light source for emitting light in a plane; a transparent/scattering state switching element capable of switching between a state for transmitting light emitted from the planar light source, and a state for scattering the light; and a transparent/scattering double-sided adhesive tape disposed on a side of a light-emitting surface of said planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the transparent/scattering state switching element; a portion overlapping the transparent/scattering state switching layer is transparent; and a degree of scattering of the portion overlapping the seal member is the same as a degree of scattering of the transparent/scattering state switching layer in the scattering state.

The light source device according to a thirty-seventh aspect of the present invention comprises a planar light source for emitting light in a plane; a transparent/scattering state switching element capable of switching between a state for transmitting light emitted from the planar light source, and a state for scattering the light; and a transparent/scattering double-sided adhesive tape disposed on a side of a light-emitting surface of said planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the transparent/scattering state switching element; a portion overlapping the transparent/scattering state switching layer is transparent; and a degree of scattering of the portion overlapping the seal member is greater than a degree of scattering of the transparent/scattering state switching layer in the scattering state.

The light source device according to a thirty-eighth aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed.

The light source device according to a thirty-ninth aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed, and an optical density of the seal member is set so that a frontal luminance of light emitted from the seal member is equal to a frontal luminance of light emitted from the transparent/scattering state switching layer in the scattering state.

The light source device according to a fortieth aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed, and an optical density of the seal member is set so that a frontal luminance of light emitted from the seal member is lower than a frontal luminance of light emitted from the transparent/scattering state switching layer in the scattering state.

The seal member may be colorless.

The seal member may be black.

The light source device according to a forty-first aspect of the present invention comprises a planar light source for emitting light in a plane, and a transparent/scattering state switching element capable of switching between a state for transmitting light emitted from the planar light source, and a state for scattering the light; wherein the transparent/scattering state switching element has two transparent substrates, a seal member disposed between external peripheral portions of the two transparent substrates, a transparent/scattering state switching layer that is capable of switching between a state for transmitting incident light and a state for scattering incident light and that is enclosed in a region sealed by the seal member between the two transparent substrates, and a light-shielding layer for blocking light; and wherein a shape of the light-shielding layer is the same as a shape of the seal member, as viewed from a direction perpendicular to a surface of the transparent/scattering state switching element.

The light-shielding layer is preferably formed on a surface of one of the transparent substrates that is opposite the other of the transparent substrates.

The light source device according to a forty-second aspect of the present invention comprises a planar light source for emitting light in a plane; a transparent/scattering state switching element capable of switching between a state for transmitting light emitted from the planar light source, and a state for scattering the light; and a light-absorbing double-sided adhesive tape that absorbs light and is disposed on a side of a light-emitting surface of the planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the transparent/scattering state switching element.

The light source device according to a forty-third aspect of the present invention comprises a planar light source for emitting light in a plane; a transparent/scattering state switching element capable of switching between a state for transmitting light emitted from the planar light source, and a state for scattering the light; and a light-absorbing double-sided adhesive tape that absorbs light and is disposed on a side of a light-emitting surface of the planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the transparent/scattering state switching element, and an optical density of the light-absorbing double-sided adhesive tape is set so that a frontal luminance of light emitted from the light-absorbing double-sided adhesive tape is equal to a frontal luminance of light emitted from the transparent/scattering state switching layer in the scattering state.

The light source device according to a forty-fourth aspect of the present invention comprises a planar light source for emitting light in a plane; a transparent/scattering state switching element capable of switching between a state for transmitting light emitted from the planar light source, and a state for scattering the light; and a light-absorbing double-sided adhesive tape that absorbs light and is disposed on a side of a light-emitting surface of the planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the transparent/scattering state switching element, and an optical density of the light-absorbing double-sided adhesive tape is set so that a frontal luminance of light emitted from the light-absorbing double-sided adhesive tape is lower than a frontal luminance of light emitted from the transparent/scattering state switching layer in the scattering state.

The light-absorbing double-sided adhesive tape may be colorless.

Alternatively, the light-absorbing double-sided adhesive tape may be black.

The light source device according to a forty-fifth aspect of the present invention comprises a planar light source for emitting light in a plane; a transparent/scattering state switching element capable of switching between a state for transmitting light emitted from the planar light source, and a state for scattering the light; and a transparent/light-absorbing double-sided adhesive tape disposed on a side of a light-emitting surface of the planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, as viewed from a direction perpendicular to a surface of the transparent/scattering state switching element, and a portion overlapping the transparent/scattering state switching layer is transparent.

The light source device according to a forty-sixth aspect of the present invention comprises a planar light source for emitting light in a plane; a transparent/scattering state switching element capable of switching between a state for transmitting light emitted from the planar light source, and a state for scattering the light; and a transparent/light-absorbing double-sided adhesive tape disposed on a side of a light-emitting surface of the planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, a portion overlapping the transparent/scattering state switching layer is transparent, as viewed from a direction perpendicular to a surface of the transparent/scattering state switching element, and an optical density of the portion overlapping the seal member is set so that a frontal luminance of light emitted from this portion is equal to a frontal luminance of light emitted from the transparent/scattering state switching layer in the scattering state.

The light source device according to a forty-seventh aspect of the present invention comprises a planar light source for emitting light in a plane; a transparent/scattering state switching element capable of switching between a state for transmitting light emitted from the planar light source, and a state for scattering the light; and a transparent/light-absorbing double-sided adhesive tape disposed on a side of a light-emitting surface of the planar light source; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, a portion overlapping the transparent/scattering state switching layer is transparent, as viewed from a direction perpendicular to a surface of the transparent/scattering state switching element, and an optical density of the portion overlapping the seal member is set so that a frontal luminance of light emitted from this portion is lower than a frontal luminance of light emitted from the transparent/scattering state switching layer in the scattering state.

The portion of the transparent/light-absorbing double-sided adhesive tape that overlaps the seal member may be colorless.

Alternatively, the portion of the transparent/light-absorbing double-sided adhesive tape that overlaps the seal member may be black.

The light source device may further comprise a light-direction regulating element that regulates a direction of light emitted from the planar light source and is disposed between the planar light source and the transparent/scattering state switching element.

The light source device according to a forty-eight aspect of the present invention comprises a planar light source for emitting light in a plane, a light-direction regulating element for regulating a direction of light emitted from the planar light source, and a transparent/scattering state switching element capable of switching between a state for transmitting light emitted from the light-direction regulating element, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein an uneven shape is formed in a region of a surface of the light-direction regulating element that overlaps the seal member, as viewed from a direction perpendicular to a surface of the transparent/scattering state switching element.

The optical member according to a forty-ninth aspect of the present invention comprises a transparent/scattering state switching element capable of switching between a state for transmitting incident light, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has scattering properties that yield a degree of scattering equal to a degree of scattering of the transparent/scattering state switching layer in the scattering state.

In the present invention, when the optical member is incorporated into a viewing-angle-controlled display device, the appearance of an abnormally bright area in the display screen can be reduced, display quality and manufacturing yield can be enhanced, and manufacturing cost can be reduced.

The optical member according to a fiftieth aspect of the present invention comprises a transparent/scattering state switching element capable of switching between a state for transmitting incident light, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has scattering properties that yield a degree of scattering greater than a degree of scattering of the transparent/scattering state switching layer in the scattering state.

The optical member according to a fifty-first aspect of the present invention comprises a transparent/scattering state switching element capable of switching between a state for transmitting incident light, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a region overlapping the seal member in at least one of the transparent substrates, as viewed from a direction perpendicular to a surface of the transparent/scattering state switching element.

The optical member according to a fifty-second aspect of the present invention comprises a transparent/scattering state switching element capable of switching between a state for transmitting incident light, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein an uneven shape is formed in a region overlapping the seal member in a surface of at least one of the transparent substrates, as viewed from a direction perpendicular to a surface of the transparent/scattering state switching element.

The optical member according to a fifty-third aspect of the present invention comprises a transparent/scattering state switching element capable of switching between a state for transmitting incident light, and a state for scattering the light; and a scattering double-sided adhesive tape that is non-transparent and affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the transparent/scattering state switching element.

The optical member according to a fifty-fourth aspect of the present invention comprises a transparent/scattering state switching element capable of switching between a state for transmitting incident light, and a state for scattering the light; and a scattering double-sided adhesive tape having scattering properties that is affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the transparent/scattering state switching element, and a degree of scattering of the scattering double-sided adhesive tape is the same as a degree of scattering of the transparent/scattering state switching layer in the scattering state.

The optical member according to a fifty-fifth aspect of the present invention comprises a transparent/scattering state switching element capable of switching between a state for transmitting incident light, and a state for scattering the light; and a scattering double-sided adhesive tape having scattering properties that is affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the scattering double-sided adhesive tape is the same as a shape of the seal member, as viewed from a direction perpendicular to a surface of the transparent/scattering state switching element, and a degree of scattering of the scattering double-sided adhesive tape is greater than a degree of scattering of the transparent/scattering state switching layer in the scattering state.

The optical member according to a fifty-sixth aspect of the present invention comprises a transparent/scattering state switching element capable of switching between a state for transmitting incident light, and a state for scattering the light, and a transparent/scattering double-sided adhesive tape affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the transparent/scattering state switching element, and a portion overlapping the transparent/scattering state switching layer is transparent.

The optical member according to a fifty-seventh aspect of the present invention comprises a transparent/scattering state switching element capable of switching between a state for transmitting incident light, and a state for scattering the light, and a transparent/scattering double-sided adhesive tape affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the transparent/scattering state switching element; a portion overlapping the transparent/scattering state switching layer is transparent; and a degree of spattering of the portion overlapping the seal member is the same as a degree of scattering of the transparent/scattering state switching layer in the scattering state.

The optical member according to a fifty-eighth aspect of the present invention comprises a transparent/scattering state switching element capable of switching between a state for transmitting incident light, and a state for scattering the light, and a transparent/scattering double-sided adhesive tape affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is scattered by a portion overlapping the seal member in the transparent/scattering double-sided adhesive tape, as viewed from a direction perpendicular to a surface of the transparent/scattering state switching element; a portion overlapping the transparent/scattering state switching layer is transparent; and a degree of scattering of the portion overlapping the seal member is greater than a degree of scattering of the transparent/scattering state switching layer in the scattering state.

The optical member according to a fifty-ninth aspect of the present invention comprises a transparent/scattering state switching element capable of switching between a state for transmitting incident light, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein the seal member has light absorption properties whereby light is absorbed.

The seal member may be colorless.

Alternatively, the seal member may be black.

The optical member according to a sixtieth aspect of the present invention comprises a transparent/scattering state switching element capable of switching between a state for transmitting incident light, and a state for scattering the light; wherein the transparent/scattering state switching element has two transparent substrates, a seal member disposed between external peripheral portions of the two transparent substrates, a transparent/scattering state switching layer that is capable of switching between a state for transmitting incident light and a state for scattering incident light and that is enclosed in a region sealed by the seal member between the two transparent substrates, and a light-shielding layer for blocking light; and wherein a shape of the light-shielding layer is the same as a shape of the seal member, as viewed from a direction perpendicular to a surface of the transparent/scattering state switching element.

The light-shielding layer is preferably formed on a surface of one of the transparent substrates that is opposite the other of the transparent substrates.

The optical member according to a sixty-first aspect of the present invention comprises a transparent/scattering state switching element capable of switching between a state for transmitting incident light, and a state for scattering the light, and a light-absorbing double-sided adhesive tape that absorbs light and is affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein a shape of the light-absorbing double-sided adhesive tape is the same as a shape of the seal member, as viewed from a direction perpendicular to a surface of the transparent/scattering state switching element.

The light-absorbing double-sided adhesive tape may be colorless.

Alternatively, the light-absorbing double-sided adhesive tape may be black.

The optical member according to a sixty-second aspect of the present invention comprises a transparent/scattering state switching element capable of switching between a state for transmitting incident light, and a state for scattering the light; and a transparent/light-absorbing double-sided adhesive tape affixed to the transparent/scattering state switching element; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein light is absorbed by a portion overlapping the seal member in the transparent/light-absorbing double-sided adhesive tape, as viewed from a direction perpendicular to a surface of the transparent/scattering state switching element, and a portion overlapping the transparent/scattering state switching layer is transparent.

The portion of the transparent/light-absorbing double-sided adhesive tape that overlaps the seal member may be colorless.

Alternatively, the portion of the transparent/light-absorbing double-sided adhesive tape that overlaps the seal member may be black.

The optical member according to a sixty-third aspect of the present invention comprises a light-direction regulating element for regulating a direction of incident light; wherein an uneven shape is formed in an external peripheral portion of a surface of the light-direction regulating element.

The optical member according to a sixty-fourth aspect of the present invention comprises a light-direction regulating element for regulating a direction of incident light, and a transparent/scattering state switching element capable of switching between a state for transmitting light emitted from the light-direction regulating element, and a state for scattering the light; wherein the transparent/scattering state switching element has two transparent substrates, a seal member disposed between external peripheral portions of the two transparent substrates, and a transparent/scattering state switching layer that is capable of switching between a state for transmitting incident light and a state for scattering incident light and that is enclosed in a region sealed by the seal member between the two transparent substrates; and wherein an uneven shape is formed in a region of a surface of the light-direction regulating element that overlaps the seal member, as viewed from a direction perpendicular to a surface of the transparent/scattering state switching element.

The present invention makes it possible to prevent an abnormal increase in luminance from occurring in a viewing-angle-controlled display device.

DESCRIPTION OF THE PREFERRED EMBODIMENTS

The inventors conducted a concentrated investigation of the causes of the abnormal increase in luminance described above. As a result, they discovered that the abnormal increase in luminance described above occurs when there is misalignment between the position of the transparent/scattering state switching element and the position of the display panel when a display device is manufactured using a transparent material as the seal member of the transparent/scattering state switching element. The inventors also discovered that this abnormal increase in luminance is particularly severe when a viewing-angle-controlled display device is placed in the wide-angle state. Following is a detailed description of this discovery.

Figure 1:
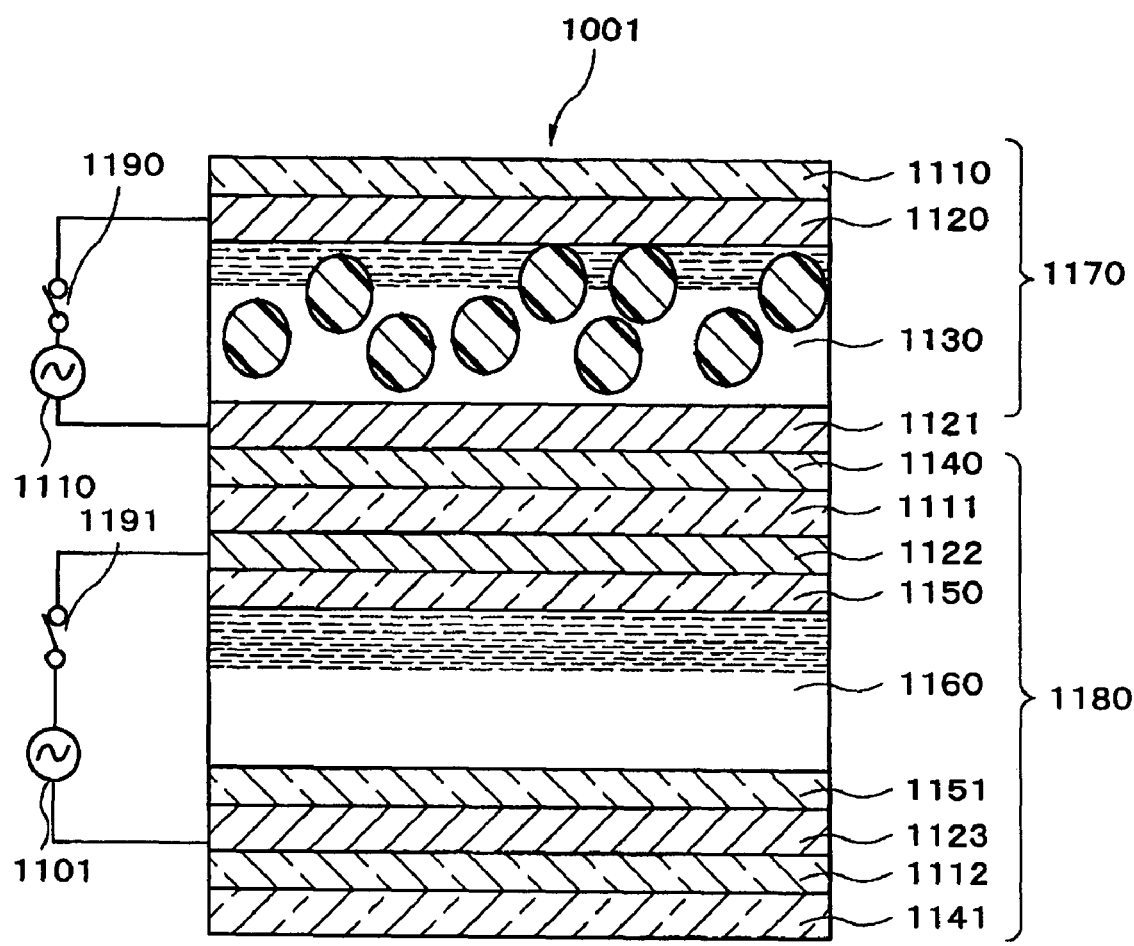
FIG. 1 is a schematic sectional view showing the first conventional viewing-angle-controlled liquid crystal display device described in Japanese Laid-Open Patent Application No. 5-72529.
Figure 2:
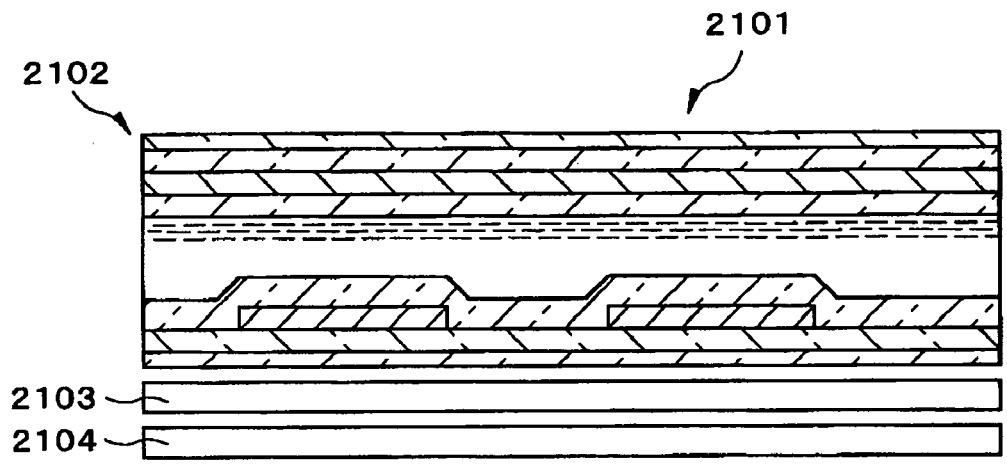
FIG. 2 is a schematic sectional view showing a second conventional viewing-angle-controlled liquid crystal display device described in Japanese Laid-Open Patent Application No. 9-244018.
Figure 3:
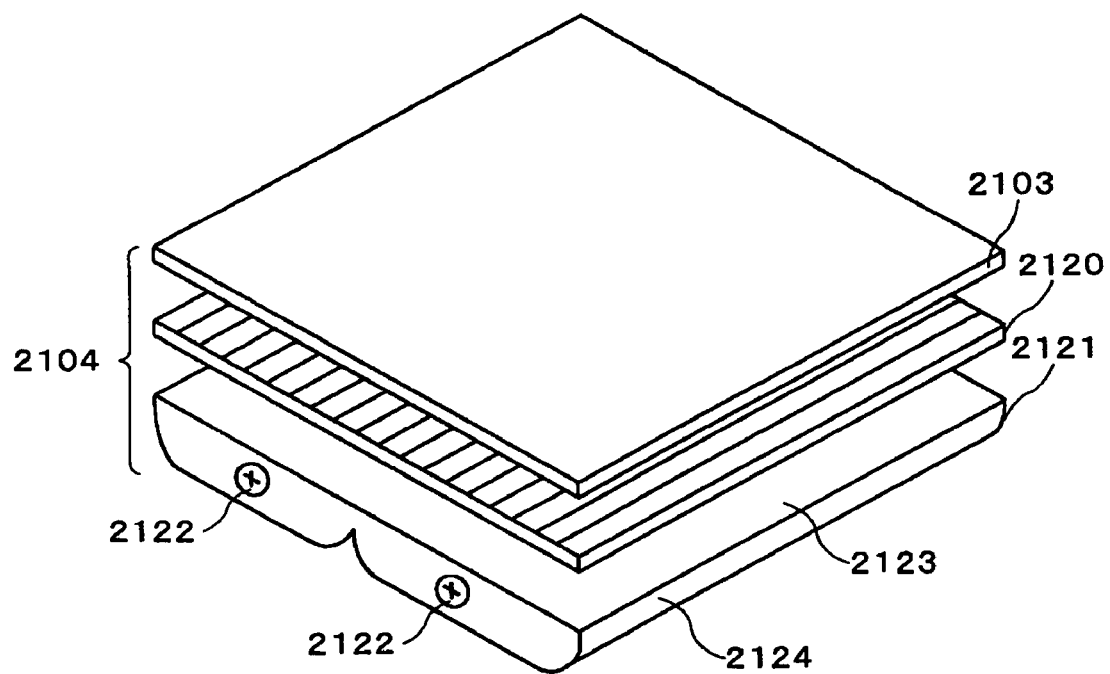
FIG. 3 is a schematic perspective view showing the illumination device used in the viewing-angle-controlled liquid crystal display device.
Figure 4:
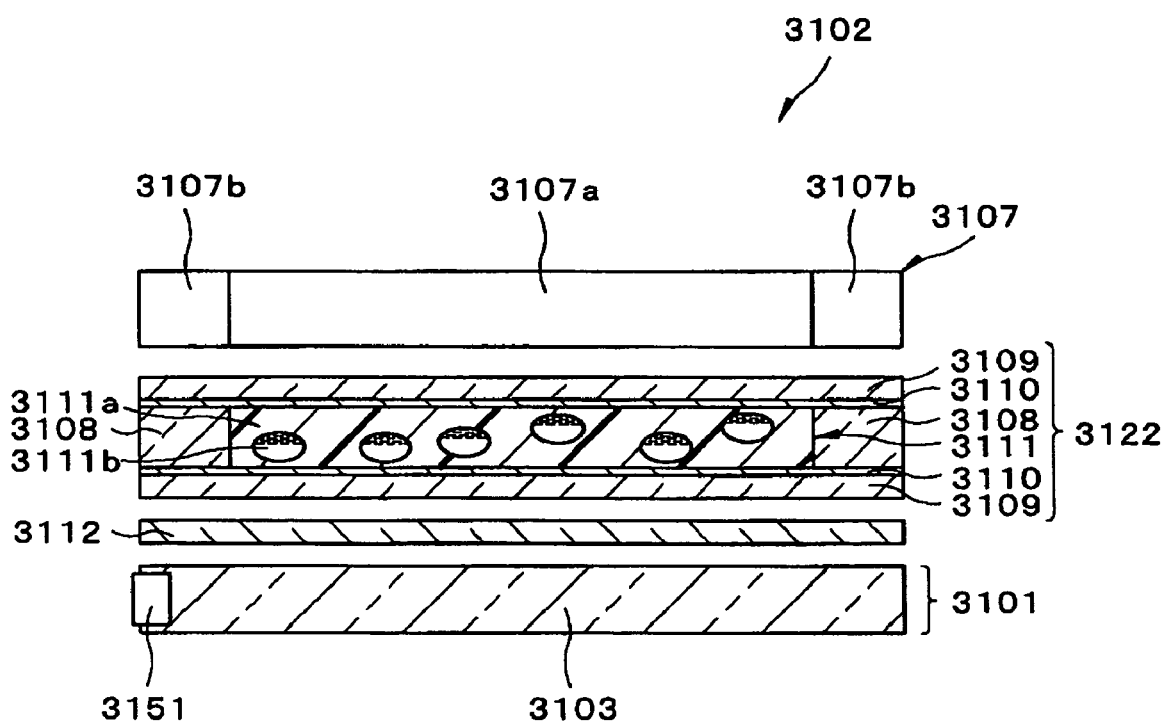
FIG. 4 is a sectional view showing a viewing-angle-controlled liquid crystal display device according to a comparative example.

The composition and operation of a viewing-angle-controlled liquid crystal display device in which an abnormal increase in luminance occurs will first be described as a comparative example. FIG. 4 is a sectional view showing the viewing-angle-controlled display device according to the present comparative example. As shown in FIG. 4, the viewing-angle-controlled liquid crystal display device 3102 according to the present comparative example is provided with a planar light source 3101 for emitting light in a plane, a light-direction regulating element 3112 that increases the directivity of incident light and is disposed on the side of the light-emitting surface of the planar light source 3101; a transparent/scattering state switching element 3122 that switches between a state for transmitting incident light without modification, and a state for scattering and emitting the light, and is disposed on the side of the light-emitting surface of the light-direction regulating element 3112; and a transmissive liquid crystal panel 3107 that displays an image and is disposed on the side of the light-emitting surface of the transparent/scattering state switching element 3122. The center region in the transmissive liquid crystal panel 3107 is a display region 3107a, and the periphery of the display region 3107a is a frame region 3107b.

A light source 3151 and a light-guiding member 3103 are provided to the planar light source 3101. The light source 3151 is composed of an LED (Light-Emitting Diode) disposed on the side of the light-guiding member 3103, for example. The light-guiding member 3103 is a transparent sheet, and light incident from the side surface of the light-guiding member 3103 is emitted from the principal surface thereof. The light-direction regulating element 3112 is a louver, for example, in which transparent areas for transmitting light and absorbent areas for absorbing light are arrayed in alternating fashion in the direction parallel to the surface of the louver. The direction in which the transparent areas and absorbent areas are arrayed is the direction from the light source 3151 to the light-guiding member 3103, i.e., the transverse direction in FIG. 4.

In the transparent/scattering state switching element 3122, two transparent substrates 3109 are provided parallel to and separated from each other, and electrodes 3110 are provided so as to cover the surfaces of the transparent substrates 3109 on the surface of each transparent substrate 3109 that faces another transparent substrate 3109. A transparent seal member 3108 is also provided to the external periphery between the transparent substrates 3109. The transparent seal member 3108 maintains a constant distance between the transparent substrates 3109 and seals the space between the transparent substrates 3109. A PDLC (Polymer Dispersed Liquid Crystal) layer 3111 is provided to the space sealed by the transparent seal member 3108 between the two transparent substrates 3109. Liquid crystal molecules 3111b are dispersed in a polymer matrix 3111a in the PDLC layer 3111.

In this transparent/scattering state switching element 3122, since the apparent refractive index of the polymer matrix 3111a differs from that of the liquid crystal molecules 3111b when an electric field is not applied to the PDLC layer 3111, a scattering state occurs in which the incident light is scattered and emitted. When an electric field is applied by a pair of electrodes 3110 to the PDLC layer 3111 held between the electrodes, the liquid crystal molecules 3111b in the PDLC layer 3111 change orientation, and the apparent refractive indices of the liquid crystal molecules 3111b and the polymer matrix 3111a are substantially the same. A transparent state therefore occurs in which the incident light is emitted without being scattered.

As viewed from the front, i.e., the direction perpendicular to the display screen of the transmissive liquid crystal panel 3107, the outer edge of the PDLC layer 3111 of the transparent/scattering state switching element 3122 is positioned somewhat further outside than the outer edge of the display region 3107a of the transmissive liquid crystal panel 3107. However, the distance between the outer edges of the PDLC layer 3111 and the display region 3107a as viewed from the front is made as small as possible in order for the light outputted from the light source 3151 to be utilized with the highest possible efficiency.

Figure 5:
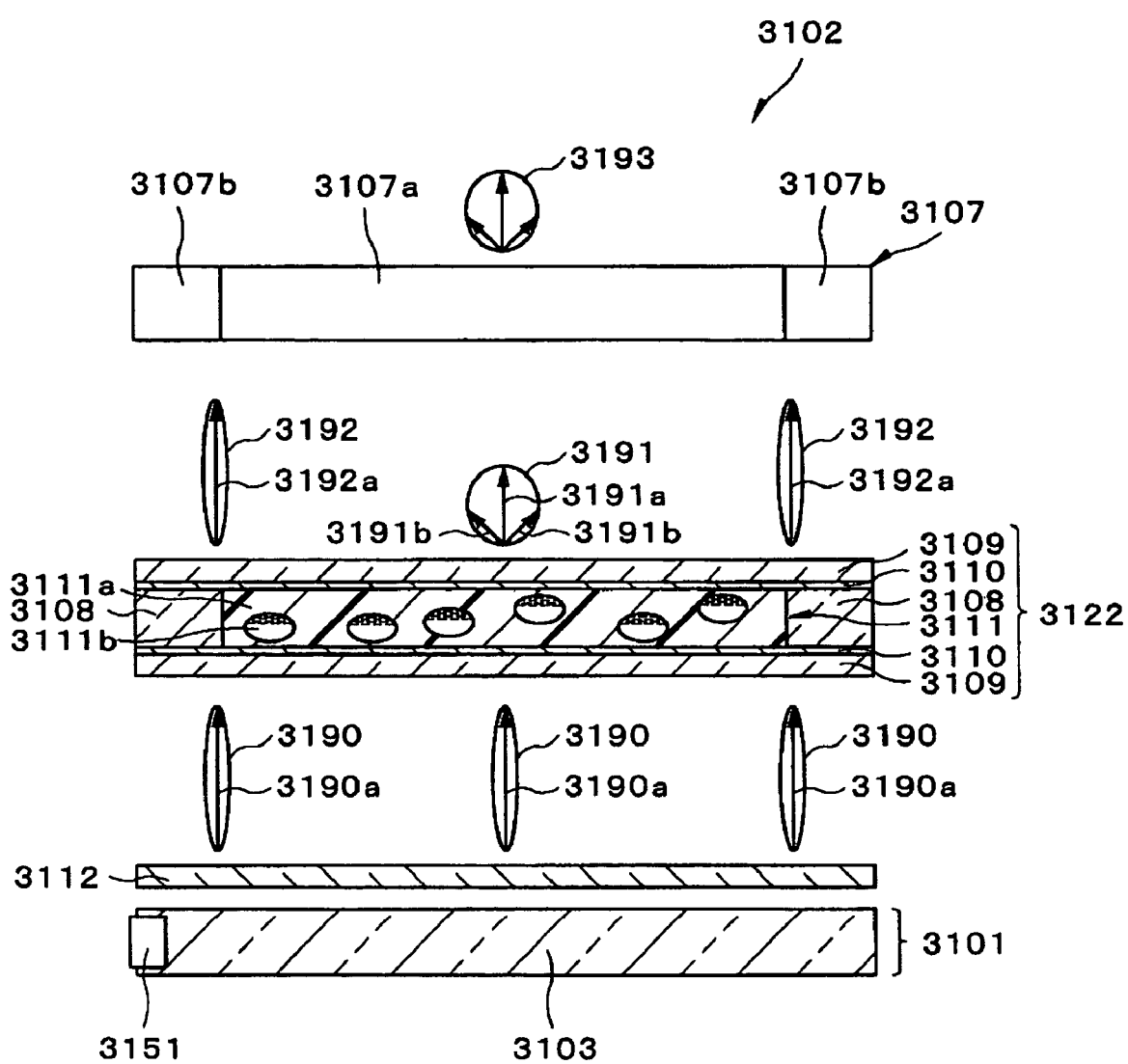
FIG. 5 is a sectional view showing the operation during wide-angle display in the viewing-angle-controlled liquid crystal display device.

The operation of the viewing-angle-controlled liquid crystal display device 3102 according to the present comparative example will next be described. A case will first be described in which there is no misalignment in the transverse direction between the transparent/scattering state switching element 3122 and the transmissive liquid crystal panel 3107. The case of wide-angle display will be described. FIG. 5 is a sectional view showing the operation during wide-angle display in this viewing-angle-controlled liquid crystal display device. During wide-angle display, a voltage is not applied to the transparent/scattering state switching element 3122, and a scattering state is in effect.

As shown in FIG. 5, when the light source 3151 turns on, the light emitted from the light source 3151 is propagated through the light-guiding member 3103 and emitted in a plane from the light-emitting surface of the light-guiding member 3103. This light then enters the light-direction regulating element 3112 and is endowed with increased directivity. In FIG. 5, the degree of directivity of light is indicated as a luminous flux 3190. Specifically, the luminous flux 3190 of the light emitted from the light-direction regulating element 3112 has only a frontally directed component 3190a, and has high directivity in the frontal direction. The component 3190a is indicated as a vector whose length shows the strength of the component.

This light enters the transparent/scattering state switching element 3122. Since the transparent/scattering state switching element 3122 is in the scattering state with no voltage applied between the electrodes 3110, the incident high-directivity light is evenly scattered by the transparent/scattering state switching element 3122 and dispersed in a wide range of angles. Specifically, the light whose directivity is increased by the light-direction regulating element 3112 is scattered by the transparent/scattering state switching element 3122, the directivity of the light is reduced, and the angle of the light is widened. The luminous flux 3191 of the light emitted from the transparent/scattering state switching element 3122 has a frontally directed component 3191a as well as components 3191b that are oriented in a direction (tilted direction) that is tilted away from the frontal direction. The strength of each component is lower than that of component 3190a of the luminous flux 3190 prior to when the light entered the transparent/scattering state switching element 3122.

The light that exits the light-direction regulating element 3112 and enters the transparent seal member 3108 of the transparent/scattering state switching element 3122 passes substantially unchanged through the transparent seal member 3108, and exits from the transparent/scattering state switching element 3122 while retaining high directivity. The luminous flux of this light is indicated as luminous flux 3192. The strength distribution of luminous flux 3192 is substantially the same as that of luminous flux 3190.

The light emitted from the transparent/scattering state switching element 3122 enters the transmissive liquid crystal panel 3107. At this time, the light emitted from the PDLC layer 3111 of the transparent/scattering state switching element 3122, i.e., the low-directivity light indicated by luminous flux 3191, enters the display region 3107a of the transmissive liquid crystal panel 3107, an image is associated with the light, and the light is emitted from the transmissive liquid crystal panel 3107 as wide-angle light such as indicated by luminous flux 3193. An image is thus displayed in a wide viewing angle. The light emitted from the transparent seal member 3108, i.e., the high-directivity light indicated by luminous flux 3192, enters the frame region 3107b of the transmissive liquid crystal panel 3107, and is blocked.

Figure 6:
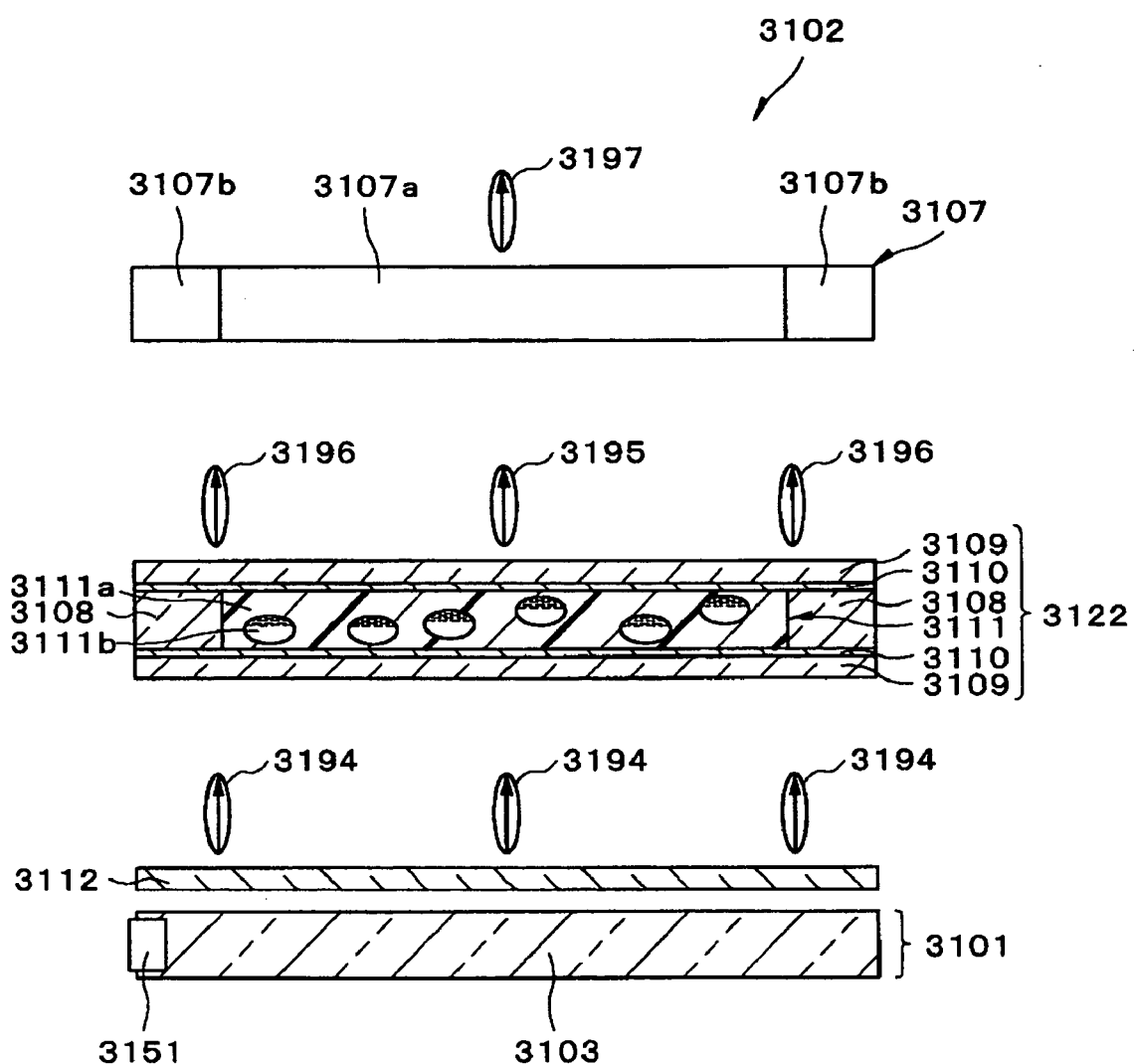
FIG. 6 is a sectional view showing the operation during narrow-angle display in the viewing-angle-controlled liquid crystal display device.

The case of narrow-angle display will next be described. FIG. 6 is a sectional view showing the operation during narrow-angle display in this viewing-angle-controlled liquid crystal display device. During narrow-angle display, a voltage is applied between the electrodes 3110 so as to place the transparent/scattering state switching element 3122 in the transparent state. The operation until the light emitted from the light source 3151 enters the transparent/scattering state switching element 3122 is the same as the previously described operation during wide-angle display. Specifically, high-directivity light indicated by luminous flux 3194 is emitted from the light-direction regulating element 3112.

Since the transparent/scattering state switching element 3122 is in the transparent state with a voltage applied between the electrodes 3110, the incident high-directivity light is transmitted without being scattered by the transparent/scattering state switching element 3122. Specifically, the light whose directivity is increased by the light-direction regulating element 3112 is emitted from the transparent/scattering state switching element 3122 while still maintaining high directivity. In this case, the directivity of light that has passed through the transparent seal member 3108 of the transparent/scattering state switching element 3122 is substantially equal to the directivity of light that has passed through the PDLC layer 3111. Specifically, the strength distribution of luminous flux 3196 is substantially the same as the strength distribution of luminous flux 3195.

The high-directivity light emitted from the transparent/scattering state switching element 3122 enters the transmissive liquid crystal panel 3107, an image is associated with the light, and the light is emitted from the display region 3107a while retaining high directivity. An image is thus displayed in a narrow viewing angle.

In the viewing-angle-controlled liquid crystal display device 3102 thus configured, when the intensity of the light source 3151 is the same both during the narrow-angle display and during the wide-angle display, the frontal luminance is reduced in the state of wide-angle display compared to the state of narrow-angle display. The reason for this is that the light emitted from the transmissive liquid crystal panel 3107 narrow-angle display retains the increased directivity caused by the light-direction regulating element 3112, and most of the light proceeds in the frontal direction. By contrast, during wide-angle display, the light whose directivity is increased by the light-direction regulating element 3112 is scattered by the transparent/scattering state switching element 3122, the intensity of light proceeding in the frontal direction is therefore reduced, and the frontal luminance decreases in relative terms.

It is preferable for the main user in the frontal direction to not experience any change in luminance between narrow-angle display and wide-angle display. Therefore, in order to prevent the frontal luminance from decreasing during the switch from narrow-angle display to wide-angle display, the current that flows to the LED constituting the light source 3151 must be increased so that the intensity of the LED is increased, and the frontal luminance is prevented from decreasing. In the same manner, when switching from wide-angle display to narrow-angle display, the amount of current that flows to the LED constituting the light source 3151 is reduced, and the intensity of the LED is reduced in order to prevent a significant increase in the frontal luminance. Switching between narrow-angle display and wide-angle display is thus accomplished by switching the transparent/scattering state of the transparent/scattering state switching element 3122, and switching the emission intensity of the light source 3151.

Figure 7:
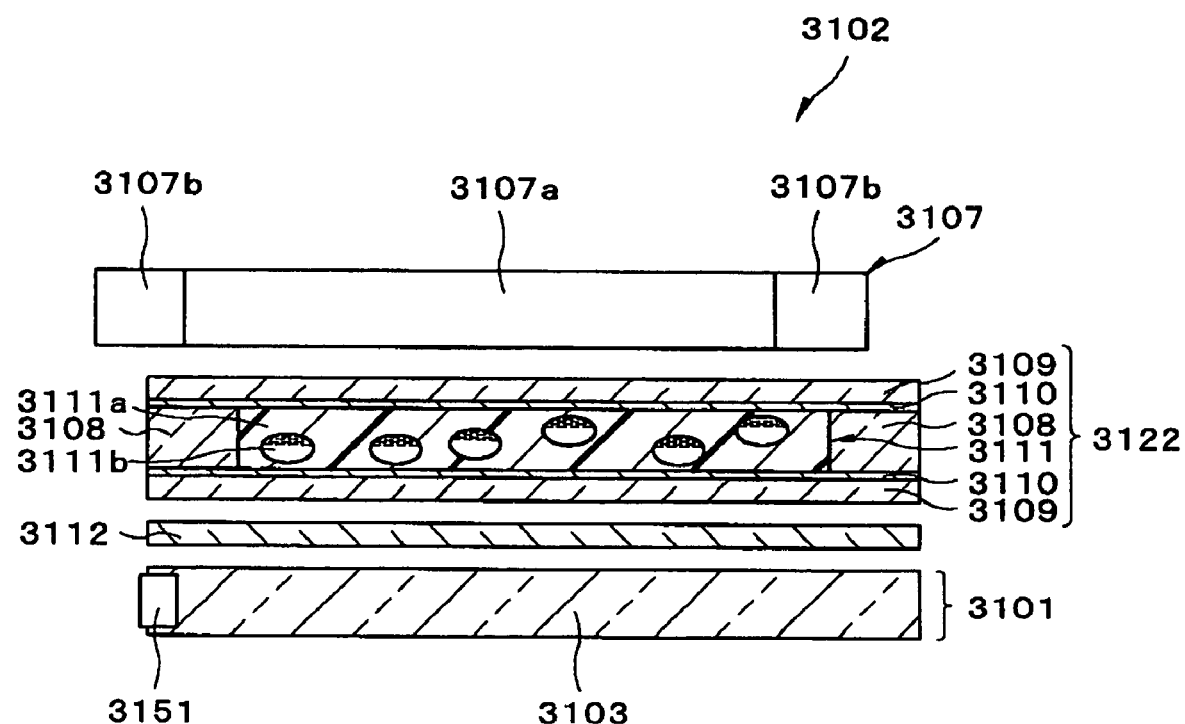
FIG. 7 is a sectional view showing a case in which there is misalignment in the transverse direction between the transparent/scattering state switching element and the transmissive liquid crystal panel in the abovementioned viewing-angle-controlled liquid crystal display device.

A case will next be described in which there is misalignment in the transverse direction between the transparent/scattering state switching element 3122 and the transmissive liquid crystal panel 3107. FIG. 7 is a sectional view showing a case in which there is misalignment in the transverse direction between the transparent/scattering state switching element 3122 and the transmissive liquid crystal panel 3107 in the abovementioned viewing-angle-controlled liquid crystal display device 3102. When there is no misalignment, the transparent seal member 3108 of the transparent/scattering state switching element 3122 does not protrude out into the display region 3107a of the transmissive liquid crystal panel 3107 as viewed from the front. However, when there is misalignment in the transverse direction, the transparent seal member 3108 protrudes into a portion of the display region 3107a as shown in FIG. 7. Specifically, when the display device is observed from the frontal direction that is the direction normal to the display surface, the transparent seal member 3108 is visible in a portion of the display region 3107a.

Figure 8:
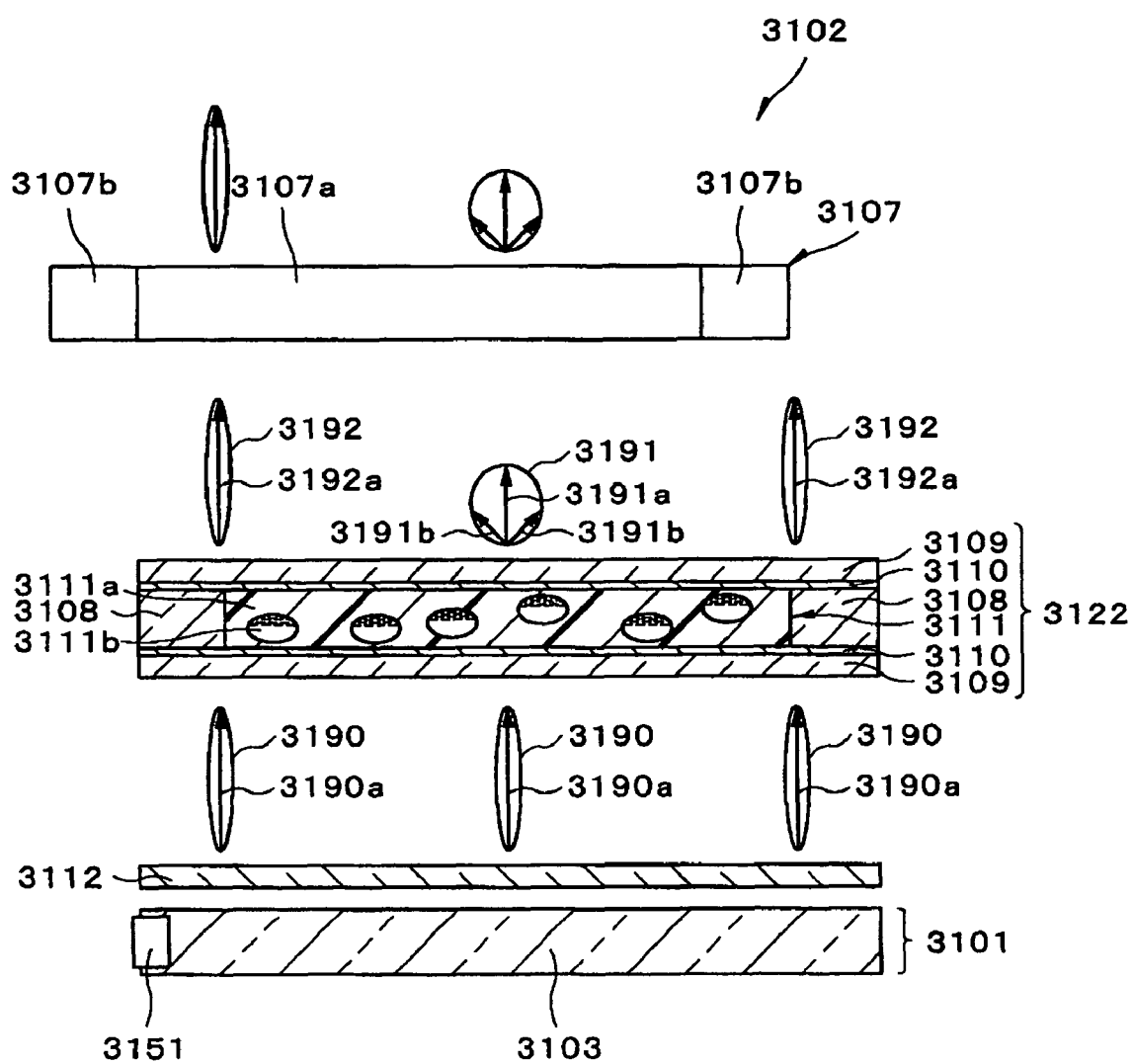
FIG. 8 is a sectional view showing the operation of the viewing-angle-controlled liquid crystal display device shown in FIG. 7.

In the viewing-angle-controlled liquid crystal display device having this type of misalignment, the transparent seal member 3108 protruding into a portion of the display region 3107a causes optical problems. FIG. 8 is a sectional view showing the operation of the viewing-angle-controlled liquid crystal display device shown in FIG. 7. As shown in FIG. 8, since the output of the light source 3151 is increased during wide-angle display, the light that has passed through the light-direction regulating element 3112 is in a distribution having a high-luminance component in the frontal direction.

When this light enters the transparent/scattering state switching element 3122, the light incident on the PDLC layer 3111 is scattered by the PDLC layer that is in the scattering state, and the strength of the frontally directed component 3191a decreases to a set value. In contrast, the light incident on the transparent seal member 3108 is emitted from the transparent/scattering state switching element 3122 without being scattered. Specifically, the light is emitted as luminous flux 3192 having a high-luminance component 3192a in the frontal direction, and is incident on the transmissive liquid crystal panel 3107. At this time, most of the light passing through the transparent seal member 3108 is blocked by the frame region 3107b of the transmissive liquid crystal panel 3107, and is not visible to an observer. However, when misalignment occurs as described above, a portion of the light passing through the transparent seal member 3108 enters the display region 3107a, passes through the display region 3107a without being blocked, and is visible to the observer.

Since this light has a high luminance in the frontal direction compared to the light passing through the PDLC layer 3111, it appears when observed from the frontal direction that an abnormally bright region has occurred in a portion of the display screen, thereby reducing the display quality. A display device in which this phenomenon occurs is therefore determined to be defective in outgoing inspections. Manufacturing yields of the display device are therefore significantly reduced by this phenomenon. In order to minimize misalignment and enhance manufacturing yield, precision alignment may be performed so that misalignment does not occur during packaging. However, in order to obtain a precise alignment, a packaging device is required to identify the transparent seal member of the transparent/scattering state switching element and the display region of the transmissive liquid crystal panel, and to perform high-precision alignment to ensure that there is no misalignment between these two components. Manufacturing costs are significantly increased by the high cost of this type of high-precision packaging device.

The case described above is of a viewing-angle-controlled liquid crystal display device composed of a backlight, a light-direction regulating element, a transparent/scattering state switching element, and a transmissive liquid crystal panel, but the same phenomenon causes problems in a display device that is essentially composed of a transparent/scattering state switching element and a display panel.

Figure 9:
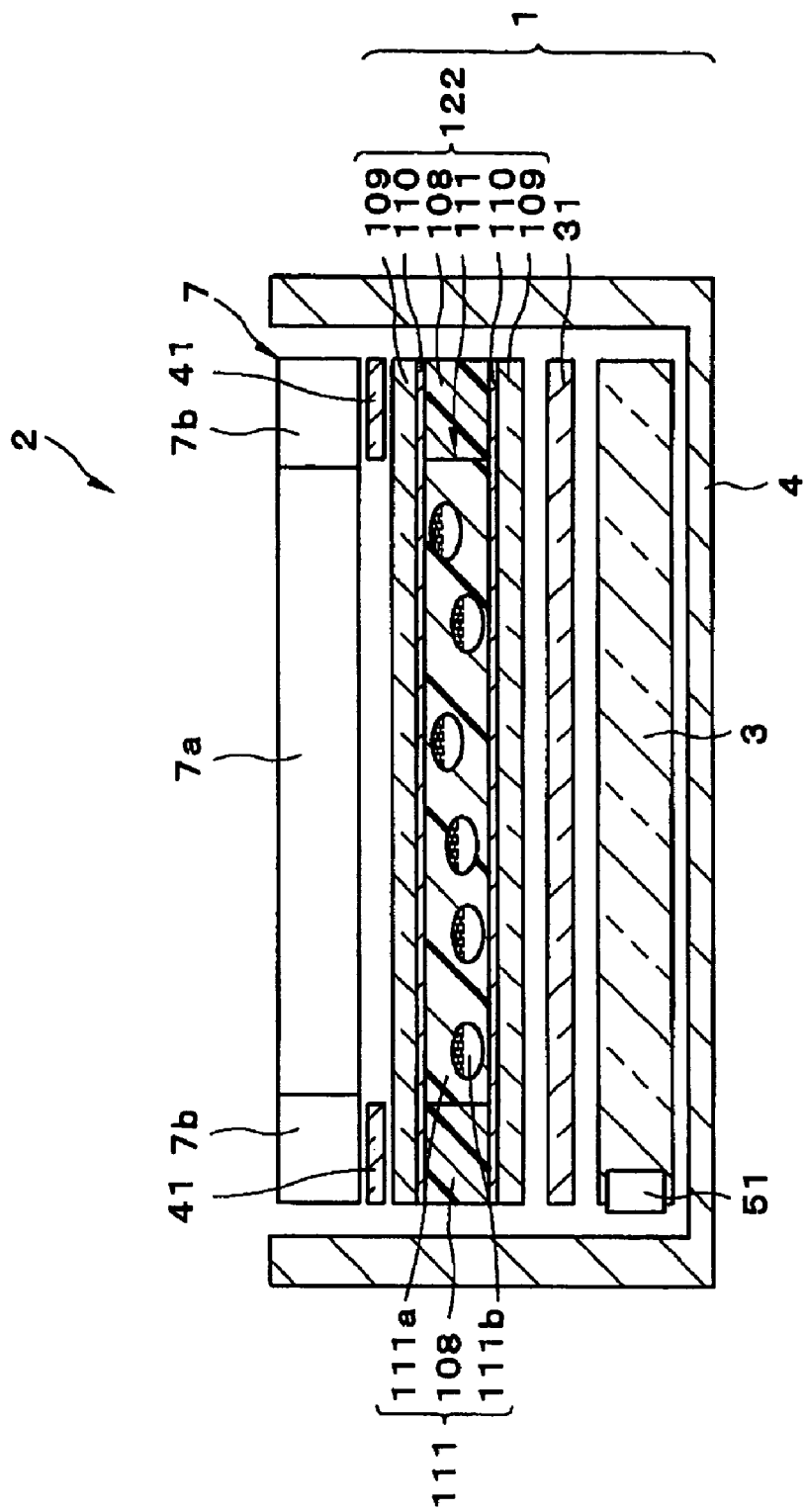
FIG. 9 is a sectional view showing the display device according to a first embodiment of the present invention.
Figure 10:
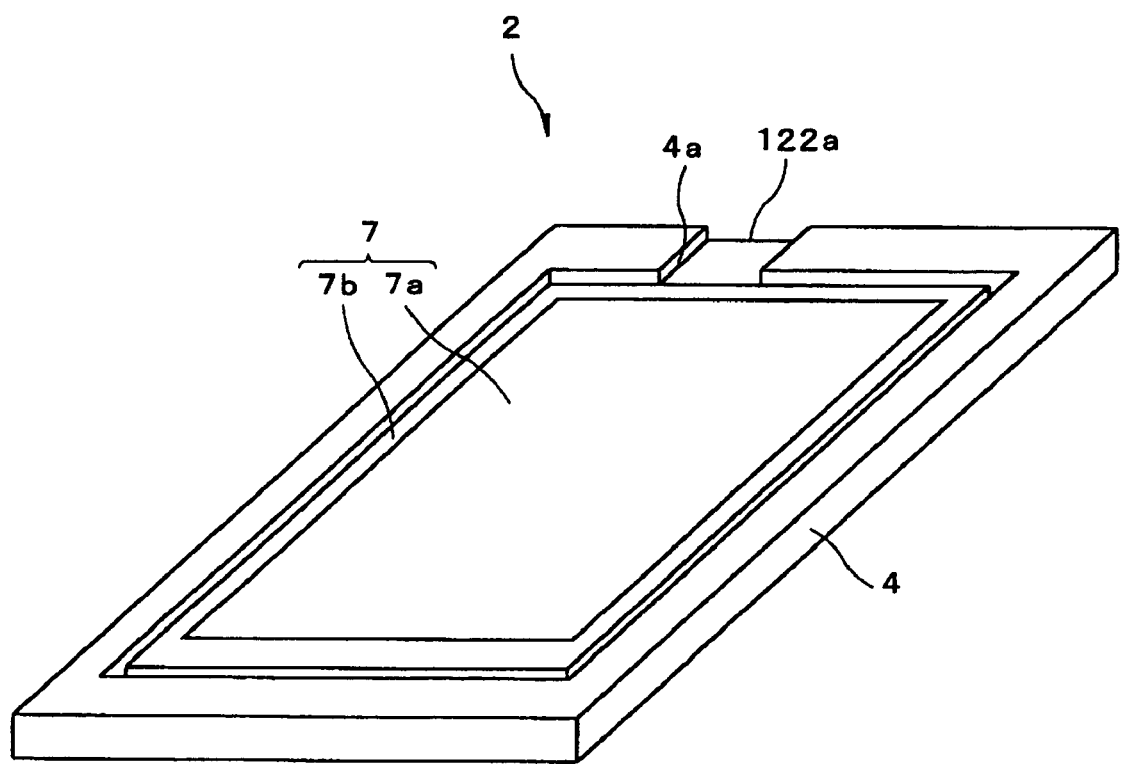
FIG. 10 is a perspective view showing the display device.
Figure 11:
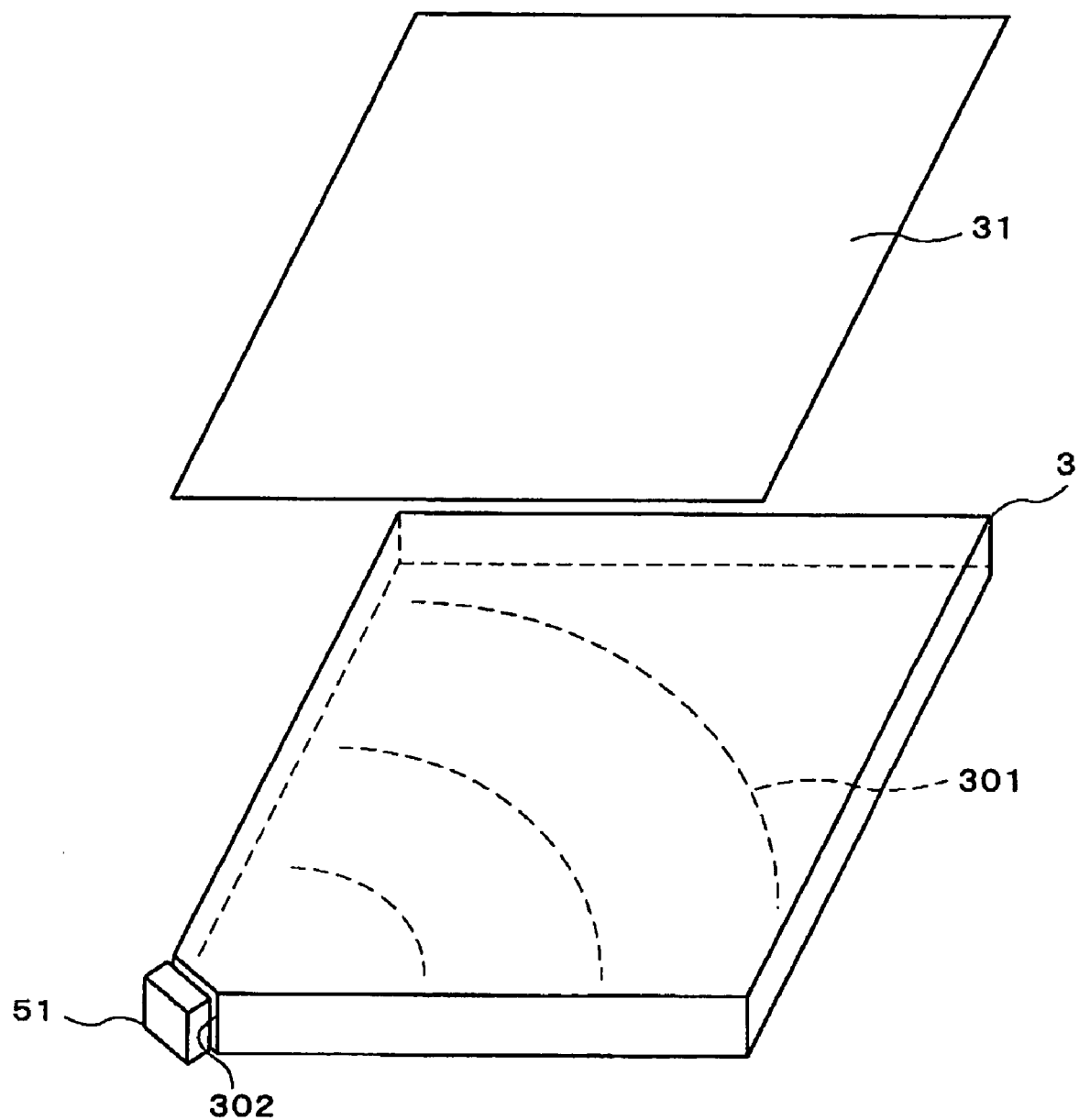
FIG. 11 is a perspective view showing the light source, light-guide plate, and prism sheet of the display device.
Figure 12:
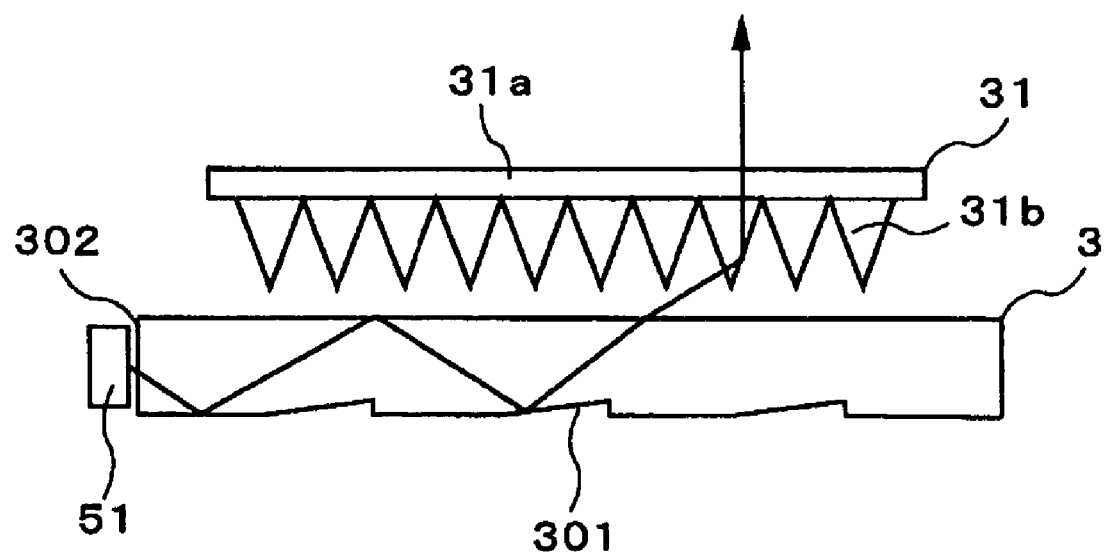
FIG. 12 is a view showing the light source, light-guide plate, and prism sheet of the display device.
Figure 13:
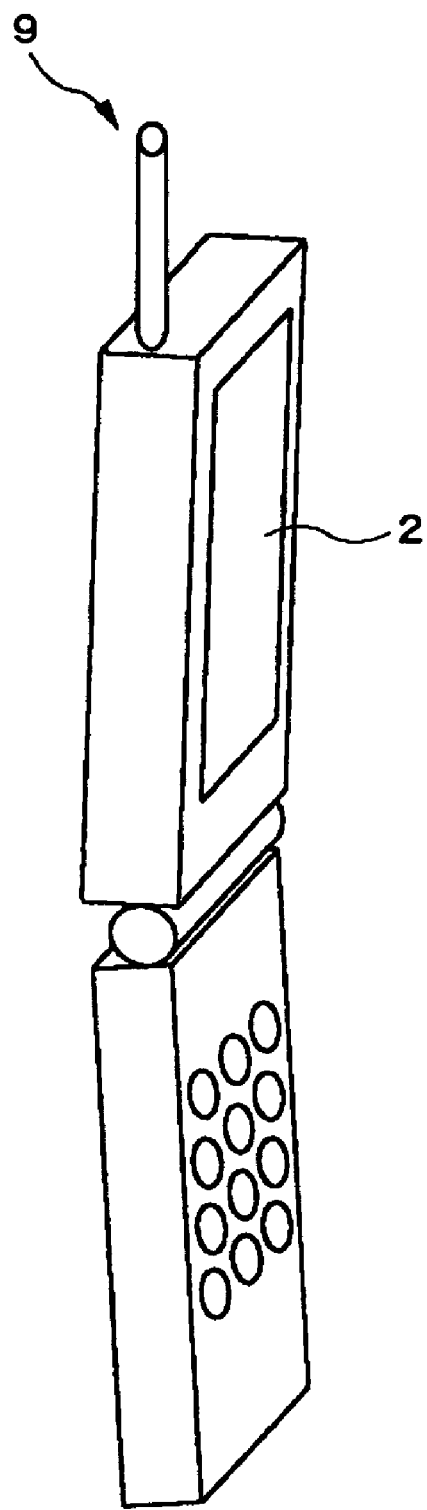
FIG. 13 is a perspective view showing the terminal device according to the present embodiment.

The inventors therefore developed the present invention after concentrated investigation aimed at preventing the phenomenon described above. The display device, terminal device, light source device, and optical member according to embodiments of the present invention will be described in detail hereinafter with reference to the accompanying drawings. A first embodiment of the present invention will first be described. FIG. 9 is a sectional view showing the display device according to the present embodiment; FIG. 10 is a perspective view showing this display device; FIG. 11 is a perspective view showing the light source, light-guide plate, and prism sheet of this display device; FIG. 12 is a view showing the light source, light-guide plate, and prism sheet of this display device; and FIG. 13 is a perspective view showing the terminal device according to the present embodiment.

As shown in FIG. 9, the display device 2 according to the present first embodiment is provided with a backlight 1 as a light source device, a transmissive liquid crystal display panel 7 for displaying an image by transmitting light emitted from the backlight 1, a transparent double-sided adhesive tape 41 for bonding the transmissive liquid crystal display panel 7 to the backlight 1, and a holder 4 for housing and fixing the backlight 1 and the transmissive liquid crystal display panel 7. A light-guide plate 3, a prism sheet 31, and a transparent/scattering state switching element 122 are provided to the backlight 1 in sequence along the direction oriented towards the transmissive liquid crystal display panel 7. A light source 51 is provided to the side of the light-guide plate 3. The center portion of the transmissive liquid crystal display panel 7 is a display region 7a, and the external peripheral portion is a frame region 7b. Furthermore, the front side of the holder 4 has an open box shape composed of a rectangular bottom panel and four side panels that stand up from the edges of the bottom panel.

As shown in FIG. 10, a cut 4a is formed in one of the side panels of the holder 4. A protrusion 122a is also provided to the transparent/scattering state switching element 122. The protrusion 122a of the transparent/scattering state switching element 122 is fitted in the cut 4a of the holder 4, whereby the holder 4 fixedly retains the transparent/scattering state switching element 122.

In the transparent/scattering state switching element 122 as shown in FIG. 9, two transparent substrates 109 are provided parallel to and separated from each other, and electrodes 110 are provided so as to cover the surfaces of the transparent substrates 109 on the surface of each transparent substrate 109 that faces another transparent substrate 109. A scattering seal member 108 is also provided to the external periphery between the transparent substrates 109. The scattering seal member 108 maintains a constant distance between the transparent substrates 109, and seals the space between the transparent substrates 109. A PDLC layer 111 as a transparent/scattering state switching layer is sealed in the space enclosed by the scattering seal member 108 between the two transparent substrates 109. Liquid crystal molecules 111b are dispersed in a polymer matrix 111a in the PDLC layer 111. The PDLC layer 111 is formed, for example, by curing a mixture of a photocuring resin and a liquid crystal material by exposure to light.

The scattering seal member 108 is not transparent, and has light-scattering properties whereby incident light is transmitted in a scattered state. The degree of scattering of the scattering seal member 108 is equal to the degree of scattering of the PDLC layer 111 when in the scattering state.

In the transparent/scattering state switching element 122, since the apparent refractive index of the polymer matrix 111a differs from that of the liquid crystal molecules 111b when an electric field is not applied to the PDLC layer 111, a scattering state occurs in which the incident light is scattered and emitted. When a voltage is applied to the PDLC layer 111 held between the pair of electrodes 110, the liquid crystal molecules 111b in the PDLC layer 111 change orientation, and the apparent refractive index of the liquid crystal molecules 111b substantially matches the apparent refractive index of the polymer matrix 111a. A transparent state therefore occurs in which the incident light is emitted without being scattered. The degree of scattering of the scattering seal member 108 is the same as the degree of scattering of the PDLC layer 111 during the scattering state, for example.

As viewed from the front, i.e., from the direction perpendicular to the display screen of the transmissive liquid crystal panel 107, the outer edge of the PDLC layer 111 of the transparent/scattering state switching element 122 is positioned somewhat further outside than the outer edge of the display region 107a of the transmissive liquid crystal panel 107. However, the distance between the outer edges of the PDLC layer 111 and the display region 107a as viewed from the front is made as small as possible in order for the light outputted from the light source 51 to be utilized with the highest possible efficiency.

One surface of the transparent double-sided adhesive tape 41 is bonded to the frame region 7b of the transmissive liquid crystal display panel 7, and the other surface of the transparent double-sided adhesive tape 41 is bonded to a region that corresponds to the scattering seal member 108 in the transparent substrates 109 of the transparent/scattering state switching element 122. The transmissive liquid crystal display panel 7 is thereby fixed relative to the transparent/scattering state switching element 122.

As shown in FIG. 11, the light-guide plate 3 is formed as a square flat panel by a methacrylic resin or other transparent resin, for example. One of the corner portions of the light-guide plate 3 is cut off at an angle to form a light-incident surface 302, and the light source 51 is provided in a position facing this light-incident surface 302. The light source 51 is an LED, for example. A light-scattering pattern 301 is formed on the lower surface of the light-guide plate 3. The light-scattering pattern 301 is composed of an arcuate cavity centered on the light source 51 and having a triangular cross-sectional shape. A plurality of light-scattering patterns 301 are arrayed concentrically about the light source 51. A surface tilted towards the light source 51 in the light-scattering pattern 301 is a light-reflecting surface, and the line normal to this reflecting surface extends in towards the light source 51, as viewed from the frontal direction. The light source 51 and the light-guide plate 3 constitute a planar light source.

As shown in FIG. 12, a substrate 31a and a plurality of conical prisms 31b are provided in the prism sheet 31. The prisms 31b are arrayed on the surface of the substrate 31a towards the light-guide plate 3, and the prisms are arrayed in arcs centered on the light source 51.

In this display device 2, since the degree of scattering of the scattering seal member 108 of the transparent/scattering state switching element 122 is the same as the degree of scattering of the PDLC layer 111 during the scattering state, the transmittance of light in the region in which the scattering seal member 108 is interposed in the light path that extends from the light-guide plate 3 to the transmissive liquid crystal display panel 7 is substantially equal to the transmittance of light in the region in which the PDLC layer 111 is interposed when the PDLC layer 111 is in the scattering state. Specifically, the transmittance of light in the region in which the scattering seal member 108 is interposed is lower than the transmittance of light in the region in which the PDLC layer 111 is interposed when the PDLC layer 111 is in the transparent state.

As shown in FIG. 13, the terminal device according to the present embodiment is a mobile telephone 9, for example. The display device 2 described above is installed in the display unit of the mobile telephone 9.

Figure 14:
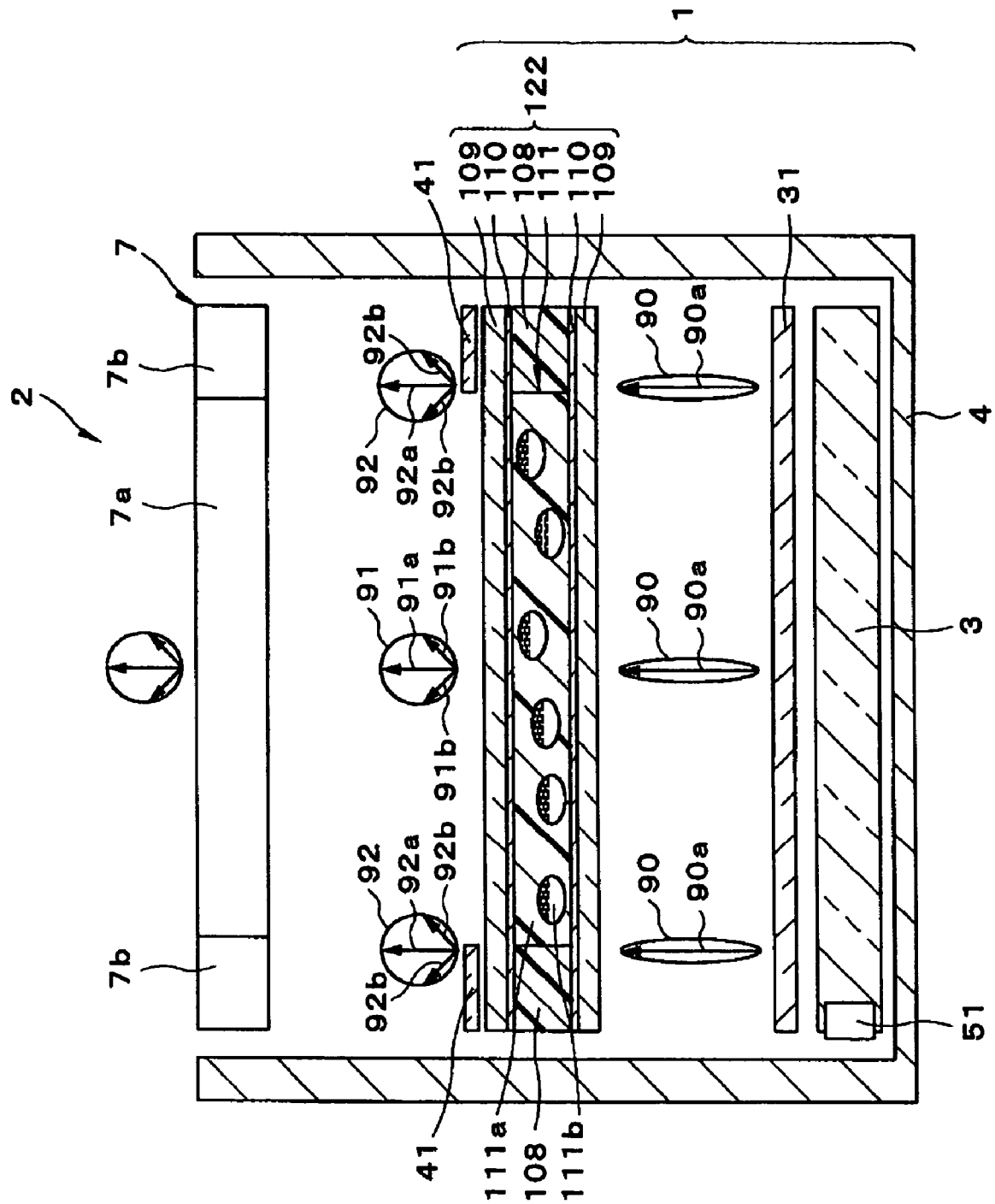
FIG. 14 is a sectional view showing the operation during wide-angle display in the display device according to the present embodiment.
Figure 15:
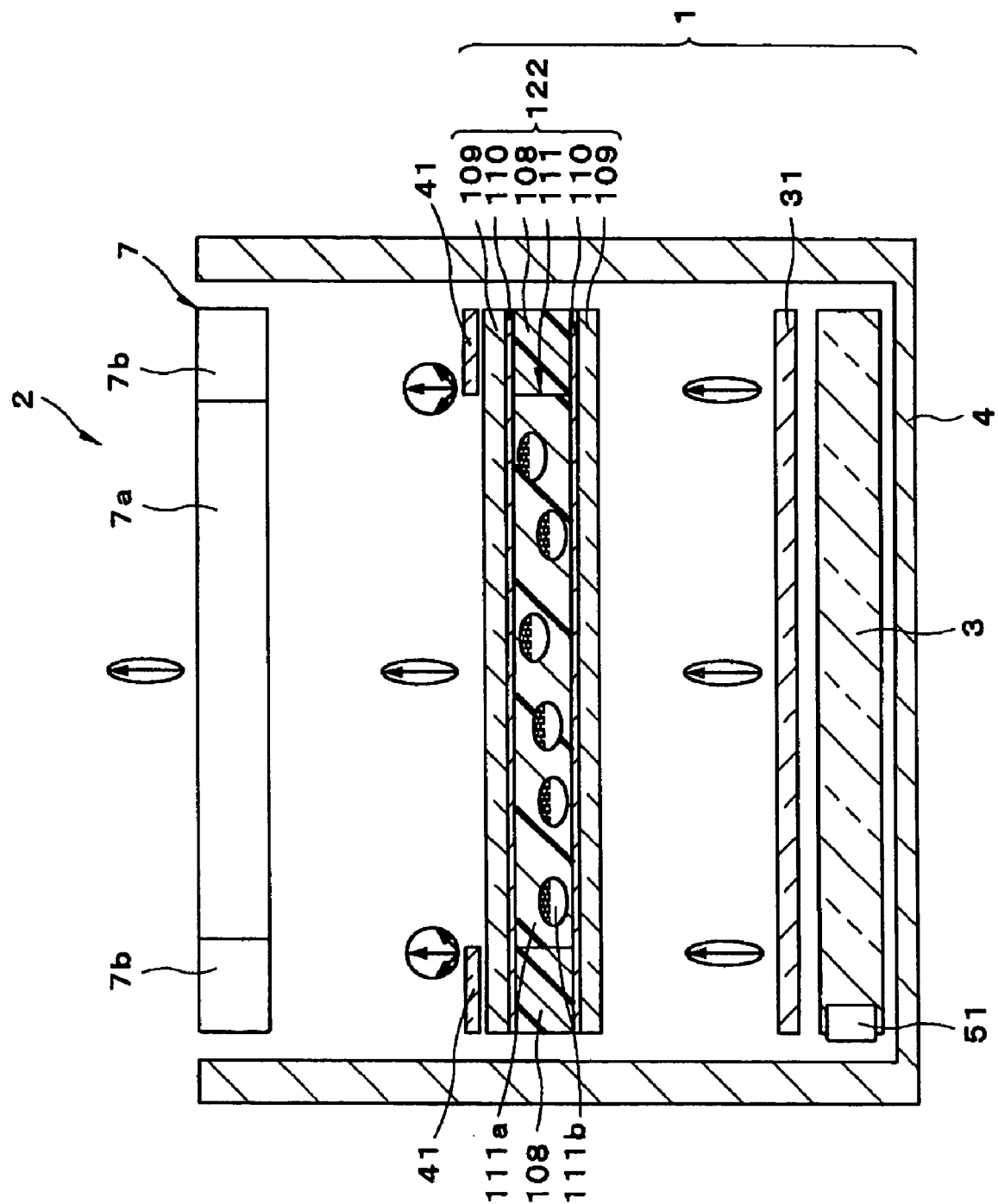
FIG. 15 is a sectional view showing the operation during narrow-angle display.
Figure 16:
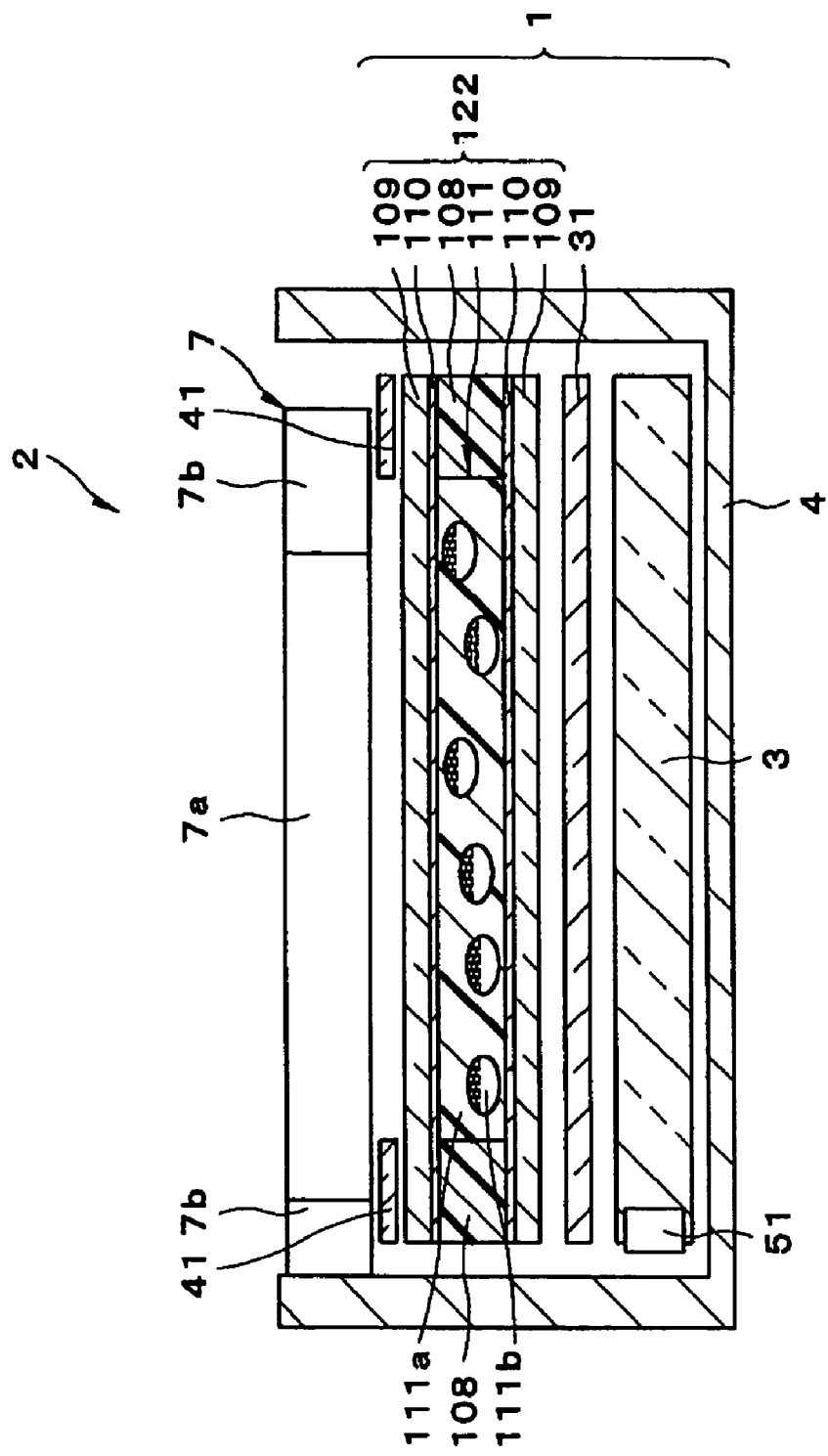
FIG. 16 is a sectional view showing a case in which there is misalignment in the transverse direction between the transparent/scattering state switching element and the display panel in the display device according to the present embodiment.
Figure 17:
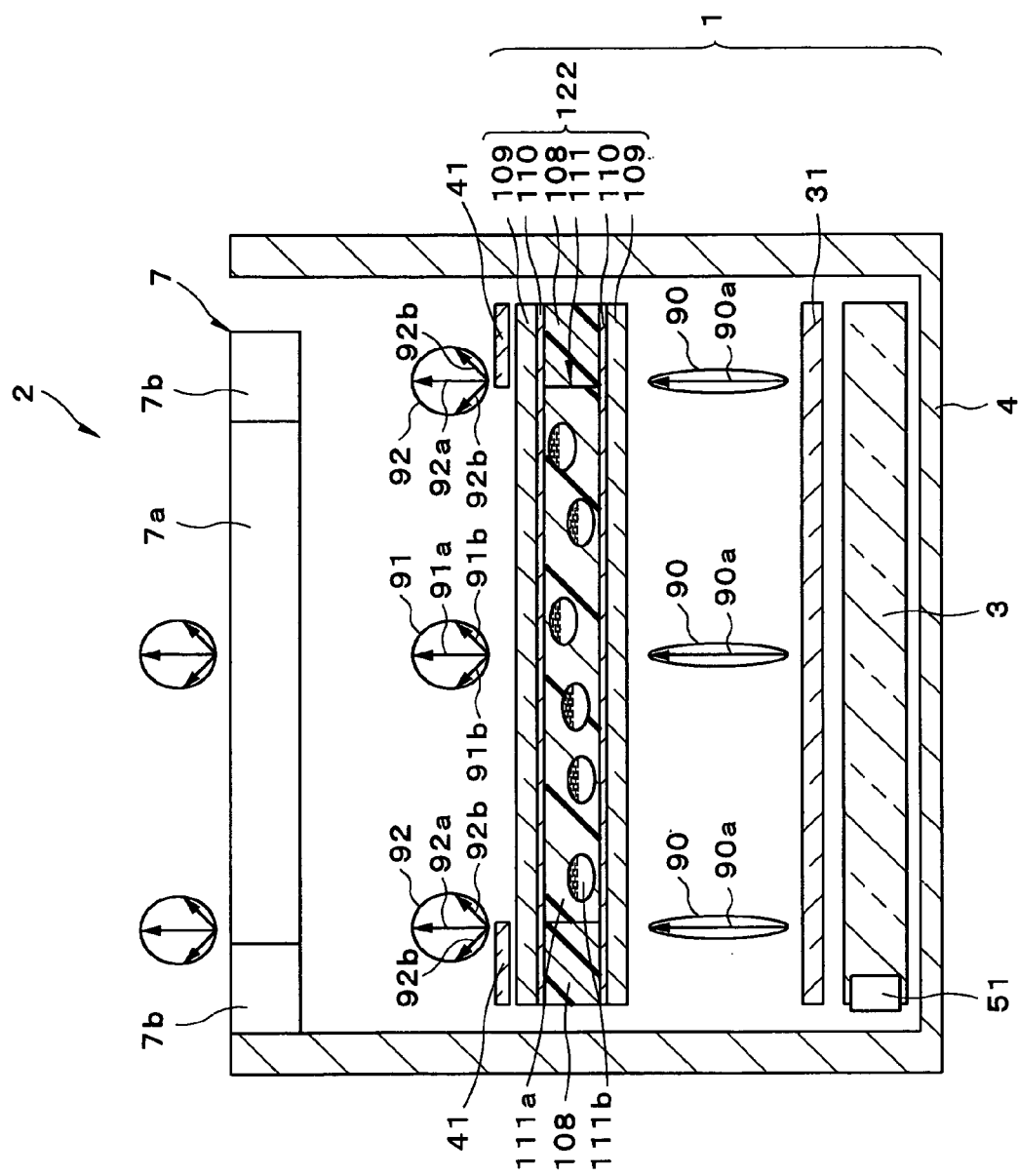
FIG. 17 is a sectional view showing the operation during wide-angle display in a display device in which this misalignment has occurred.

The operation of the display device according to the present embodiment thus configured will next be described. FIG. 14 is a sectional view showing the operation during wide-angle display in the display device according to the present embodiment; FIG. 15 is a sectional view showing the operation during narrow-angle display; FIG. 16 is a sectional view showing a case in which there is misalignment in the transverse direction between the transparent/scattering state switching element and the display panel in the display device according to the present embodiment; and FIG. 17 is a sectional view showing the operation during wide-angle display in a display device in which this misalignment has occurred. A case will first be described in which there is no misalignment in the transverse direction between the transparent/scattering state switching element 122 and the transmissive liquid crystal panel 7.

The operation until light emitted from the light source 51 exits from the prism sheet 31 will first be described using FIG. 12. Light emitted from the light source 51 enters the light-guide plate 3 from the light-incident surface 302. The light entering the light-guide plate 3 from the light-incident surface 302 is propagated through the light-guide plate 3 while spreading radially within the light-guide plate 3 and undergoing total reflection between the upper and lower surfaces of the light-guide plate 3. The angle at which light incident on the lower surface of the light-guide plate 3 strikes the upper surface of the light-guide plate 3 decreases each time the light reflects off the reflecting surface of the light-scattering pattern 301, and the incidence angle on the upper surface becomes smaller than a critical angle after a certain number of repeated total reflections. Light that is incident on the upper surface of the light-guide plate 3 at an angle smaller than the critical angle is emitted to the outside of the light-guide plate 3. At this time, since the line normal to the reflecting surface of the light-scattering pattern 301 extends towards the light source 51 as viewed from the front of the display device, light propagated in the light-guide plate 3 is not scattered by the light-scattering pattern 301 as viewed from the front. Therefore, the light emitted from the upper surface of the light-guide plate 3 is emitted with high directivity in a direction that is tilted from the frontal direction by a prescribed angle determined by the aforementioned critical angle. The light having a small spread and high directivity emitted from the light-guide plate 3 is deflected in the frontal direction by passing through the prism sheet 31, and is emitted with high directivity in the frontal direction.

The light that has high directivity in the frontal direction and is emitted from the prism sheet 31 enters the transparent/scattering state switching element 122. A case of wide-angle display will first be described. The structure is separated in the vertical direction in FIG. 14 in order to describe the orientation characteristics of light in each position. In FIG. 14, the orientation characteristics of the light emitted from the prism sheet 31 are indicated as luminous fluxes 90. The luminous fluxes 90 have only a frontally directed component 90a, and have essentially no other components.

During wide-angle display, a voltage is not applied to the transparent/scattering state switching element 122, and the PDLC layer 111 is in the scattering state. Therefore, among the high-directivity light incident on the transparent/scattering state switching element 122, the light incident on the PDLC layer 111 is evenly scattered by the PDLC layer 111 and dispersed in a wide range of angles. Specifically, the high-directivity light incident on the PDLC layer 111 is scattered by the PDLC layer 111, the directivity of the light is reduced, and the angle of the light is widened. The orientation characteristics of this widely spread out light are indicated as a luminous flux 91. The luminous flux 91 has a frontally directed component 91a and a tilted component 91b, and the strength of component 91a is lower than the strength of the frontally directed components 90a of luminous fluxes 90 incident on the transparent/scattering state switching element 122.

Among the light incident on the transparent/scattering state switching element 122, the light incident on the scattering seal member 108 is scattered by the scattering seal member 108 and dispersed in a wide angle. Since the degree of scattering of the scattering seal member 108 is equal to the degree of scattering of the PDLC layer 111 during the scattering state, luminous fluxes 92 of light passing through the scattering seal member 108 are the same as the luminous flux 91 of light passing through the PDLC layer 111.

The wide-angle light emitted from the PDLC layer 111 of the transparent/scattering state switching element 122 enters the display region 7a of the transmissive liquid crystal panel 7 and passes through the display region 7a, whereby an image is associated with the light, and the light exits unmodified from the display region 7a as wide-angle light. The wide-angle light emitted from the scattering seal member 108 is incident on the frame region 7b of the transmissive liquid crystal panel 7, and the light is blocked. An image is thus displayed in a wide viewing angle.

The case of narrow-angle display will next be described. The structure is separated in the vertical direction in FIG. 15 in order to describe the orientation characteristics of light in each position. During narrow-angle display, a voltage is applied to the transparent/scattering state switching element 122, and the PDLC layer 111 is in the transparent state. Therefore, among the high-directivity light incident on the transparent/scattering state switching element 122, the light that is incident on the PDLC layer 111 is transmitted without being scattered by the PDLC layer 111. Specifically, the high-directivity light incident on the PDLC layer 111 is not scattered by the PDLC layer 111, the directivity of the light is not reduced, and the light is emitted from the transparent/scattering state switching element 122 while retaining high directivity. On the other hand, among the light incident on the transparent/scattering state switching element 122, the light that is incident on the scattering seal member 108 is scattered by the scattering seal member 108 and dispersed in a wide angle.

The narrow-angle light emitted from the PDLC layer 111 of the transparent/scattering state switching element 122 enters the display region 7a of the transmissive liquid crystal panel 7 and passes through the display region 7a, whereby an image is associated with the light, and the light exits unmodified from the display region 7a as narrow-angle light. The wide-angle light emitted from the scattering seal member 108 is incident on the frame region 7b of the transmissive liquid crystal panel 7, and the light is blocked. An image is thus displayed in a narrow viewing angle.

In the display device according to the present invention thus configured, when the intensity of the light source 51 is the same during narrow-angle display and during wide-angle display, the frontal luminance of the wide-angle display decreases in comparison to that of the narrow-angle display. This is because the light emitted from the transmissive liquid crystal panel 7 during the narrow-angle state retains high directivity, whereas the light is scattered by the transparent/scattering state switching element 122 in the wide-angle state, the luminous flux propagated in the frontal direction decreases, and the frontal luminance decreases by a commensurate amount.

However, it is preferable for the main user in the frontal direction for the luminance to remain unchanged between narrow-angle display and wide-angle display. Therefore, in order to prevent the frontal luminance from decreasing during the switch from narrow-angle display to wide-angle display, it is necessary to increase the current that flows to the LED constituting the light source 51, thereby increasing the intensity of the LED and preventing the frontal luminance from decreasing. In the same manner, during the switch from wide-angle display to narrow-angle display, the current flowing to the LED that constitutes the light source 51 is reduced, and the intensity of the LED is reduced in order to prevent a significant increase in frontal luminance. A switch between narrow-angle display and wide-angle display is made by switching the transparent/scattering state of the transparent/scattering state switching element 122, and switching the light output of the light source 51.

A case will next be described in which there is misalignment in the transverse direction between the transparent/scattering state switching element and the transmissive liquid crystal panel in the display device according to the embodiment described above. FIG. 16 is a sectional view of the display device according to the present embodiment, wherein there is misalignment in the transverse direction between the transparent/scattering state switching element and the display panel. As viewed from the front in a case in which there is no misalignment, the scattering seal member 108 of the transparent/scattering state switching element 122 does not protrude into the display region 7a of the transmissive liquid crystal panel 7, as shown in FIG. 9. In contrast, when there is misalignment in the transverse direction between the transparent/scattering state switching element and the transmissive liquid crystal panel as shown in FIG. 16, the scattering seal member 108 protrudes into a portion of the display region 7a as viewed from the front. Specifically, when the display device is viewed from the front, which is the direction of a line normal to the display surface, the scattering seal member 108 is visible in a portion of the display region 7a.

FIG. 17 is a sectional view showing the operation during wide-angle display in a display device having this type of misalignment. As shown in FIG. 17, when there is misalignment in the transverse direction between the transparent/scattering state switching element and the transmissive liquid crystal panel, a portion of the light emitted from the scattering seal member 108 of the transparent/scattering state switching element 122 is incident on the display region 7a of the transmissive liquid crystal panel 7, and the light passes through the display region 7a and exits from the display device 2. However, as previously mentioned, the orientation characteristics (luminous flux 92) of the light emitted from the scattering seal member 108 are the same as the orientation characteristics (luminous flux 91) of the light emitted from the PDLC layer 111. Accordingly, an observer makes no distinction between the light emitted from the PDLC layer 111 and the light emitted from the scattering seal member 108, and the luminance of the region in the display region 7a that receives light emitted from the scattering seal member 108 does not increase relative to the luminance of another region. There is therefore no decrease in display quality.

During narrow-angle display, although narrow-angle light is emitted from the PDLC layer 111, wide-angle light is emitted from the scattering seal member 108. In this case, the orientation characteristics of light emitted from the scattering seal member 108 differ from the orientation characteristics of light emitted from the PDLC layer 111. However, since the frontally directed component of light emitted from the scattering seal member 108 is weaker than the frontally directed component of light emitted from the PDLC layer 111 even when the light emitted from the scattering seal member 108 enters a portion of the display region 7a, this phenomenon is almost unnoticeable by an observer, and there is almost no decrease in display quality.

Effects of the present embodiment will next be described. As described above, in the present embodiment, light that is incident on the scattering seal member 108 is scattered by the scattering seal member 108 used to seal the PDLC layer 111 in the transparent/scattering state switching element 122. Therefore, even when there is misalignment between the transparent/scattering state switching element 122 and the transmissive liquid crystal panel 7, and the light emitted from the scattering seal member 108 enters the display region 7a of the transmissive liquid crystal panel 7, an abnormally bright area does not appear in the display screen, and there is no decrease in display quality caused by misalignment. An observer can therefore utilize the display device without discomfort.

Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified during alignment of the transparent/scattering state switching element and the transmissive liquid crystal panel, and these regions can instead be aligned merely based on external shape, for example. It is therefore possible to reduce manufacturing costs.

In the present embodiment, the seal member of the transparent/scattering state switching element was described as a scattering seal member having light-scattering properties, but this configuration is adequate insofar as the degree of scattering in the region in which the PDLC layer is disposed in the transparent/scattering state switching element is essentially equal to the degree of scattering in the region in which the seal member is disposed, and the configuration is not limited to one in which a scattering seal member is provided. For example, scattering properties may be imparted only to the seal member of the transparent substrates. These properties may be imparted by performing such scattering treatments as forming an uneven surface on at least one of the transparent substrates of the transparent/scattering state switching element. Since a transparent seal member may be used in a case in which scattering properties are imparted using a structure other than a seal member, the number of options available for selecting a seal member can be increased, and it is possible to utilize a seal member that has superior reliability and other characteristics.

Setting the degree of scattering of the seal member so as to be equal to the degree of scattering of the PDLC layer particularly during the scattering state as described above is effective for enhancing display quality, but the degree of scattering is not limited to this value, and may be set so as to be greater than the degree of scattering of the PDLC layer in the scattering state. In this case, the luminance in the frontal direction can be further reduced in the seal member, and the occurrence of abnormally bright areas can therefore be more reliably reduced. When a slight luminance increase can be allowed, the degree of scattering of the seal member may be set so as to be smaller than the degree of scattering of the PDLC layer in the scattering state. Specifically, the appearance of an abnormally bright area can be reduced if the tape portion is not transparent.

The seal member of the transparent/scattering state switching element in the present embodiment was described as being positioned so as not to come into the display region of the transmissive liquid crystal panel when there is no misalignment between the transparent/scattering state switching element and the transmissive liquid crystal panel. Particularly in a mobile telephone, the parts on the sides (left and right sides) of the display region in the frame region of the display panel tend to be narrowed on order to obtain both increased screen size and profile reduction of the telephone device. Therefore, the width of the seal member is reduced, and it is more likely that reliability and impact resistance will be reduced when the inner edge of the seal member of the transparent/scattering state switching element is positioned further outside than the outer edge of the display region of the transmissive liquid crystal panel as viewed from the front. However, it is preferred in terms of manufacturing costs to be able to increase the margin for misalignment by placing the inner edge of the seal member of the transparent/scattering state switching element as far outside as possible from the outer edge of the display region of the transmissive liquid crystal panel.

The misalignment was also described above as occurring in the transverse direction, but the present embodiment is also effective in cases in which there is vertical misalignment or in which misalignment occurs in the rotational direction with respect to the line normal to the display surface. When the display device according to the present embodiment is installed in a mobile telephone, however, the transverse width of the mobile telephone is limited to a size that allows easy carrying in the hand, but since the transverse width of the display region is preferably increased for displaying information, the frame region tends to have a narrow width on either side of the display screen. Therefore, applying the present embodiment particularly to a seal member disposed to the side of the display screen of a mobile telephone makes it possible to narrow the profile of a mobile telephone.

The transparent/scattering state switching element used in the present invention is also not limited to having a PDLC layer, and any element may be suitably used that is capable of switching between a transparent state and a scattering state. Examples thereof may include an element that uses a polymer network liquid crystal (PNLC), or an element that uses dynamic scattering (DS). It is possible to use a PDLC layer that is in the scattering state when a voltage is not applied, and in the transparent state when a voltage is applied. By this configuration, since the transparent/scattering state switching element no longer consumes power when in the state for scattering incident light, the power that would have been consumed can be allocated to the backlight light source, and the brightness of the light source device during the scattering state is therefore easily enhanced. It is also possible to use a PDLC layer that is in the transparent state when a voltage is not being applied, and that is in the scattering state when a voltage is applied. This type of PDLC layer can be fabricated by exposing a polymer matrix to light and curing the polymer matrix while applying a voltage. By this configuration, there is no need for applying a voltage to the PDLC layer, and power consumption can be reduced in a mobile information terminal in which narrow-angle display is frequently used. Cholesteric liquid crystal, ferroelectric liquid crystal, or the like may also be used as the liquid crystal molecules used in the PDLC layer. Even when voltage is no longer applied, these liquid crystals retain the orientation they had when the voltage was applied, and have, memory properties. Using this type of PDLC layer makes it possible to reduce power consumption.

The display panel used in combination with the planar light source device in the present invention is not limited to a liquid crystal panel, and any display panel that uses a light source device may be used. The liquid crystal panel is also not limited to the transmissive type, and any panel that has a transmissive area in each pixel may be used. A transflective liquid crystal panel having a reflective area in a portion of each pixel, a visible-everywhere transflective liquid crystal panel, or a micro-reflective liquid crystal panel may also be used. It is preferable to use a liquid crystal panel that has minimal dependence on the viewing angle. Contrast inversion during display at a wide viewing angle can thereby be suppressed. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (Multi-domain Vertical Alignment), which is multi-domain and possesses reduced viewing-angle dependency, as well as PVA (Patterned Vertical Alignment), ASV (Advanced Super V), and the like. Furthermore, a film-compensated TN liquid crystal display panel may also be appropriately used.

The light source, light-guide plate, and prism sheet that are some of the constituent elements of the display device of the present invention are not limited to the configuration described above, and may be used as appropriate insofar as the directivity of light is increased with respect to the direction in which at least narrow-angle display is performed. In the description above regarding control of the light source, the current flowing to an LED constituting the light source 51 was increased to increase the intensity of the LED and to increase the frontal luminance during a switch from narrow-angle display to wide-angle display. However, this configuration is not limiting, and the present invention may be applied in the same manner in a case in which the current flowing to the LED is not increased.

The display device of the present embodiment may be suitably applied in a mobile telephone or other mobile terminal device. Compatible mobile terminal devices include not only mobile telephones, but also PDAs (Personal Digital Assistant: personal information terminal), gaming devices, digital cameras, digital video cameras, and various other types of mobile terminal devices. The display device may be installed not only in mobile terminal devices, but also in notebook-type personal computers, cash dispensers, vending machines, and other various types of terminal devices.

Figure 18:
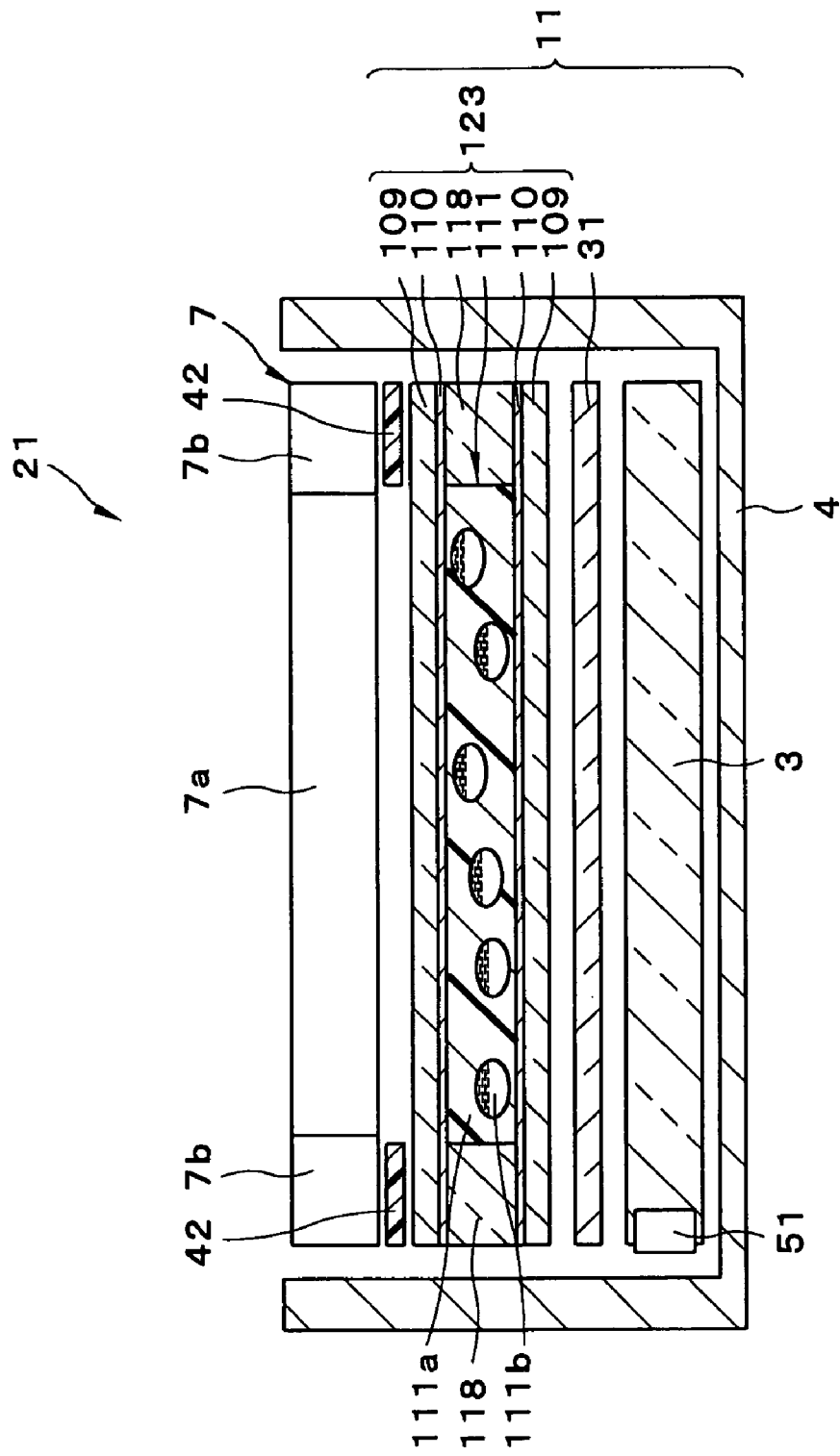
FIG. 18 is a sectional view showing the display device according to a second embodiment of the present invention.

The display device, light source device, and optical member according to a second embodiment of the present invention will next be described. FIG. 18 is a sectional view showing the display device according to the present embodiment. As shown in FIG. 18, the display device 21 according to the present second embodiment differs from the display device 2 according to the previously described first embodiment in that a transparent seal member 118 is provided instead of the scattering seal member 108 of the transparent/scattering state switching element 122, and in that a scattering double-sided adhesive tape 42 having light-scattering effects is provided instead of the transparent double-sided adhesive tape 41. Specifically, the transmissive liquid crystal display panel 7 is fixed to a transparent/scattering state switching element 123 by a scattering double-sided adhesive tape 42 bonded to the frame region 7b. The degree of scattering of the scattering double-sided adhesive tape 42 is the same as the degree of scattering of the PDLC layer 111 of the transparent/scattering state switching element 123 when in the scattering state. Other aspects of the present embodiment are the same as those of the aforementioned first embodiment.

Figure 19:
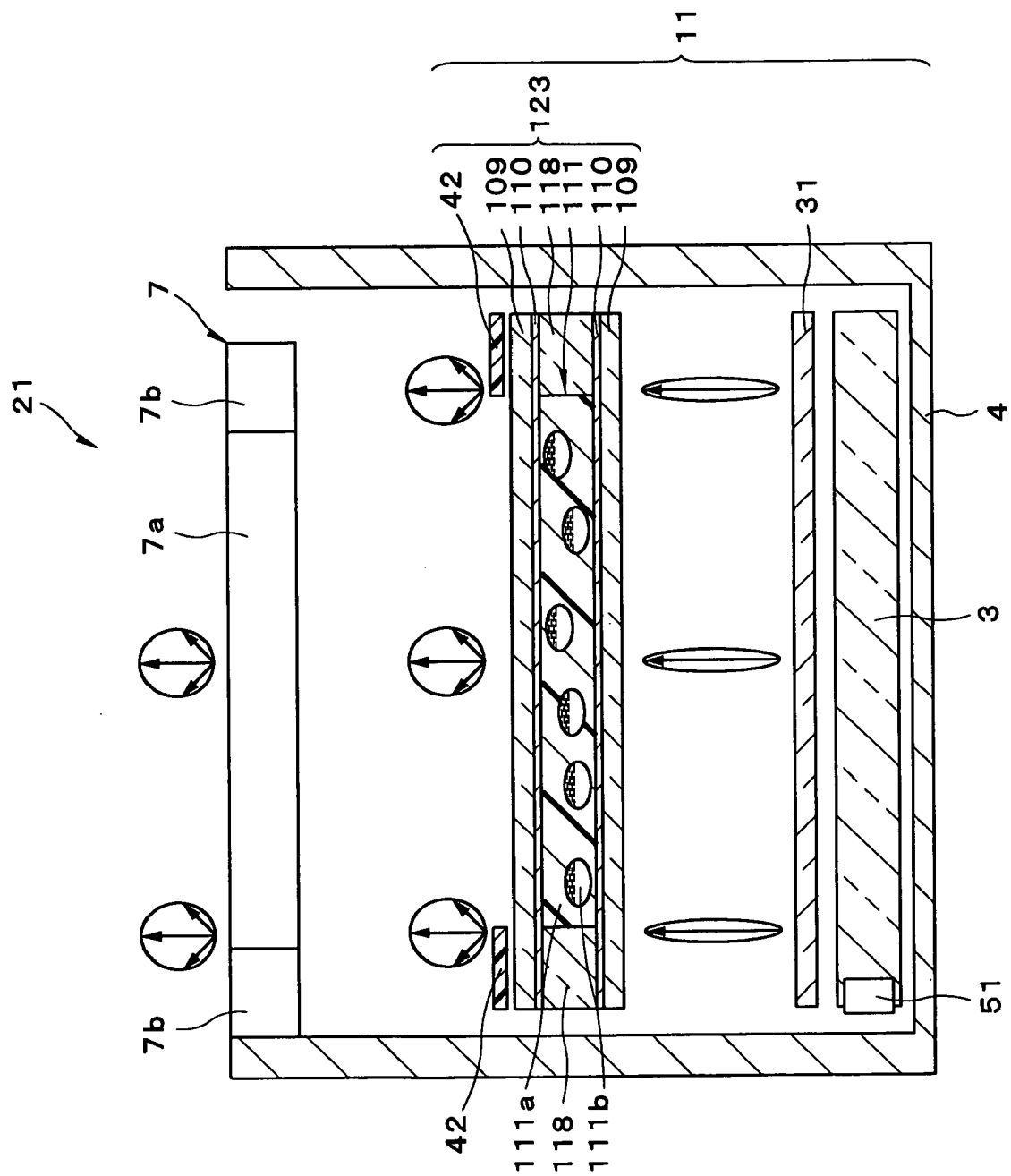
FIG. 19 is a sectional view showing the operation during wide-angle display in a case in which there is misalignment in the transverse direction between the transparent/scattering state switching element and the transmissive liquid crystal display panel in the present embodiment.

The operation of the display device according to the present embodiment thus configured will next be described. FIG. 19 is a sectional view showing the operation during wide-angle display in a case in which there is misalignment in the transverse direction between the transparent/scattering state switching element 123 and the transmissive liquid crystal display panel 7 in the present embodiment. As shown in FIG. 19, during wide-angle display, since the current flowing to the LED constituting the light source 51 is increased, the light incident on the transparent/scattering state switching element 123 is in a high-directivity distribution having high-luminance in the frontal direction. Among the light incident on the transparent/scattering state switching element 123, the light that is incident on the PDLC layer 111 is scattered by the PDLC layer in the scattering state, and the luminance in the frontal direction is reduced to a set value. In contrast, the light incident on the transparent seal member 118 is emitted from the transparent/scattering state switching element 123 without being scattered, unlike the light incident on the PDLC layer 111. However, the light is subsequently scattered by the scattering double-sided adhesive tape 42 provided on the transparent seal member 118. The light incident on the transmissive liquid crystal panel 7 is thereby scattered to the same extent by the PDLC layer 111 portion and the overlapping portion of the transparent seal member 118 and the scattering double-sided adhesive tape 42.

Even when misalignment occurs between the transparent/scattering state switching element 123 and the transmissive liquid crystal panel 7, and the overlapping portion of the transparent seal member 118 and the scattering double-sided adhesive tape 42 protrudes into a portion of the display region 7a as viewed from the front, the light passing through the transparent seal member 118 and the scattering double-sided adhesive tape 42 is scattered to the same extent as the light passing through the PDLC layer 111. Therefore, an abnormally bright region does not occur. Although the seal member for sealing the PDLC layer 111 of the transparent/scattering state switching element 123 is optically transparent in the present embodiment, the scattering double-sided adhesive tape 42 provided between the transparent/scattering state switching element 123 and the transmissive liquid crystal panel 7 has scattering properties, and the same effects can therefore be demonstrated as in the display device 2 of the aforementioned first embodiment.

Compared to the aforementioned first embodiment, since a transparent seal member can be used as the seal member of the transparent/scattering state switching element in the present embodiment, the number of options available for selecting a seal member can be increased, and it is possible to utilize a seal member that has superior reliability and other characteristics. Effects of the present embodiment other than those described above are the same as those of the first embodiment. Specifically, an abnormally bright area does not appear in the display screen, and there is no decrease in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified, and these regions can instead be aligned merely based on external shape, for example. It is therefore possible to reduce manufacturing costs.

In the display device of the present embodiment, a protrusion is provided to the transparent/scattering state switching element, and this protrusion is retained by a holder, thereby fixing the transparent/scattering state switching element in the holder. The transmissive liquid crystal display panel is fixed to the transparent/scattering state switching element by scattering double-sided adhesive tape in the same manner as in the aforementioned first embodiment. However, the present invention is not limited by this configuration. For example, a protrusion may be provided to the prism sheet, and the prism sheet may be fixed to the holder by the holder retaining the protrusion; the transparent/scattering state switching element may be fixed to the prism sheet via a scattering double-sided adhesive tape rather than having a protrusion provided to the transparent/scattering state switching element; and the transmissive liquid crystal display panel may be fixed to the transparent/scattering state switching element via the transparent double-sided adhesive tape. Specifically, it is sufficient if the scattering double-sided adhesive tape is provided in any position that ranges from the prism sheet to the transmissive liquid crystal display panel. A particular effect of using the scattering double-sided adhesive tape to fix the transmissive liquid crystal display panel to the transparent/scattering state switching element is that the impact resistance of the transmissive liquid crystal display panel and the transparent/scattering state switching element is enhanced.

Figure 20:
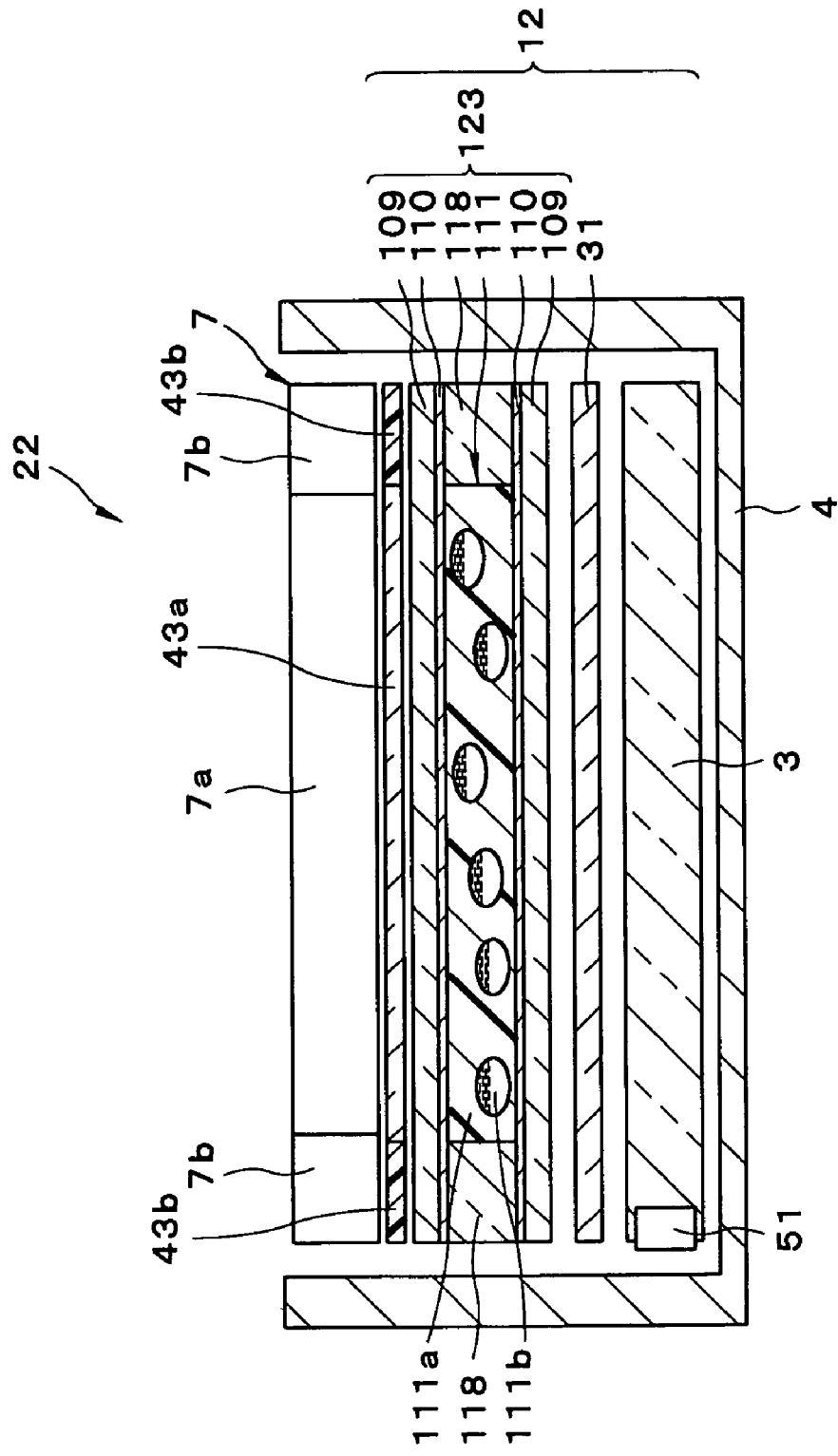
FIG. 20 is a sectional view showing the display device according to a third embodiment of the present invention.

The display device, light source device, and optical member according to a third embodiment of the present invention will next be described. FIG. 20 is a sectional view showing the display device according to the present embodiment. As shown in FIG. 20, the display device 22 according to the present third embodiment differs from the display device 21 according to the aforementioned second embodiment in that a transparent/scattering double-sided adhesive tape 43 is provided instead of the scattering double-sided adhesive tape 42. The scattering double-sided adhesive tape 42 in the aforementioned second embodiment was provided in a frame shape as viewed from the front, and was positioned only in a region corresponding to the frame region 7b of the transmissive display panel 7. However, the transparent/scattering double-sided adhesive tape 43 of the present embodiment is provided in a rectangular shape as viewed from the front, and is positioned in a region that corresponds to the entire transmissive display panel 7.

In the transparent/scattering double-sided adhesive tape 43 as viewed from the front, the portion corresponding to the display region 7a of the transmissive liquid crystal display panel 7 is a transparent area 43a, and the portion corresponding to the frame region 7b is a scattering area 43b. The transmissive liquid crystal display panel 7 is fixed to the transparent/scattering state switching element 123 by the transparent/scattering double-sided adhesive tape 43. Specifically, in the aforementioned second embodiment, the transmissive liquid crystal display panel 7 and the transparent/scattering state switching element 123 were bonded to each other by the scattering double-sided adhesive tape 42 provided only in a region corresponding to the frame region 7b. In the present embodiment, however, the entire surfaces of the transmissive liquid crystal display panel 7 and the transparent/scattering state switching element 123 are joined together by the transparent/scattering double-sided adhesive tape 43. The degree of scattering of the scattering area 43b of the transparent/scattering double-sided adhesive tape 43 is equal to the degree of scattering of the PDLC layer 111 of the transparent/scattering state switching element 123 in the scattering state. Other structural aspects and operations in the present embodiment are the same as in the aforementioned second embodiment.

Although the seal member for sealing the PDLC layer 111 of the transparent/scattering state switching element 123 is optically transparent in the present embodiment, the transparent area 43a of the transparent/scattering double-sided adhesive tape 43 provided between the transparent/scattering state switching element 123 and the transmissive liquid crystal display panel 7 has light-scattering properties, and the same effects can therefore be demonstrated as in the display device 21 of the aforementioned second embodiment. Specifically, an abnormally bright area does not appear in the display screen, and there is no decrease in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified, and these regions can instead be aligned merely based on external shape, for example. It is therefore possible to reduce manufacturing costs.

In addition to the effects described above, such effects as those described below can also be obtained in the present embodiment. Specifically, in comparison to the aforementioned first embodiment, since a transparent seal member can be used as the seal member of the transparent/scattering state switching element, the number of options available for selecting a seal member can be increased, and it is possible to utilize a seal member that has superior reliability and other characteristics. In comparison to the aforementioned second embodiment, since the entire surfaces of the transparent/scattering state switching element and the transmissive liquid crystal display panel are bonded together by the transparent/scattering double-sided adhesive tape, high mechanical impact resistance is obtained. An optical seal is also created by the transparent area of the transparent/scattering double-sided adhesive tape in the display region, and it is possible to reduce light loss that results from reflection on the surface of the transparent/scattering state switching element and the surface of the transmissive liquid crystal display panel.

Figure 21:
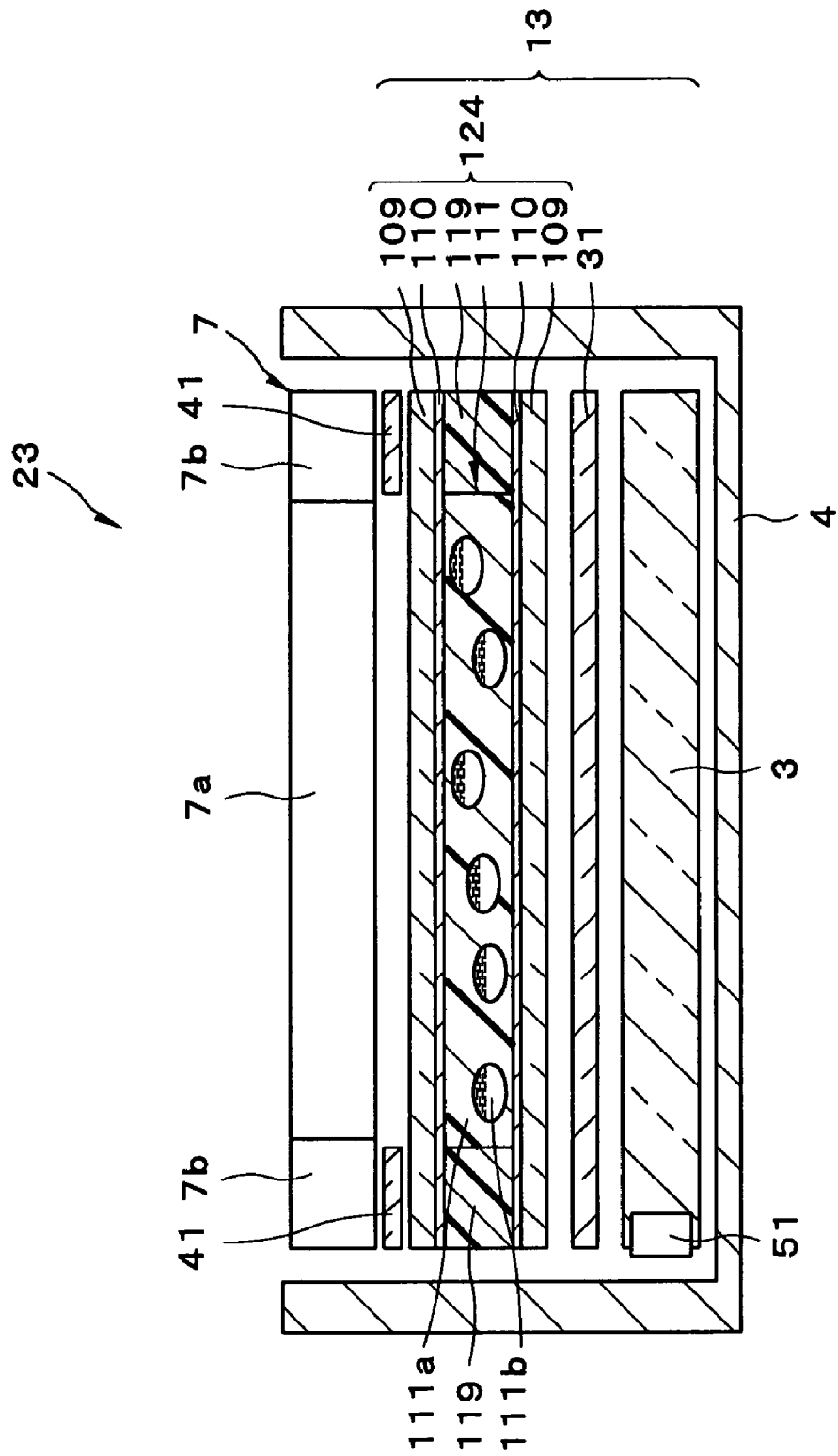
FIG. 21 is a sectional view showing the display device according to a fourth embodiment of the present invention.

The display device, light-source device, and optical member according to a fourth embodiment of the present invention will next be described. FIG. 21 is a sectional view showing the display device according to the present embodiment. As shown in FIG. 21, the display device 23 according to the present fourth embodiment differs from the display device 2 of the first embodiment in that a light-absorbing seal member 119 for absorbing light is provided instead of the scattering seal member 108 in a transparent/scattering state switching element 124, and in that the PDLC layer 111 is sealed by this light-absorbing seal member 119. The light transmittance of the light-absorbing seal member 119 in the frontal direction is reduced by mixing a type of pigment or dye that absorbs light into the transparent seal member 118 of the transparent/scattering state switching element 123 as a base material. Other aspects of the present embodiment are the same as in the aforementioned first embodiment.

Figure 22:
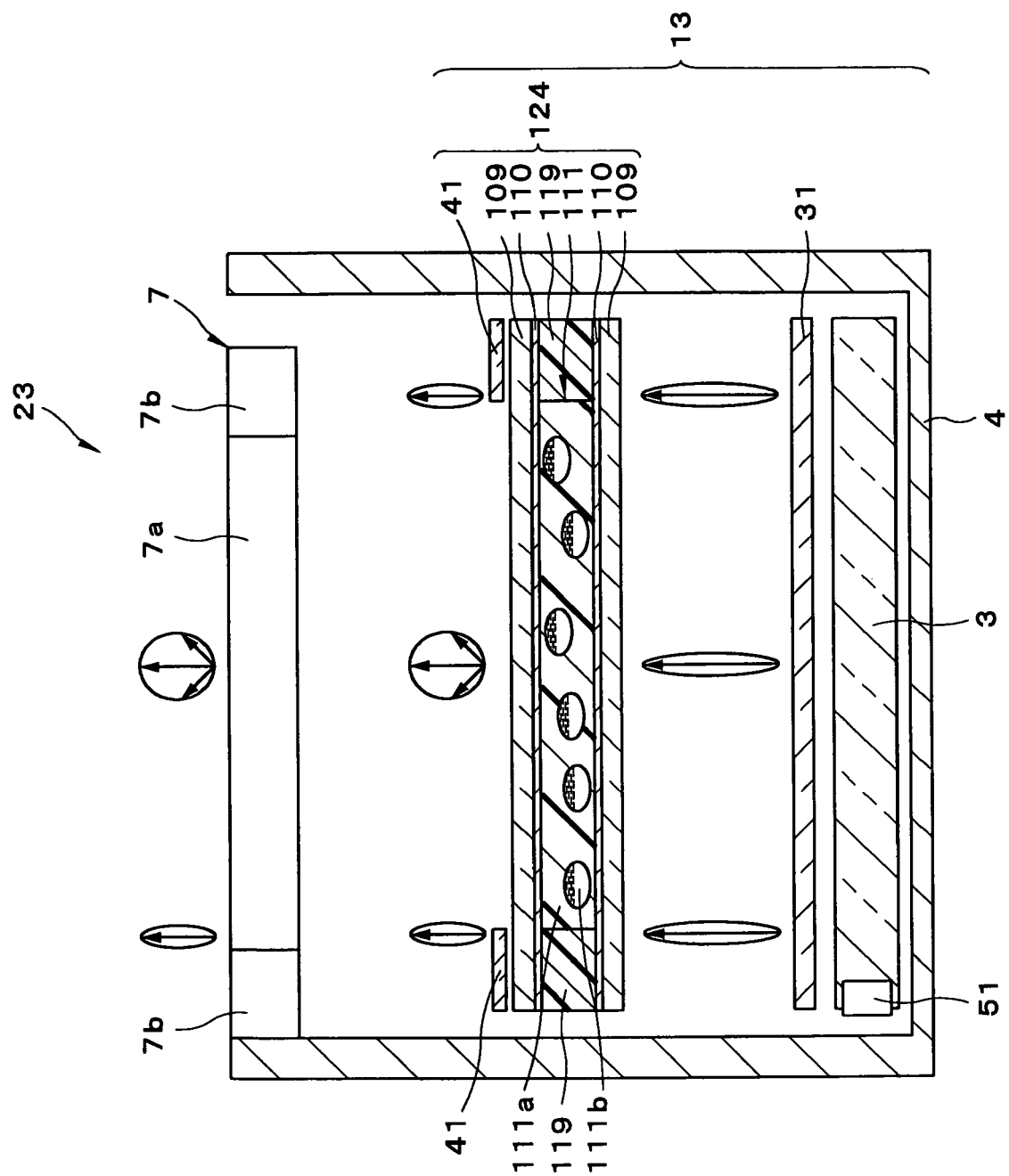
FIG. 22 is a sectional view showing the operation during wide-angle display in a case in which there is misalignment in the transverse direction between the transparent/scattering state switching element and the transmissive liquid crystal display panel in the present embodiment.

The operation of the display device according to the present embodiment thus configured will next be described. FIG. 22 is a sectional view showing the operation during wide-angle display in a case in which there is misalignment in the transverse direction between the transparent/scattering state switching element 124 and the transmissive liquid crystal display panel 7 in the present embodiment. As shown in FIG. 22, during wide-angle display, since the current flowing to the LED constituting the light source 51 is increased, the light incident on the transparent/scattering state switching element 124 is in a high-directivity distribution having high-luminance in the frontal direction. Among the light incident on the transparent/scattering state switching element 124, the light that is incident on the PDLC layer 111 is scattered by the PDLC layer in the scattering state, and the luminance in the frontal direction is reduced to a set value. In contrast, the light incident on the light-absorbing seal member 119 is emitted from the transparent/scattering state switching element 124 in a state of reduced luminance in the frontal direction while retaining high directivity without scattering, unlike the light incident on the PDLC layer 111.

The optical concentration of the light-absorbing seal member 119 is set so that the luminance in the frontal direction of the light passing through the light-absorbing seal member 119 at this time is equal to the luminance in the frontal direction of the light passing through the PDLC layer 111 in the scattering state. The luminance as observed from the frontal direction is thereby substantially equal in the area of the PDLC layer 111 in the scattering state and the area of the light-absorbing seal member 119. The light incident on the liquid crystal display panel 7 is subsequently utilized for display in the display region 7a, but the light is blocked in other portions and is invisible to an observer. Even if misalignment occurs as described above, and a portion of the light-absorbing seal member 119 protrudes into a portion of the display region 7a as viewed from the front, the luminance as observed from the frontal direction is about the same as in the PDLC layer 111 area, and the observer therefore experiences no discomfort.

In the present embodiment, the light-absorbing seal member 119 for sealing the PDLC layer 111 of the transparent/scattering state switching element 124 has light-absorbing properties, and the same effects can therefore be demonstrated as in the aforementioned first embodiment. Specifically, an abnormally bright area does not appear in the display screen, and there is no decrease in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified, and these regions can instead be aligned merely based on external shape, for example. It is therefore possible to reduce manufacturing costs. In addition to the effects described above, effects are also obtained in the present embodiment whereby light is prevented from leaking in a tilted direction, particularly during narrow-angle display, because the light-absorbing seal member does not have light-scattering properties.

As described above, it is effective to set the optical concentration of the light-absorbing seal member in the present embodiment so that about the same luminance is obtained in the frontal direction, particularly when light passes through the PDLC layer in the scattering state, but the optical concentration is not limited to such a value, and a higher optical concentration may also be set. In this case, the luminance in the frontal direction can be further reduced in the seal member, and the occurrence of abnormally bright areas can therefore be more reliably reduced. For example, a completely black seal member may be used. When a slight luminance increase can be allowed, a small optical concentration may be set. Specifically, the appearance of an abnormally bright area can be reduced if the seal member is not transparent. A colorless seal member is particularly suitable for use. The reason for this is that when a colored seal member is used, even when the appearance of an abnormally bright area is suppressed, the affected area appears colored. The seal member may also be combined with the seal member of the aforementioned first embodiment to appropriately impart scattering properties.

Figure 23:
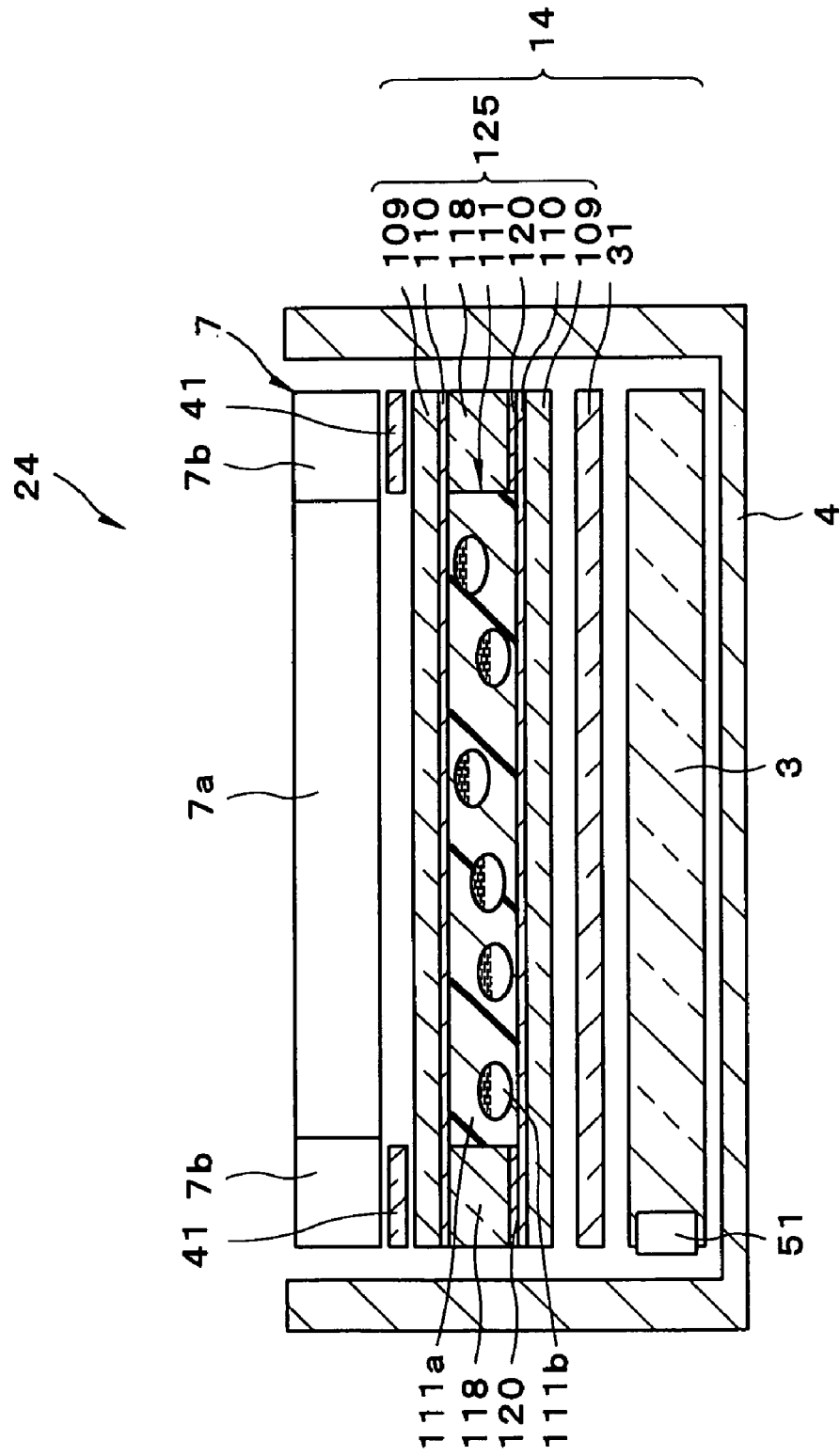
FIG. 23 is a sectional view showing the display device according to a fifth embodiment of the present invention.

The display device, light source device, and optical member according to a fifth embodiment of the present invention will next be described. FIG. 23 is a sectional view showing the display device according to the present embodiment. As shown in FIG. 23, the display device 24 according to the present fifth embodiment differs from the display device 23 of the fourth embodiment in that a transparent seal member 118 is provided instead of the light-absorbing seal member 119 in the transparent/scattering state switching element 125, the PDLC layer 111 is sealed by this transparent seal member 118, and a light-shielding layer 120 is formed between the PDLC layer 111 and one of the electrodes 110 of the transparent/scattering state switching element 125. Other aspects of the present embodiment are the same as in the aforementioned fourth embodiment.

Although the seal member for sealing the PDLC layer 111 of the transparent/scattering state switching element 125 is optically transparent in the present embodiment, the light-shielding layer 120 provided on a transparent substrate 109 of the transparent/scattering state switching element 125 has light-blocking properties and absorbs light, and the same effects can therefore be demonstrated as in the display device 2 of the aforementioned first embodiment. Specifically, an abnormally bright area does not appear in the display screen, and there is no decrease in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified, and these regions can instead be aligned merely based on external shape, for example. It is therefore possible to reduce manufacturing costs.

In addition to the effects described above, such effects as those described below can also be obtained in the present embodiment. Specifically, in comparison to the aforementioned first embodiment, since a transparent seal member can be used as the seal member of the transparent/scattering state switching element, the number of options available for selecting a seal member can be increased, and it is possible to utilize a seal member that has superior reliability and other characteristics. In comparison to the aforementioned second embodiment, since there is no need for a special double-sided tape, the number of options available for selecting a member can be increased, and it is possible to utilize a tape that has better performance with regard to adhesion and other characteristics. Effects are also obtained whereby light is prevented from leaking in a tilted direction, particularly during narrow-angle display, the same as in the fourth embodiment.

In the present embodiment, since the light-shielding layer 120 is formed between the PDLC layer 111 and an electrode 110 of the transparent/scattering state switching element 125, the light-shielding layer 120 can be formed simultaneously with the markings (for example, markings used for aligning the two substrates) needed during fabrication of the transparent/scattering state switching element. The cost of the transparent/scattering state switching element 125 can be prevented from increasing by providing the light-shielding layer 120. The light-shielding layer 120 may be formed on the surface of the transparent substrate 109 opposite from the PDLC layer 111.

Figure 24:
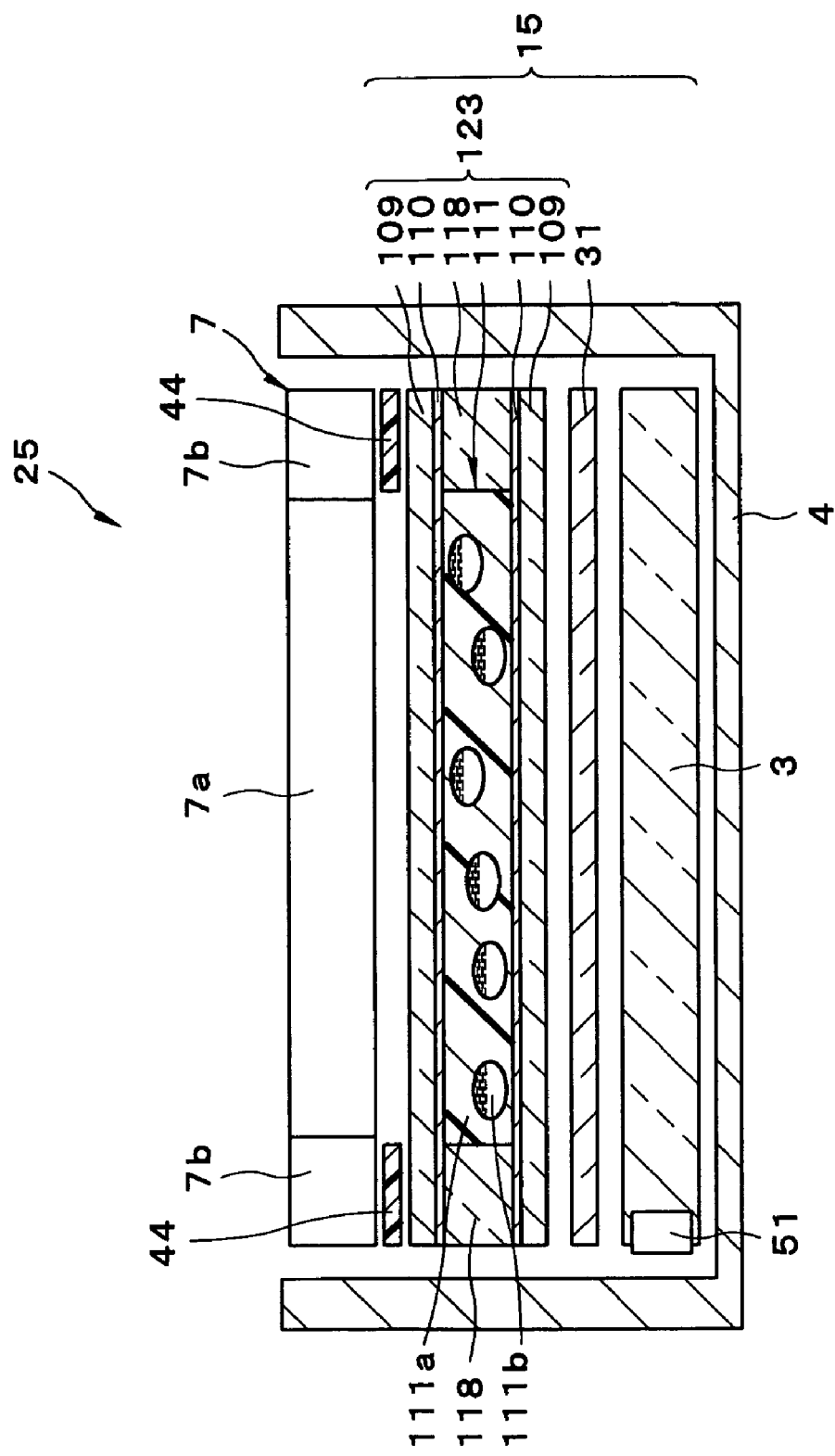
FIG. 24 is a sectional view showing the display device according to a sixth embodiment of the present invention.

The display device, light source device, and optical member according to a sixth embodiment of the present invention will next be described. FIG. 24 is a sectional view showing the display device of the present embodiment. As shown in FIG. 24, the display device 25 according to the present sixth embodiment differs from the display device 21 of the second embodiment in that light-absorbing double-sided adhesive tape 44 for absorbing light is provided instead of the scattering double-sided adhesive tape 42. Specifically, the transmissive liquid crystal display panel 7 is fixed relative to the transparent/scattering state switching element 123 by light-absorbing double-sided adhesive tape 44 affixed to the frame region 7b. The optical concentration of the light-absorbing double-sided adhesive tape 44 is set, in the same manner as the optical concentration of the light-absorbing seal member in the aforementioned fourth embodiment, so that the luminance in the frontal direction of light passing through the light-absorbing double-sided adhesive tape 44 is about the same as the luminance in the frontal direction of light passing through the PDLC layer in the scattering state. Other aspects of the present embodiment are the same as in the aforementioned second embodiment. Specifically, a transparent seal member 118 is provided to the transparent/scattering state switching element 123, and the PDLC layer 111 is sealed by this transparent seal member 118.

Although the seal member for sealing the PDLC layer 111 of the transparent/scattering state switching element 123 is optically transparent in the present embodiment, the light-absorbing double-sided adhesive tape 44 provided between the transparent/scattering state switching element 123 and the transmissive liquid crystal display panel 7 has light-absorbing properties, and the same effects can therefore be demonstrated as in the aforementioned first embodiment. Specifically, an abnormally bright area does not appear in the display screen, and there is no decrease in display quality caused by misalignment. An observer can therefore utilize the display device without discomfort. Since a large allowable value for misalignment can also be set during manufacturing of the display device, the manufacturing yield can be enhanced. Furthermore, it is unnecessary to perform a type of high-precision alignment in which the seal member region of the transparent/scattering state switching element and the display region of the display panel are identified, and these regions can instead be aligned merely based on external shape, for example. It is therefore possible to reduce manufacturing costs.

In addition to the effects described above, the effects described below can also be obtained in the present embodiment. Specifically, in comparison to the aforementioned first embodiment, since a transparent seal member can be used as the seal member of the transparent/scattering state switching element, the number of options available for selecting a seal member can be increased, and it is possible to utilize a seal member that has superior reliability and other characteristics. In comparison to the aforementioned second embodiment, since there is no need for a special double-sided tape, the number of options available for selecting a member can be increased, and it is possible to utilize a double-sided tape that has better performance with regard to adhesion and other characteristics. Effects are also obtained whereby light is prevented from leaking in a tilted direction during narrow-angle display, the same as in the fourth embodiment.

As described above, it is effective to set the optical concentration of the light-absorbing double-sided adhesive tape in the present embodiment so that the luminance in the frontal direction of light passing through the light-absorbing double-sided adhesive tape is about the same as the luminance in the frontal direction of light passing through the PDLC layer in the scattering state, but the optical concentration is not limited to such a value, and a higher optical concentration may also be set. In this case, the luminance in the frontal direction can be further reduced in the seal member, and the occurrence of abnormally bright areas can therefore be more reliably reduced. For example, a completely black double-sided adhesive tape may be used. When a slight luminance increase can be allowed, a small optical concentration may be set. Specifically, the appearance of an abnormally bright area can be reduced if the double-sided tape is not transparent. A colorless double-sided tape is particularly suitable for use. The reason for this is that when a colored double-sided tape is used, even when the appearance of an abnormally bright area is suppressed, the affected area appears colored. The double-sided tape may also be combined with the tape of the aforementioned second embodiment to appropriately impart scattering properties. The double-sided tape may also be combined with the seal member of the aforementioned first embodiment.

As with the transparent/scattering double-sided adhesive tape of the aforementioned third embodiment, the light-absorbing double-sided adhesive tape in the present embodiment may be a transparent/absorbing double-sided adhesive tape that has a transparent portion in the display region. In addition to the effects described above, this configuration has effects whereby impact resistance is enhanced, and light loss due to surface reflection can be minimized.

Figure 25:
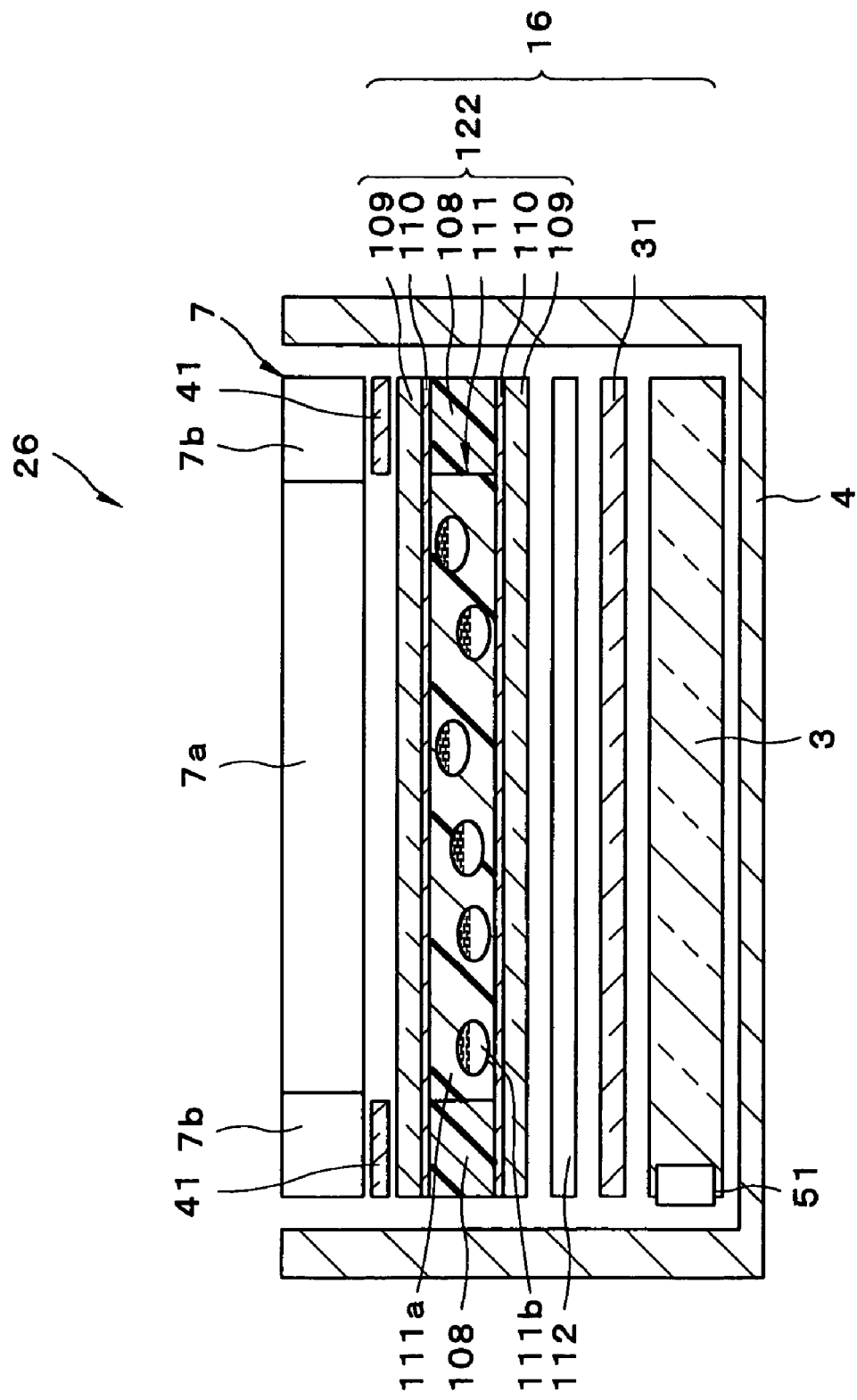
FIG. 25 is a sectional view showing the display device according to a seventh embodiment of the present invention.

The display device, light source device, and optical member according to a seventh embodiment of the present invention will next be described. FIG. 25 is a sectional view showing the display device according to the present embodiment. As shown in FIG. 25, the display device 26 according to the present seventh embodiment differs from the display device 2 of the first embodiment in that a louver 112 is provided as a light-direction regulating element. The louver 112 is provided between the prism sheet 31 and the transparent/scattering state switching element 122. In the louver 112, transparent areas (not shown) for transmitting light and absorbent areas (not shown) for absorbing light are arrayed in alternating fashion in the direction parallel to the surface of the louver. The direction in which the transparent areas and absorbent areas are arrayed in alternating fashion is set to the transverse direction in FIG. 25. Other aspects of the present embodiment are the same as in the first embodiment.

In the present embodiment, since the louver 112 absorbs and removes components of light propagated in directions tilted at a certain angle or more from the direction of the line normal to the emission surface among light rays emitted from the prism sheet 31, it is possible to increase the directivity of light rays incident on the transparent/scattering state switching element 122. Light can thereby be prevented from leaking in tilted directions during narrow-angle display, and anti-eavesdropping effects can be enhanced.

In the louver provided as a light-direction regulating element in the present embodiment, the direction in which the transparent areas and absorbent areas were arrayed in alternating fashion was described as being the transverse direction of FIG. 25, but the present invention is not limited by this configuration, and this array direction may be tilted with respect to the array direction of pixels of the transmissive liquid crystal display panel 7 in the light-emitting surface of the light-guide plate. Moiré that occurs between the louver and the display panel can thereby be made less noticeable, and display quality can be enhanced.

Figure 26:
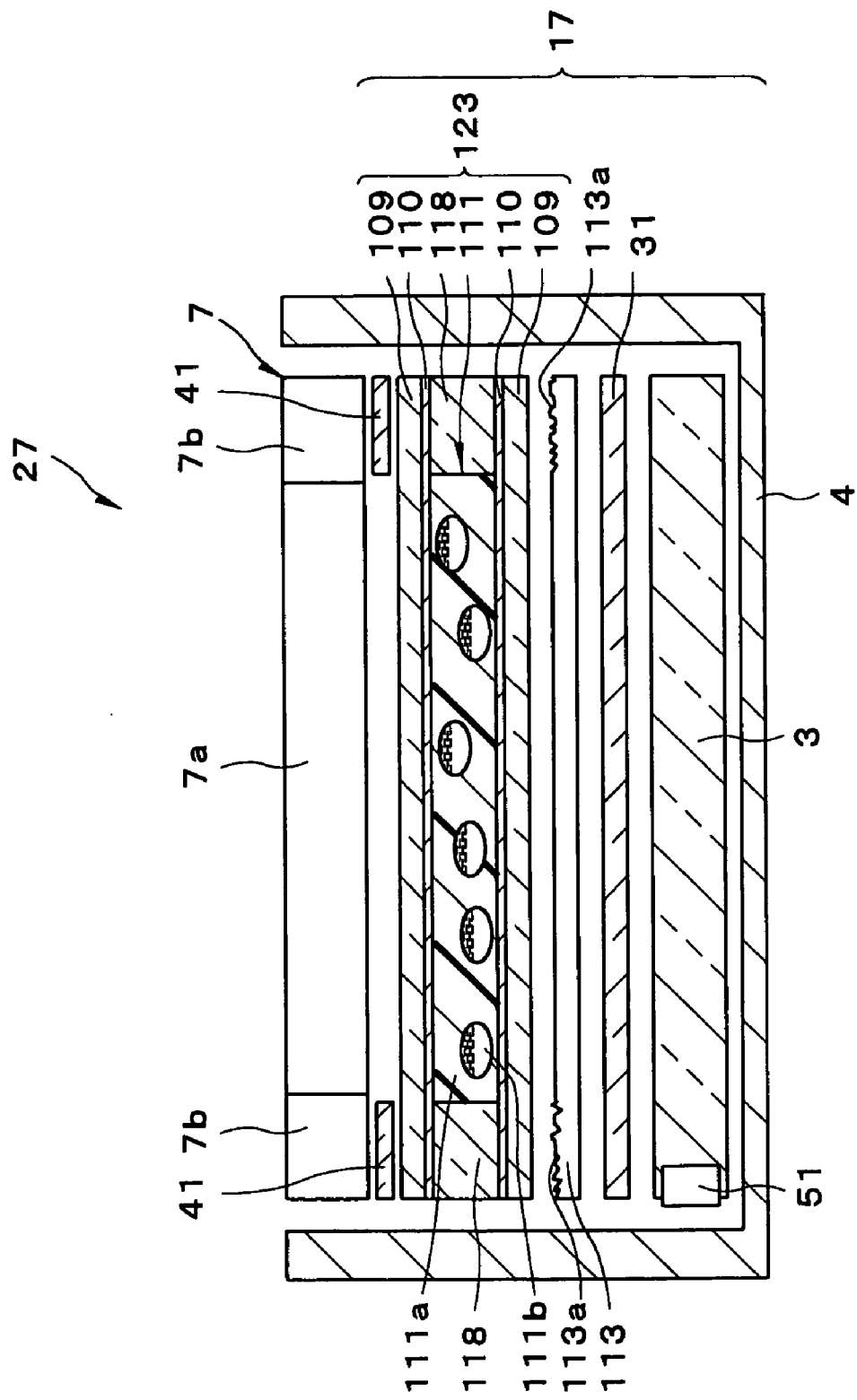
FIG. 26 is a sectional view showing the display device according to an eighth embodiment of the present invention.

The display device, light source device, and optical member according to an eighth embodiment of the present invention will next be described. FIG. 26 is a sectional view showing the display device according to the present embodiment. As shown in FIG. 26, the display device 27 according to the present eighth embodiment differs from the display device 26 of the seventh embodiment in that a transparent seal member 118 is provided instead of the scattering seal member 108 of the transparent/scattering state switching element 122, and in that the portion other than the display region in the surface of a louver 113 on the side of the transparent/scattering state switching element 122 is endowed with scattering properties as a scattering surface 113*a*. Other aspects of the present embodiment are the same as in the seventh embodiment.

In the present embodiment, when light is emitted from the louver 113, the light emitted from the non-display region is dispersed by the scattering surface 113*a*, and the effects demonstrated are equivalent to a case in which a scattering seal member is employed in the transparent/scattering state switching element. The same effects as those of the first embodiment are thereby obtained.

The scattering surface 113*a* of the louver 113 in the present embodiment was described as being provided on the side of the transparent/scattering state switching element, but this configuration is not limiting, and a surface on the side of a prism sheet of the louver 113 may be a scattering surface. In this case, since the directivity of light incident on the louver structure is reduced by the scattering surface, effects are obtained whereby the luminance in the frontal direction is reduced in the light emitted from the louver 113. The same effects as those of the first embodiment can thereby be obtained.

The embodiments described above may be utilized independently, but it is also possible to utilize appropriate combinations of these embodiments.

INDUSTRIAL APPLICABILITY

The present invention can be suitable for use as a display device for a mobile telephone, a PDA, a gaming device, a digital camera, a video camera, a video player, or other mobile terminal device, and as a display device for a notebook-type personal computer, a cash dispenser, a vending machine, or other terminal device.

What is claimed is:
1. A light source device comprising:
a planar light source for emitting light in a plane; and
a transparent/scattering state switching element capable of switching between a state for transmitting light emitted from the planar light source, and a state for scattering the light;
wherein:
said transparent/scattering state switching element comprises:
two transparent substrates;

a seal member disposed between external peripheral portions of the two transparent substrates; and a transparent/scattering state switching layer that is capable of switching between a state for transmitting incident light and a state for scattering incident light and that is enclosed in a region sealed by said seal member between said two transparent substrates;

the luminance of light that has passed through the region in which the seal member is disposed in the transparent/scattering state switching element is lower than before the light passed through this region; and a frontal luminance of light that has passed through the region in which the seal member is disposed is not greater than a frontal luminance of light that has passed through the transparent/scattering state switching layer in the scattering state, wherein said transparent/scattering state switching element has a light-shielding layer for blocking light; and wherein a cross-sectional area of said light-shielding layer is the same as a cross-sectional area of said seal member, as viewed from a direction perpendicular to a surface of said transparent/scattering state switching element.

2. The light source device according to claim 1, wherein a region in which said seal member is disposed in said transparent/scattering state switching element is not transparent, as viewed from a direction perpendicular to a surface of said transparent/scattering state switching element.

3. The light source device according to claim 1, wherein said seal member has scattering properties that yield a degree of scattering equal to a degree of scattering of said transparent/scattering state switching layer in said scattering state.

4. The light source device according to claim 1, wherein said seal member has scattering properties that yield a degree of scattering greater than a degree of scattering of said transparent/scattering state switching layer in said scattering state.

5. The light source device according to claim 1, wherein light is scattered by a region overlapping said seal member in at least one of said transparent substrates, as viewed from a direction perpendicular to a surface of said transparent/scattering state switching element.

6. The light source device according to claim 1, wherein an uneven shape is formed in a region overlapping said seal member in a surface of at least one of said transparent substrates, as viewed from a direction perpendicular to a surface of said transparent/scattering state switching element.

7. The light source device according to claim 1, further comprising;

a scattering double-sided adhesive tape that is non-transparent and is disposed on a side of a light-emitting surface of said planar light source; wherein the scattering double-sided adhesive tape has a shape that is identical to the shape of the seal member, as viewed from a direction perpendicular to a surface of said transparent/scattering state switching element.

8. The light source device according to claim 1, further comprising;

a scattering double-sided adhesive tape that has scattering properties and is disposed on a side of a light-emitting surface of said planar light source; wherein the scattering double-sided adhesive tape has a shape that is identical to the shape of the seal member, as viewed from a direction perpendicular to a surface of said transparent/scattering state switching element, and the scattering double-sided adhesive tape has a degree of scattering that is equal to the degree of scattering of the transparent/scattering state switching layer in the scattering state.

9. The light source device according to claim 1, further comprising;

a scattering double-sided adhesive tape that has scattering properties and is disposed on a side of a light-emitting surface of said planar light source; wherein the scattering double-sided adhesive tape has a shape that is identical to the shape of the seal member, as viewed from a direction perpendicular to a surface of said transparent/scattering state switching element, and a degree of scattering of said scattering double-sided adhesive tape is greater than a degree of scattering of said transparent/scattering state switching layer in said scattering state.

10. The light source device according to claim 1, further comprising;

a transparent/scattering double-sided adhesive tape disposed on a side of a light-emitting surface of said planar light source; wherein light is scattered by a portion overlapping said seal member in said transparent/scattering double-sided adhesive tape, as viewed from a direction perpendicular to a surface of said transparent/scattering state switching element, and a portion overlapping said transparent/scattering state switching layer is transparent.

11. The light source device according to claim 1, further comprising;

a transparent/scattering double-sided adhesive tape disposed on a side of a light-emitting surface of said planar light source; wherein light is scattered by a portion overlapping said seal member in said transparent/scattering double-sided adhesive tape, as viewed from a direction perpendicular to a surface of said transparent/scattering state switching element;

a portion overlapping said transparent/scattering state switching layer is transparent; and a degree of scattering of said portion overlapping the seal member is the same as a degree of scattering of said transparent/scattering state switching layer in said scattering state.

12. The light source device according to claim 1, further comprising;

a transparent/scattering double-sided adhesive tape disposed on a side of a light-emitting surface of said planar light source; wherein light is scattered by a portion overlapping said seal member in said transparent/scattering double-sided adhesive tape, as viewed from a direction perpendicular to a surface of said transparent/scattering state switching element;

a portion overlapping said transparent/scattering state switching layer is transparent; and a degree of scattering of said portion overlapping the seal member is greater than a degree of scattering of said transparent/scattering state switching layer in said scattering state.

13. The light source device according to claim 1, further comprising;

said seal member has light absorption properties whereby light is absorbed.

14. The light source device according to claim 13, wherein said seal member is colorless.

15. The light source device according to claim 13, wherein said seal member is black.

16. The light source device according to claim 1, further comprising;
said seal member has light absorption properties whereby light is absorbed, and an optical density of said seal member is set so that a frontal luminance of light emitted from the seal member is equal to a frontal luminance of light emitted from said transparent/scattering state switching layer in said scattering state.

17. The light source device according to claim 1, further comprising;
said seal member has light absorption properties whereby light is absorbed, and an optical density of said seal member is set so that a frontal luminance of light emitted from the seal member is lower than a frontal luminance of light emitted from said transparent/scattering state switching layer in said scattering state.

18. The light source device according to claim 1, wherein said light-shielding layer is formed on a surface of one of said transparent substrates that is opposite the other of said transparent substrates.

19. The light source device according to claim 1, further comprising;
a light-absorbing double-sided adhesive tape that absorbs light and is disposed on a side of a light-emitting surface of said planar light source; wherein
a shape of said light-absorbing double-sided adhesive tape is the same as a shape of said seal member, as viewed from a direction perpendicular to a surface of said transparent/scattering state switching element.

20. The light source device according to claim 1, further comprising;
a light-absorbing double-sided adhesive tape that absorbs light and is disposed on a side of a light-emitting surface of said planar light source; wherein
a shape of said light-absorbing double-sided adhesive tape is the same as a shape of said seal member, as viewed from a direction perpendicular to a surface of said transparent/scattering state switching element, and an optical density of said light-absorbing double-sided adhesive tape is set so that a frontal luminance of light emitted from the light-absorbing double-sided adhesive tape is equal to a frontal luminance of light emitted from said transparent/scattering state switching layer in said scattering state.

21. The light source device according to claim 1, further comprising;
a light-absorbing double-sided adhesive tape that absorbs light and is disposed on a side of a light-emitting surface of said planar light source; wherein
a shape of said light-absorbing double-sided adhesive tape is the same as a shape of said seal member, as viewed from a direction perpendicular to a surface of said transparent/scattering state switching element, and an optical density of said light-absorbing double-sided adhesive tape is set so that a frontal luminance of light emitted from the light-absorbing double-sided adhesive tape is lower than a frontal luminance of light emitted from said transparent/scattering state switching layer in said scattering state.

22. The light source device according to any one of claims 19, 20 and 21, wherein said light-absorbing double-sided adhesive tape is colorless.

23. The light source device according to any one of claims 19, 20 and 21, wherein said light-absorbing double-sided adhesive tape is black.

24. The light source device according to claim 1, further comprising;
a transparent/light-absorbing double-sided adhesive tape disposed on a side of a light-emitting surface of said planar light source; wherein
light is scattered by a portion overlapping said seal member in said transparent/light-absorbing double-sided adhesive tape, as viewed from a direction perpendicular to a surface of said transparent/scattering state switching element, and a portion overlapping said transparent/scattering state switching layer is transparent.

25. The light source device according to claim 24, wherein said portion of the transparent/light-absorbing double-sided adhesive tape that overlaps said seal member is colorless.

26. The light source device according to claim 24, wherein said portion of the transparent/light-absorbing double-sided adhesive tape that overlaps said seal member is black.

27. The light source device according to claim 1, further comprising;
a transparent/light-absorbing double-sided adhesive tape disposed on a side of a light-emitting surface of said planar light source; wherein
light is absorbed by a portion overlapping said seal member in said transparent/light-absorbing double-sided adhesive tape, as viewed from a direction perpendicular to a surface of said transparent/scattering state switching element;
a portion overlapping said transparent/scattering state switching layer is transparent; and
an optical density of said portion overlapping the seal member is set so that a frontal luminance of light emitted from this portion is equal to a frontal luminance of light emitted from said transparent/scattering state switching layer in said scattering state.

28. The light source device according to claim 1, further comprising;
a transparent/light-absorbing double-sided adhesive tape disposed on a side of a light-emitting surface of said planar light source; wherein
light is absorbed by a portion overlapping said seal member in said transparent/light-absorbing double-sided adhesive tape, as viewed from a direction perpendicular to a surface of said transparent/scattering state switching element;
a portion overlapping said transparent/scattering state switching layer is transparent; and
an optical density of said portion overlapping the seal member is set so that a frontal luminance of light emitted from this portion is lower than a frontal luminance of light emitted from said transparent/scattering state switching layer in said scattering state.

29. The light source device according to claim 1, wherein,
a transmittance of light in a region in which said seal member is interposed in a light path that extends from said planar light source to said display panel is lower than a transmittance of light when said transparent/scattering state switching layer is in said transparent state in the area in which said transparent/scattering state switching layer is interposed.

30. The light source device according to claim 1, further comprising;
a light-direction regulating element which is disposed between said planar light source and said transparent/scattering state switching element to regulate a direction of light emitted from the planar light source and output light into said transparent/scattering state switching element, and wherein an uneven shape is formed in a region of a surface of said light-direction regulating element that overlaps said seal member, as viewed from a direction perpendicular to a surface of said display panel.

31. The light source device according to claim 1, wherein said planar light source comprises a light source; and a light-guiding member for emitting in a plane light that is incident from the light source.

32. A display device comprising:
the light source device according to claim 1; and
a display panel for displaying an image by transmitting light emitted from the transparent/scattering state switching element.

33. The display device according to claim 32, further comprising;
a scattering double-sided adhesive tape that is non-transparent and is disposed on a side of a light-emitting surface of said planar light source; wherein
said scattering double-sided adhesive tape has a shape that is identical to the shape of the seal member, as viewed from a direction perpendicular to a surface of said transparent/scattering state switching element;
said scattering double-sided adhesive tape is disposed between said transparent/scattering state switching element and said display panel; and
said transparent/scattering state switching element and said display panel are fixed relative to each other by said scattering double-sided adhesive tape.

34. The display device according to claim 32, further comprising;
a scattering double-sided adhesive tape that has scattering properties and is disposed on a side of a light-emitting surface of said planar light source; wherein
said scattering double-sided adhesive tape has a shape that is identical to the shape of the seal member, as viewed from a direction perpendicular to a surface of said transparent/scattering state switching element, and the scattering double-sided adhesive tape has a degree of scattering that is equal to the degree of scattering of the transparent/scattering state switching layer in the scattering state;
said scattering double-sided adhesive tape is disposed between said transparent/scattering state switching element and said display panel; and
said transparent/scattering state switching element and said display panel are fixed relative to each other by said scattering double-sided adhesive tape.

35. The display device according to claim 32, further comprising;
a scattering double-sided adhesive tape that has scattering properties and is disposed on a side of a light-emitting surface of said planar light source; wherein
said scattering double-sided adhesive tape has a shape that is identical to the shape of the seal member, as viewed from a direction perpendicular to a surface of said transparent/scattering state switching element, and a degree of scattering of said scattering double-sided adhesive tape is greater than a degree of scattering of said transparent/scattering state switching layer in said scattering state;
said scattering double-sided adhesive tape is disposed between said transparent/scattering state switching element and said display panel; and
said transparent/scattering state switching element and said display panel are fixed relative to each other by said scattering double-sided adhesive tape.

36. The display device according to claim 32, further comprising;
a light-absorbing double-sided adhesive tape that absorbs light and is disposed on a side of a light-emitting surface of said planar light source; wherein
a shape of said light-absorbing double-sided adhesive tape is the same as a shape of said seal member, as viewed from a direction perpendicular to a surface of said transparent/scattering state switching element;
said light-absorbing double-sided adhesive tape is disposed between said transparent/scattering state switching element and said display panel; and
said transparent/scattering state switching element and said display panel are fixed relative to each other by said light-absorbing double-sided adhesive tape.

37. The display device according to claim 32, further comprising;
a light-absorbing double-sided adhesive tape that absorbs light and is disposed on a side of a light-emitting surface of said planar light source; wherein
a shape of said light-absorbing double-sided adhesive tape is the same as a shape of said seal member, as viewed from a direction perpendicular to a surface of said transparent/scattering state switching element, and an optical density of said light-absorbing double-sided adhesive tape is set so that a frontal luminance of light emitted from the light-absorbing double-sided adhesive tape is equal to a frontal luminance of light emitted from said transparent/scattering state switching layer in said scattering state;
said light-absorbing double-sided adhesive tape is disposed between said transparent/scattering state switching element and said display panel; and
said transparent/scattering state switching element and said display panel are fixed relative to each other by said light-absorbing double-sided adhesive tape.

38. The display device according to claim 32, further comprising;
a light-absorbing double-sided adhesive tape that absorbs light and is disposed on a side of a light-emitting surface of said planar light source; wherein
a shape of said light-absorbing double-sided adhesive tape is the same as a shape of said seal member, as viewed from a direction perpendicular to a surface of said transparent/scattering state switching element, and an optical density of said light-absorbing double-sided adhesive tape is set so that a frontal luminance of light emitted from the light-absorbing double-sided adhesive tape is lower than a frontal luminance of light emitted from said transparent/scattering state switching layer in said scattering state;
said light-absorbing double-sided adhesive tape is disposed between said transparent/scattering state switching element and said display panel; and
said transparent/scattering state switching element and said display panel are fixed relative to each other by said light-absorbing double-sided adhesive tape.

39. A terminal device comprising the display device according to claim 32.

40. The terminal device according to claim 39, comprising a mobile telephone, a personal information terminal, a gaming device, a digital camera, a video camera, a video player, a notebook-type personal computer, a cash dispenser, or a vending machine.

41. An optical member comprising:

a transparent/scattering state switching element capable of switching between a state for transmitting incident light, and a state for scattering the light; wherein:

said transparent/scattering state switching element comprises:

two transparent substrates;

a seal member disposed between external peripheral portions of the two transparent substrates; and a transparent/scattering state switching layer that is capable of switching between a state for transmitting incident light and a state for scattering incident light and that is enclosed in a region sealed by said seal member between said two transparent substrates;

the luminance of light that has passed through the region in which the seal member is disposed in the transparent/scattering state switching element is lower than before the light passed through this region; and a frontal luminance of light that has passed through the region in which the seal member is disposed is not greater than a frontal luminance of light that has passed through the transparent/scattering state switching layer in the scattering state, wherein said transparent/scattering state switching element has a light-shielding layer for blocking light; and wherein a cross-sectional area of said light-shielding layer is the same as a cross-sectional area of said seal member, as viewed from a direction perpendicular to a surface of said transparent/scattering state switching element.

42. The optical member according to claim 41, wherein said seal member has scattering properties that yield a degree of scattering equal to a degree of scattering of said transparent/scattering state switching layer in said scattering state.

43. The optical member according to claim 41, wherein said seal member has scattering properties that yield a degree of scattering greater than a degree of scattering of said transparent/scattering state switching layer in said scattering state.

44. The optical member according to claim 41, wherein light is scattered by a region overlapping said seal member in at least one of said transparent substrates, as viewed from a direction perpendicular to a surface of said transparent/scattering state switching element.

45. The optical member according to claim 41, wherein an uneven shape is formed in a region overlapping said seal member in a surface of at least one of said transparent substrates, as viewed from a direction perpendicular to a surface of said transparent/scattering state switching element.

46. The optical member according to claim 41, further comprising;

a scattering double-sided adhesive tape that is non-transparent and is affixed to said transparent/scattering state switching element; wherein the scattering double-sided adhesive tape has a shape that is identical to the shape of the seal member, as viewed from a direction perpendicular to a surface of said transparent/scattering state switching element.

47. The optical member according to claim 41, further comprising;

a scattering double-sided adhesive tape that has scattering properties and is affixed to said transparent/scattering state switching element; wherein the scattering double-sided adhesive tape has a shape that is identical to the shape of the seal member, as viewed from a direction perpendicular to a surface of said transparent/scattering state switching element, and the scattering double-sided adhesive tape has a degree of scattering that is equal to the degree of scattering of the transparent/scattering state switching layer in the scattering state.

48. The optical member according to claim 41, further comprising;

a scattering double-sided adhesive tape that has scattering properties and is affixed to said transparent/scattering state switching element; wherein the scattering double-sided adhesive tape has a shape that is identical to the shape of the seal member, as viewed from a direction perpendicular to a surface of said transparent/scattering state switching element, and a degree of scattering of said scattering double-sided adhesive tape is greater than a degree of scattering of said transparent/scattering state switching layer in said scattering state.

49. The optical member according to claim 41, further comprising;

a transparent/scattering double-sided adhesive tape affixed to said transparent/scattering state switching element; wherein light is scattered by a portion overlapping said seal member in said transparent/scattering double-sided adhesive tape, as viewed from a direction perpendicular to a surface of said transparent/scattering state switching element, and a portion overlapping said transparent/scattering state switching layer is transparent.

50. The optical member according to claim 41, further comprising;

a transparent/scattering double-sided adhesive tape affixed to said transparent/scattering state switching element; wherein light is scattered by a portion overlapping said seal member in said transparent/scattering double-sided adhesive tape, as viewed from a direction perpendicular to a surface of said transparent/scattering state switching element;

a portion overlapping said transparent/scattering state switching layer is transparent; and a degree of scattering of said portion overlapping the seal member is the same as a degree of scattering of said transparent/scattering state switching layer in said scattering state.

51. The optical member according to claim 41, further comprising;

a transparent/scattering double-sided adhesive tape affixed to said transparent/scattering state switching element; wherein light is scattered by a portion overlapping said seal member in said transparent/scattering double-sided adhesive tape, as viewed from a direction perpendicular to a surface of said transparent/scattering state switching element;

a portion overlapping said transparent/scattering state switching layer is transparent; and a degree of scattering of said portion overlapping the seal member is greater than a degree of scattering of said transparent/scattering state switching layer in said scattering state.

52. The optical member according to claim 41, wherein said seal member has light absorption properties whereby light is absorbed.

53. The optical member according to claim 52, wherein said seal member is colorless.

54. The optical member according to claim 52, wherein said seal member is black.

55. The optical member according to claim 41, wherein said light-shielding layer is formed on a surface of one of said transparent substrates, said surface being opposite the other of said transparent substrates.

56. The display device according to claim 41, further comprising;
- a light-absorbing double-sided adhesive tape that absorbs light and is affixed to said transparent/scattering state switching element; wherein
- a shape of said light-absorbing double-sided adhesive tape is the same as a shape of said seal member, as viewed from a direction perpendicular to a surface of said transparent/scattering state switching element.

57. The optical member according to claim 56, wherein said light-absorbing double-sided adhesive tape is colorless.

58. The optical member according to claim 56, wherein said light-absorbing double-sided adhesive tape is black.

59. The optical member according to claim 41, further comprising;
- a transparent/light-absorbing double-sided adhesive tape affixed to said transparent/scattering state switching element; wherein
- light is scattered by a portion overlapping said seal member in said transparent/light-absorbing double-sided adhesive tape, as viewed from a direction perpendicular to a surface of said transparent/scattering state switching element, and a portion overlapping said transparent/scattering state switching layer is transparent.

60. The optical member according to claim 59, wherein said portion of the transparent/light-absorbing double-sided adhesive tape that overlaps said seal member is colorless.

61. The optical member according to claim 59, wherein said portion of the transparent/light-absorbing double-sided adhesive tape that overlaps said seal member is black.

62. An optical member comprising:
- a light-direction regulating element for regulating a direction of incident light; and
- a transparent/scattering state switching element capable of switching between a state for transmitting light emitted from the light-direction regulating element, and a state for scattering the light; wherein:
- said transparent/scattering state switching element comprises:
  - two transparent substrates;
  - a seal member disposed between external peripheral portions of the two transparent substrates; and
  - a transparent/scattering state switching layer that is capable of switching between a state for transmitting incident light and a state for scattering incident light and that is enclosed in a region sealed by said seal member between said two transparent substrates;
- an uneven shape is formed in a region of a surface of said light-direction regulating element that overlaps said seal member, as viewed from a direction perpendicular to a surface of said transparent/scattering state switching element; and
- a frontal luminance of light that has passed through the region in which the seal member is disposed is not greater than a frontal luminance of light that has passed through the transparent/scattering state switching layer in the scattering state,
- wherein said transparent/scattering state switching element has a light-shielding layer for blocking light; and
- wherein a cross-sectional area of said light-shielding layer is the same as a cross-sectional area of said seal member, as viewed from a direction perpendicular to a surface of said transparent/scattering state switching element.

* * * * *